OUTPUT SHAFT AT FULL SPEED

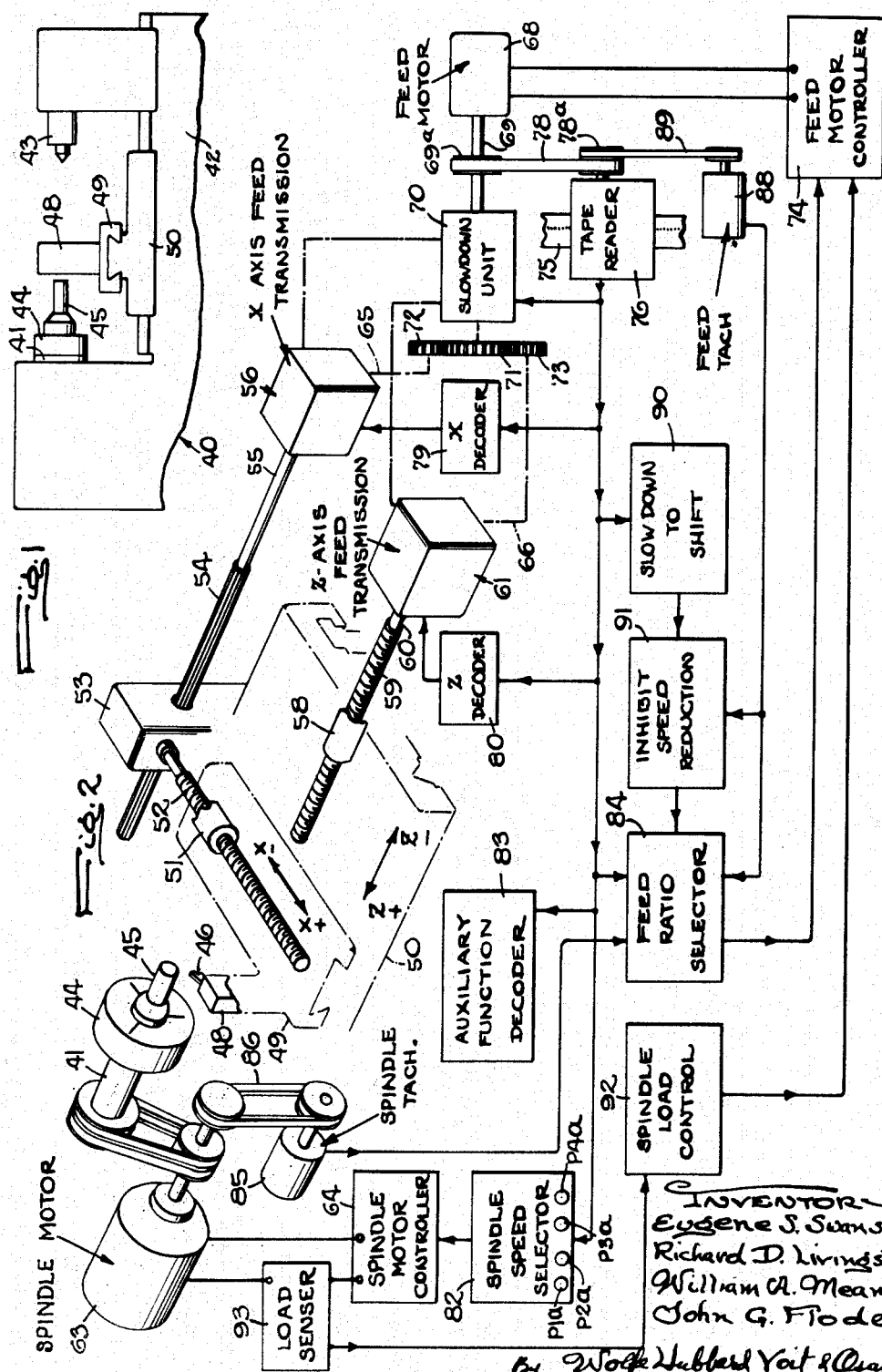

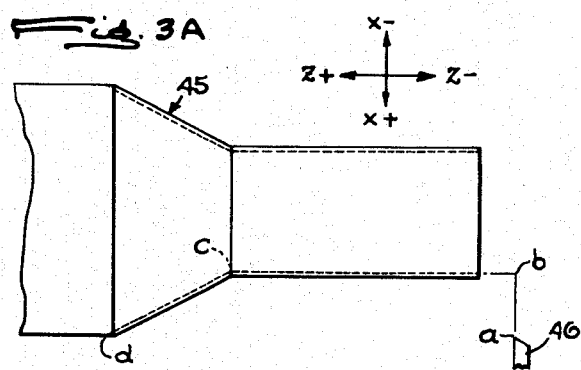
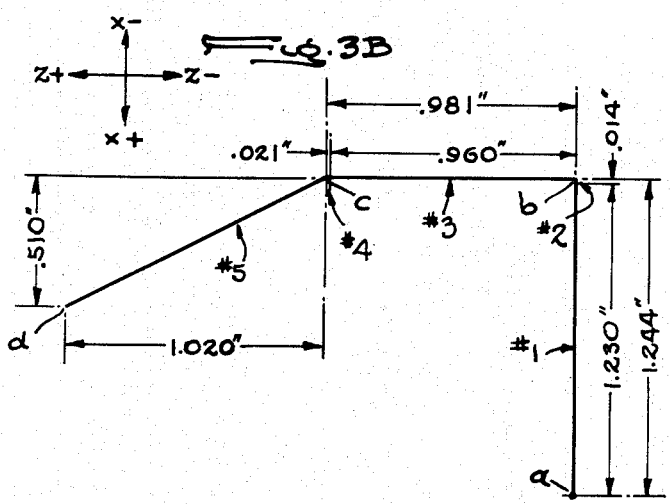
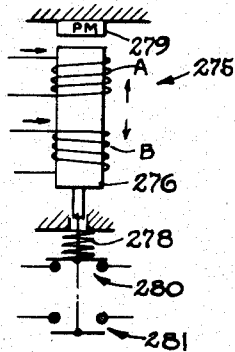
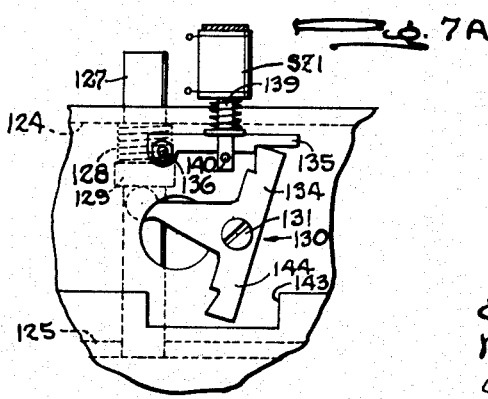

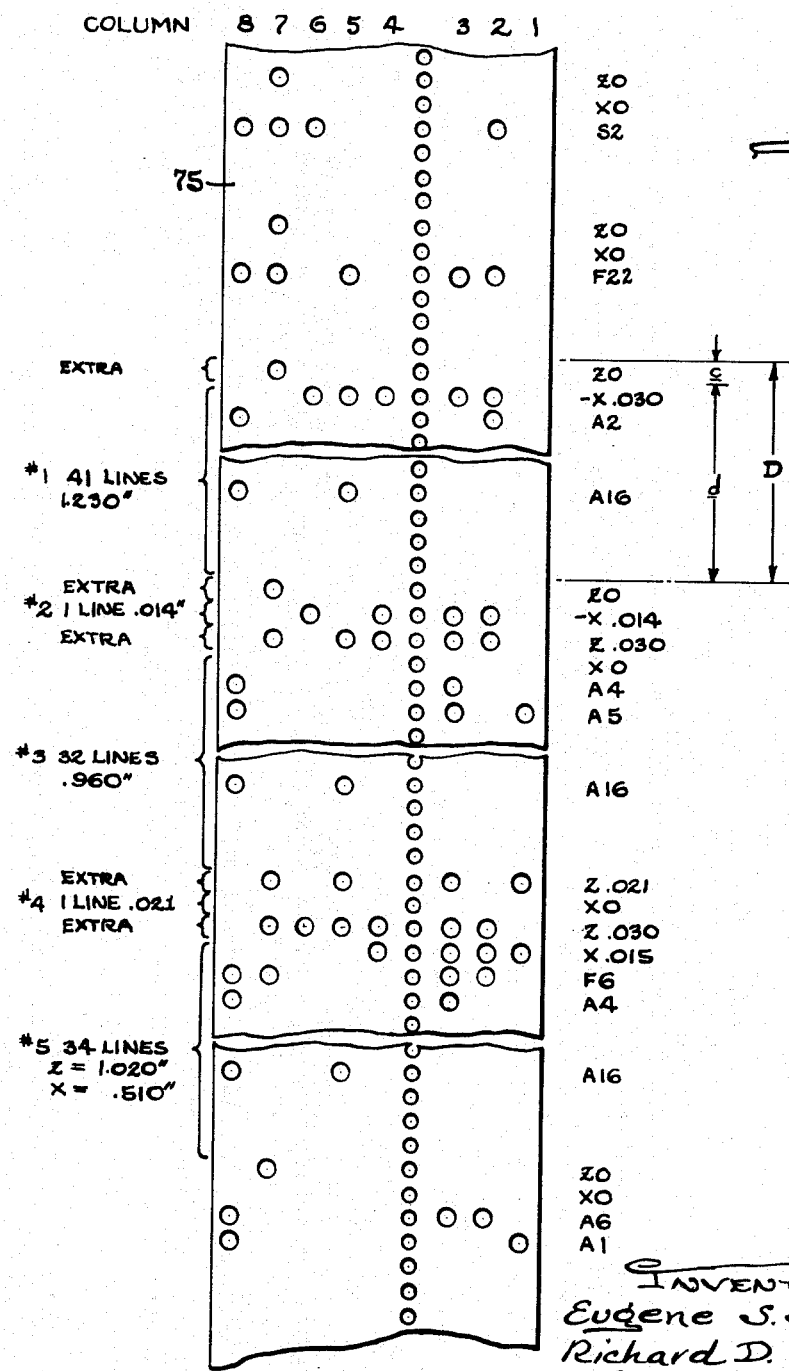

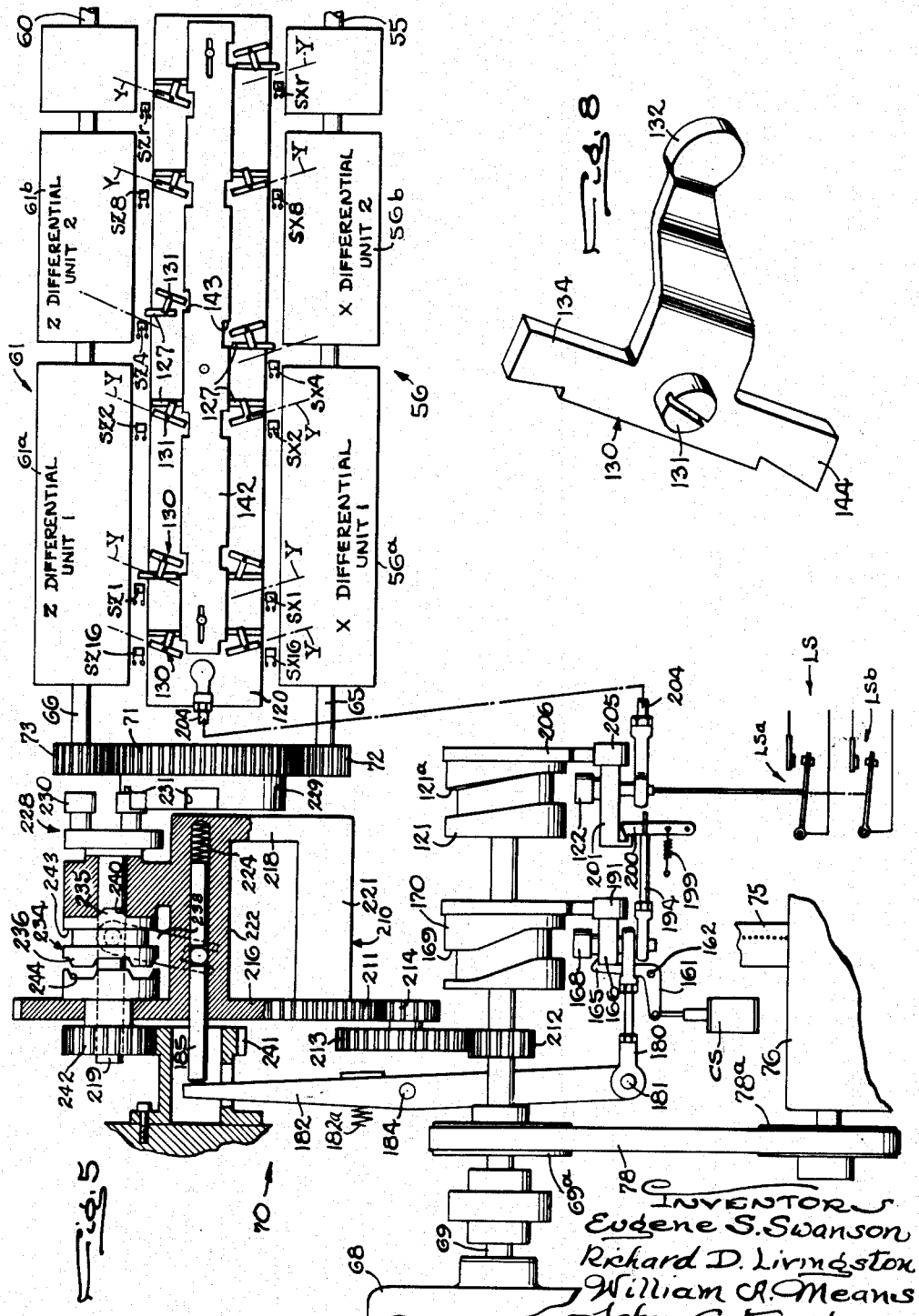

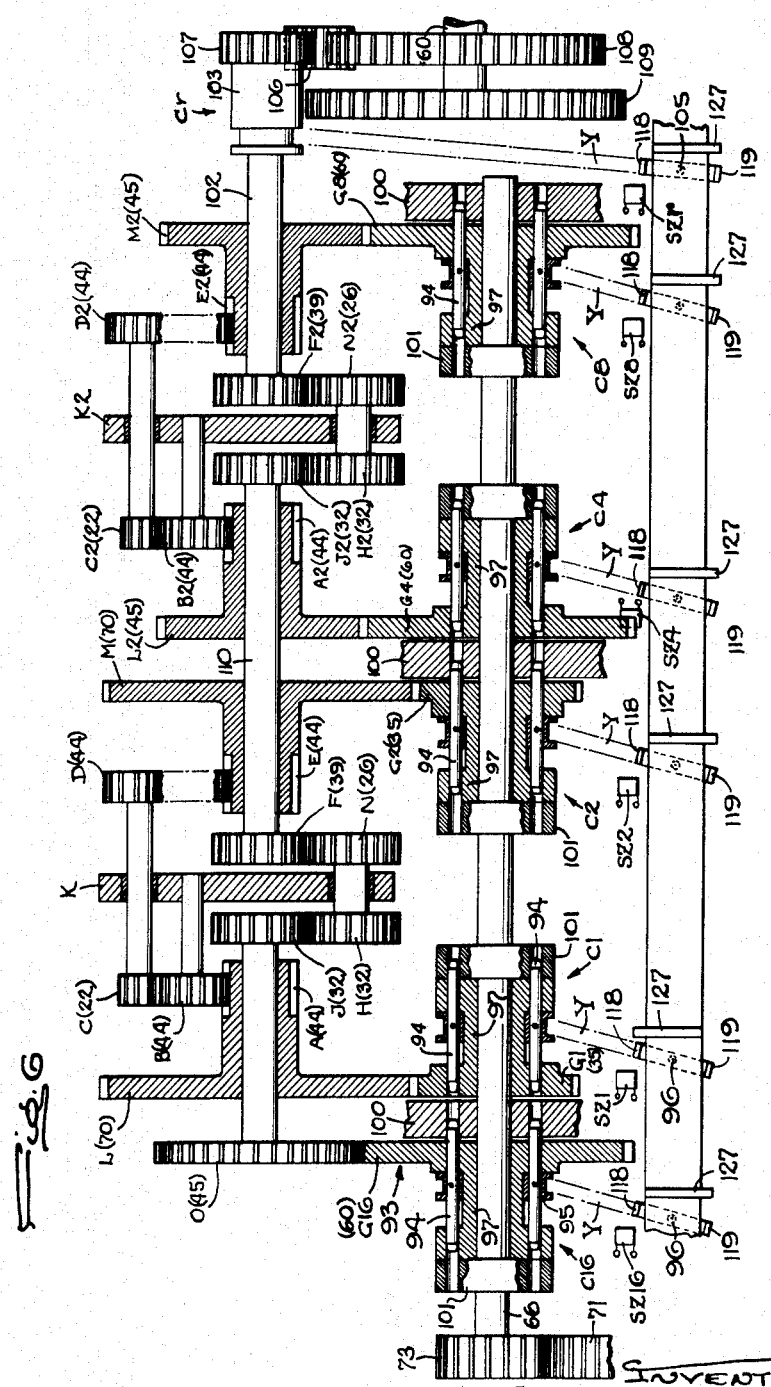

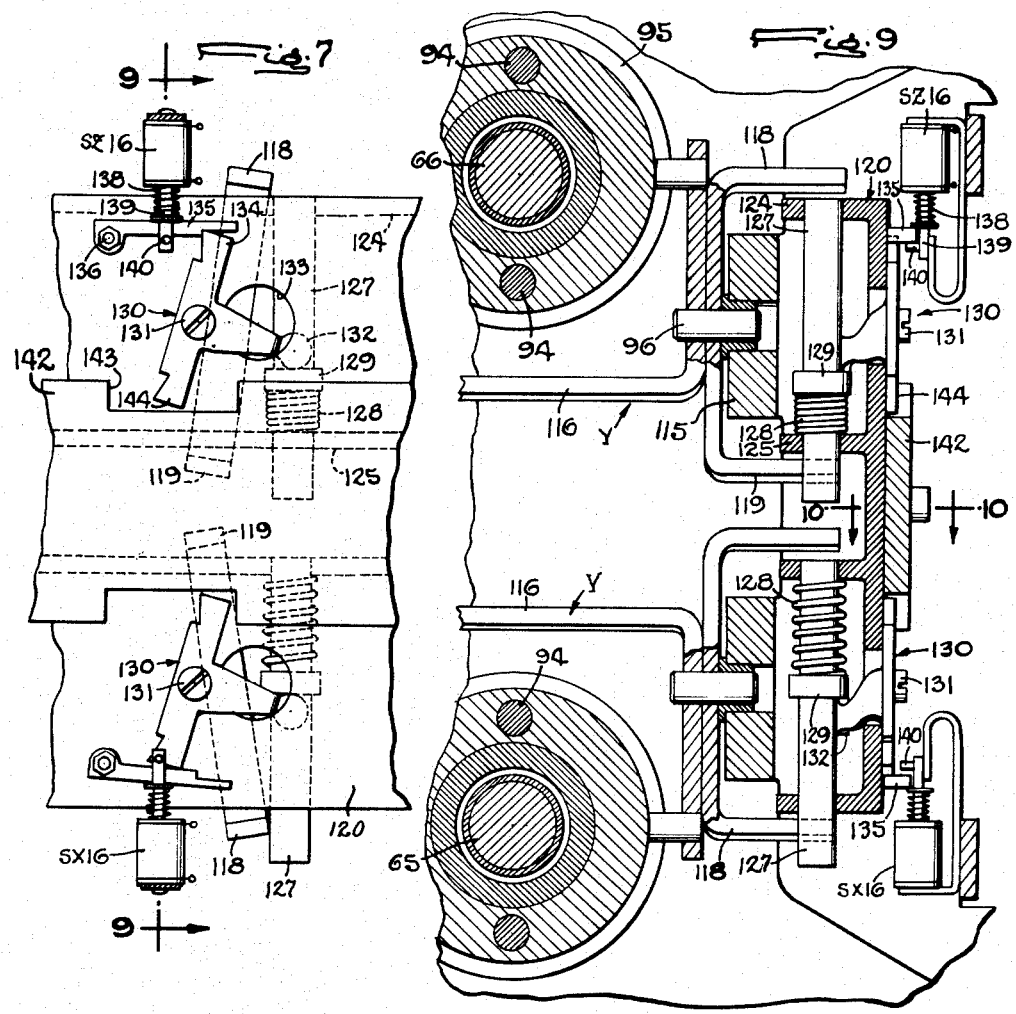
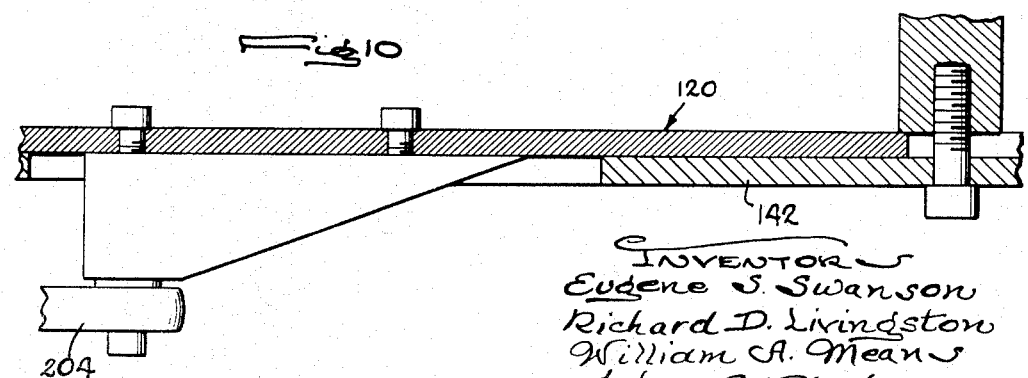

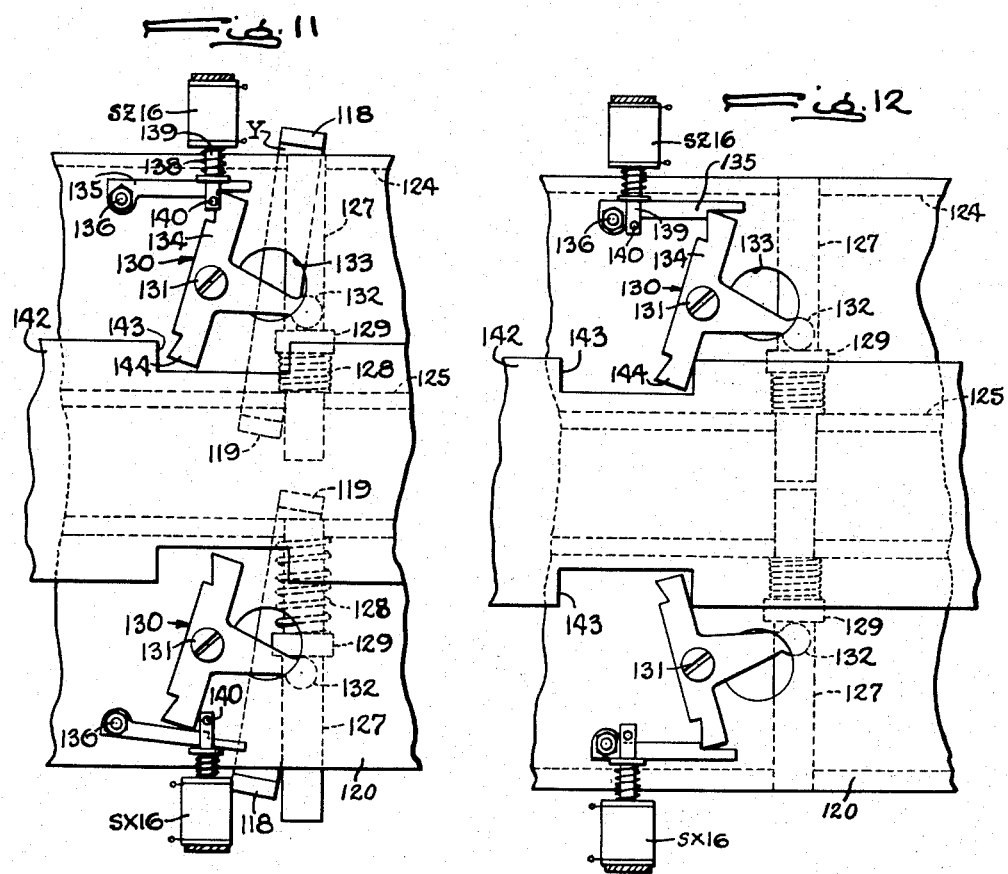
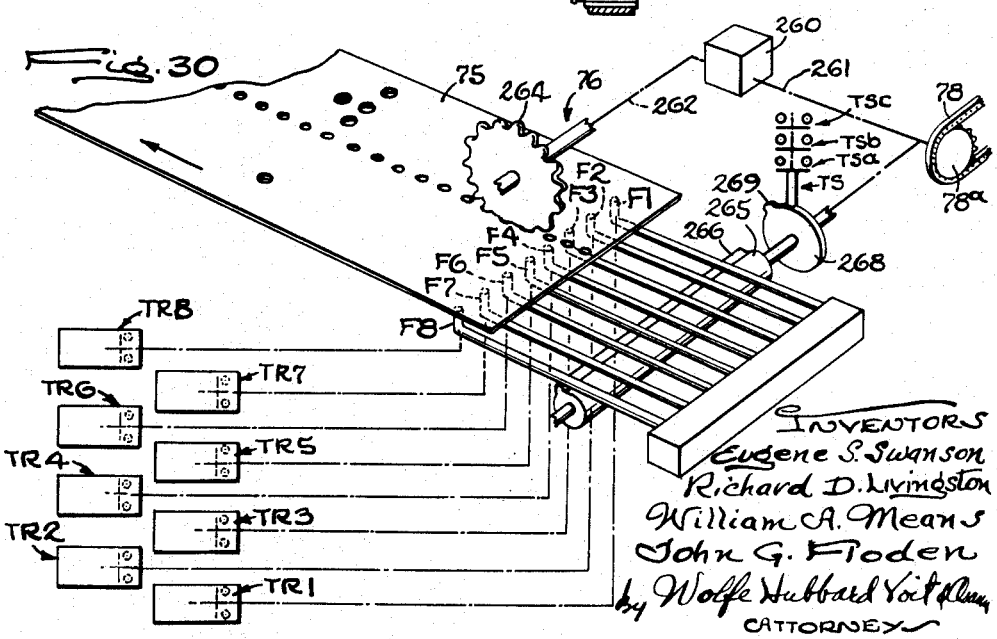

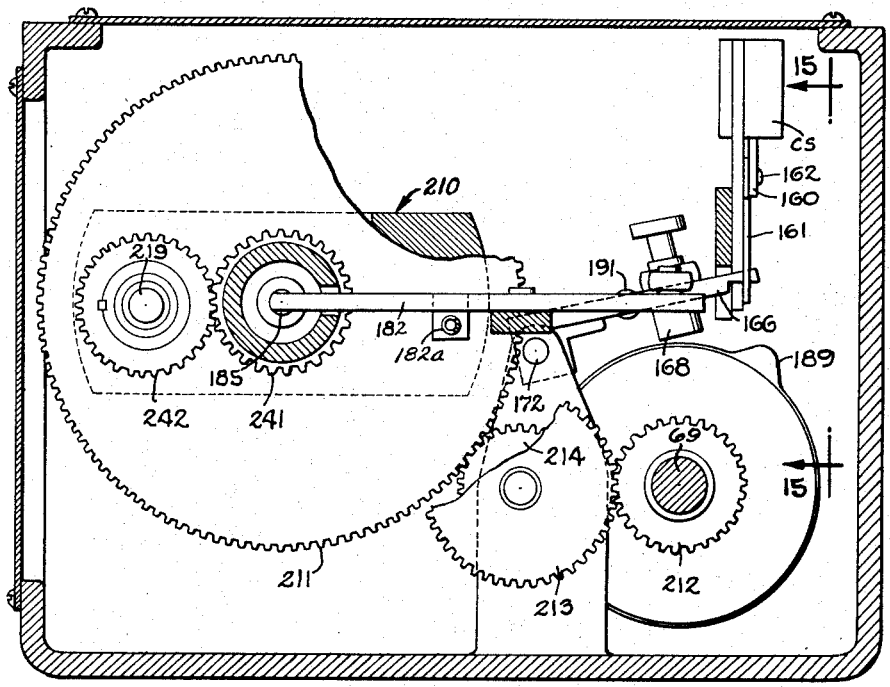
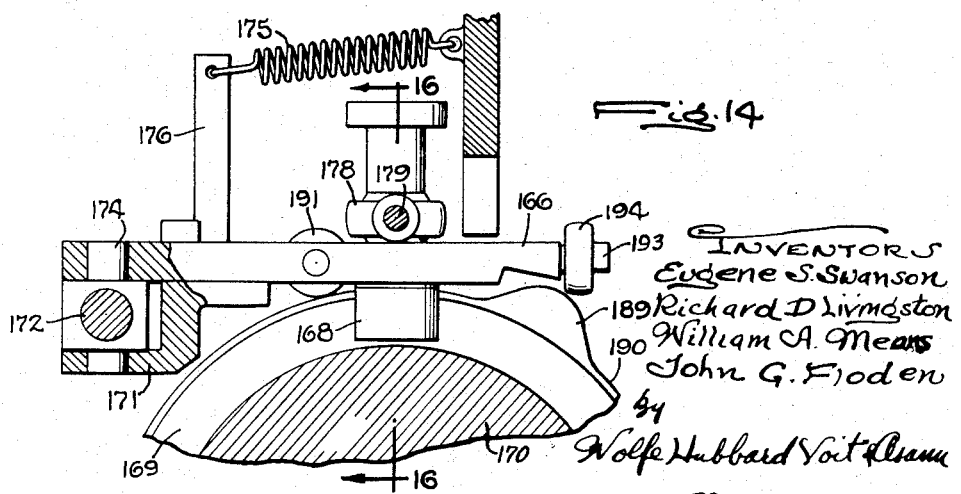

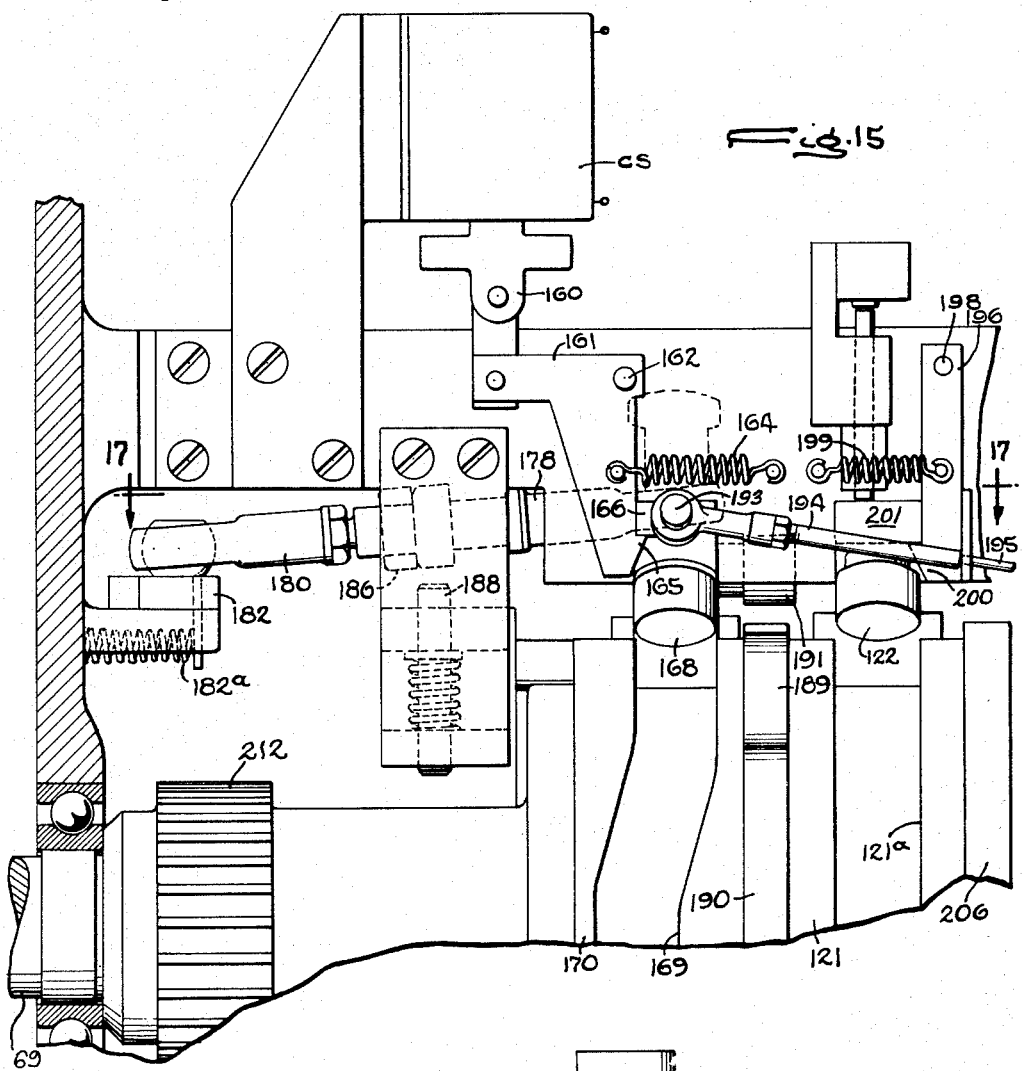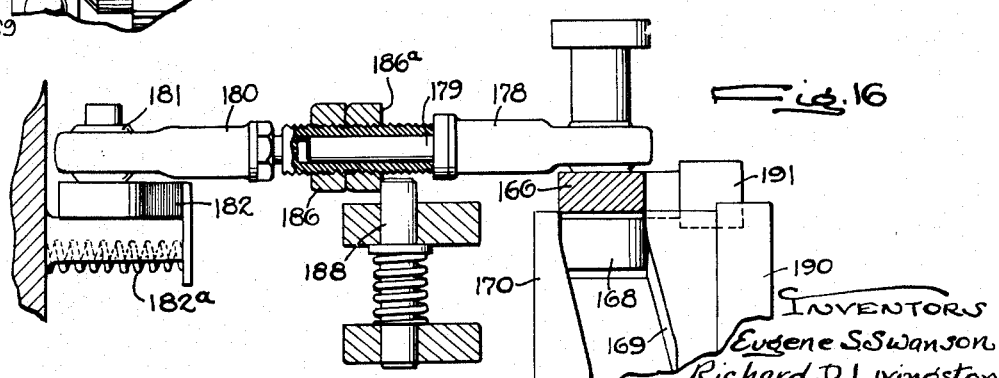

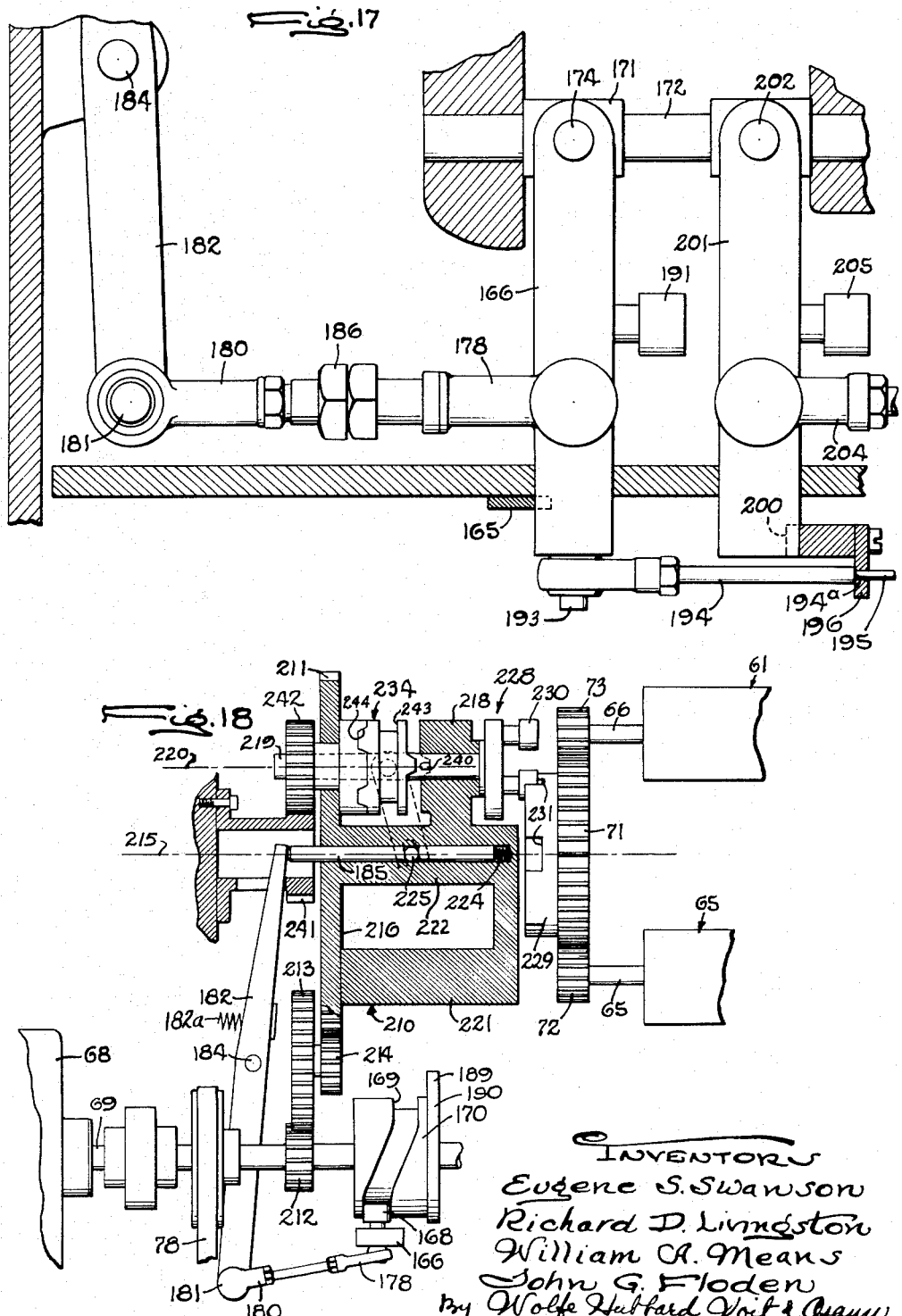

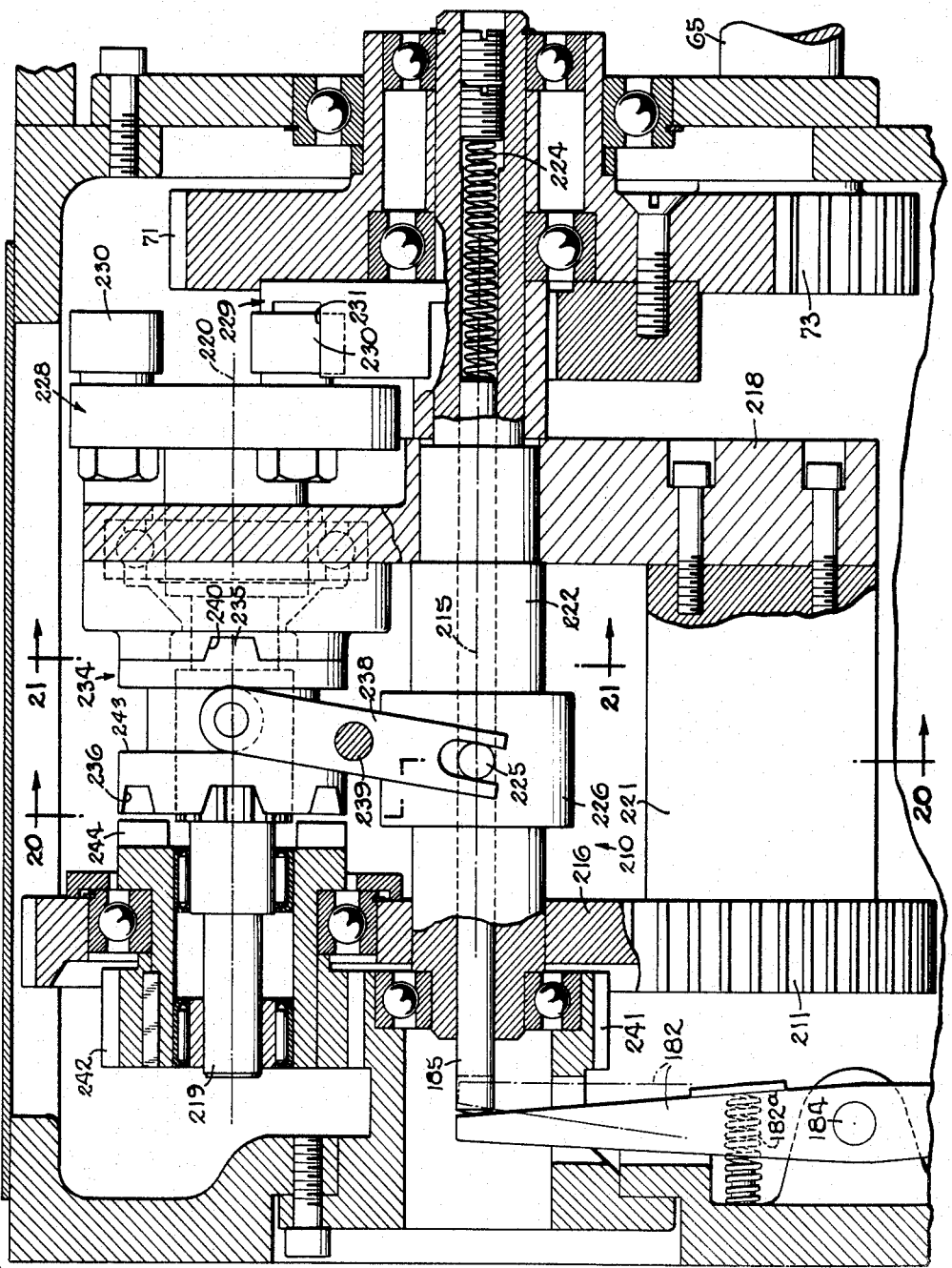

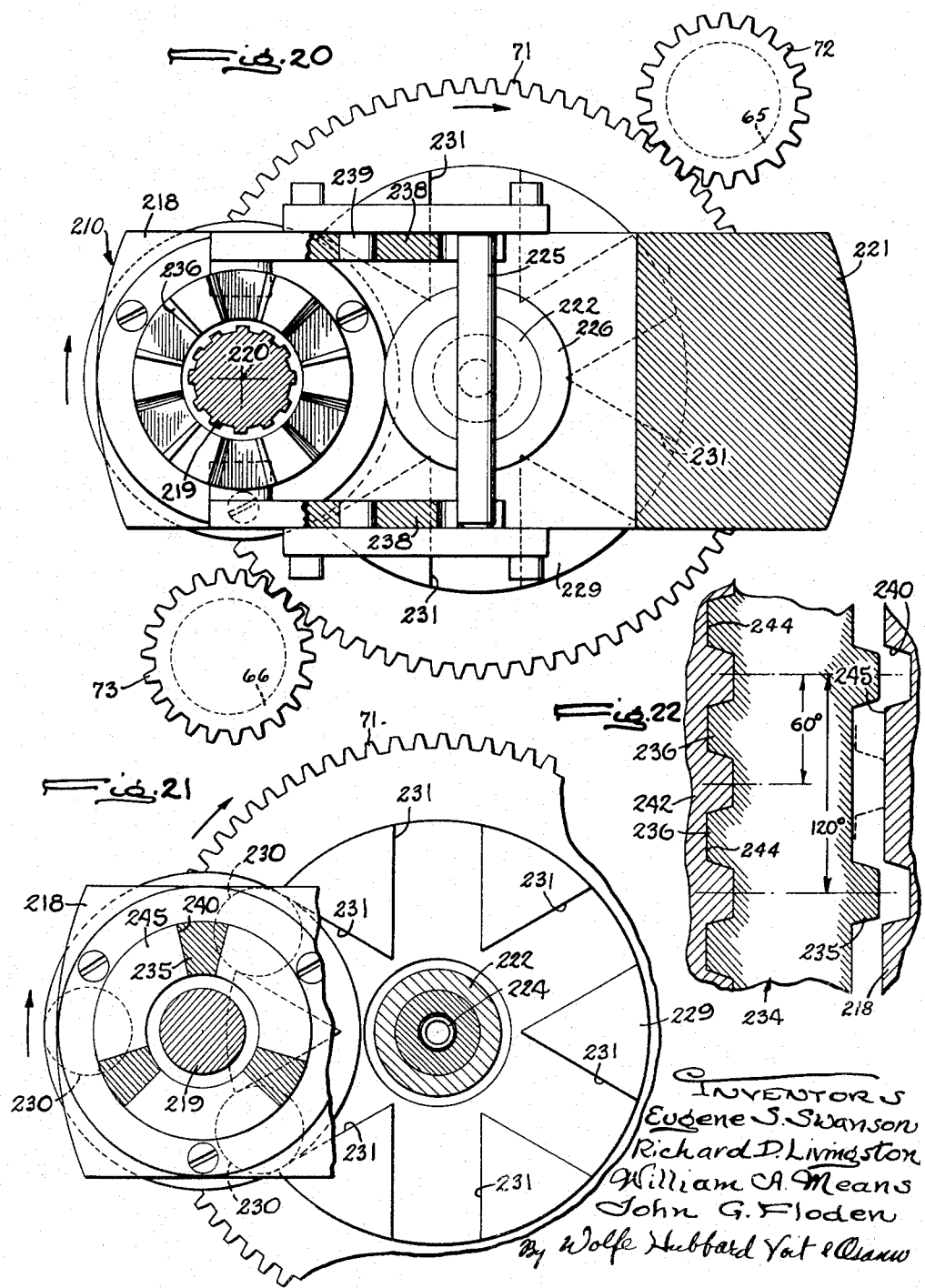

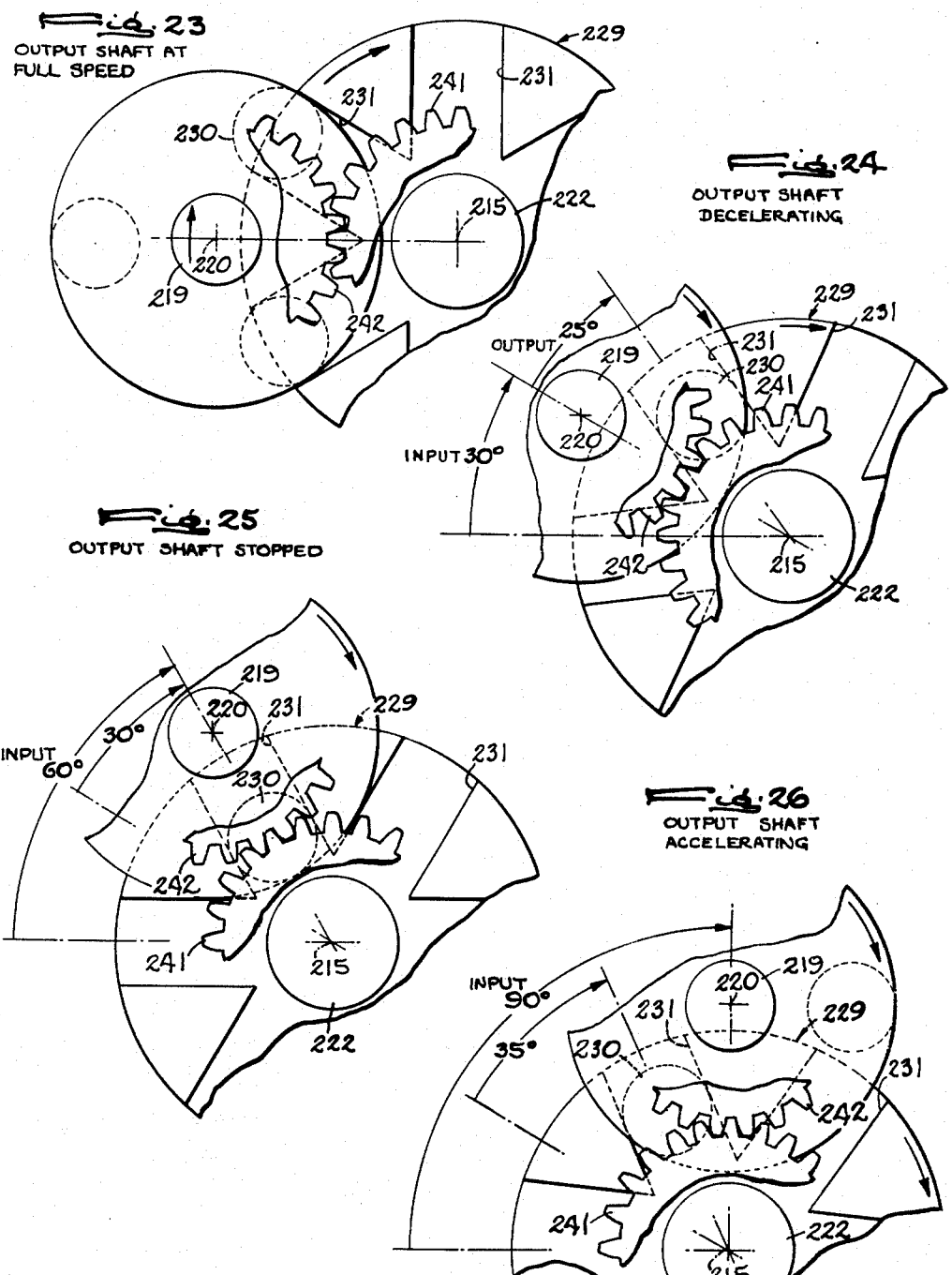

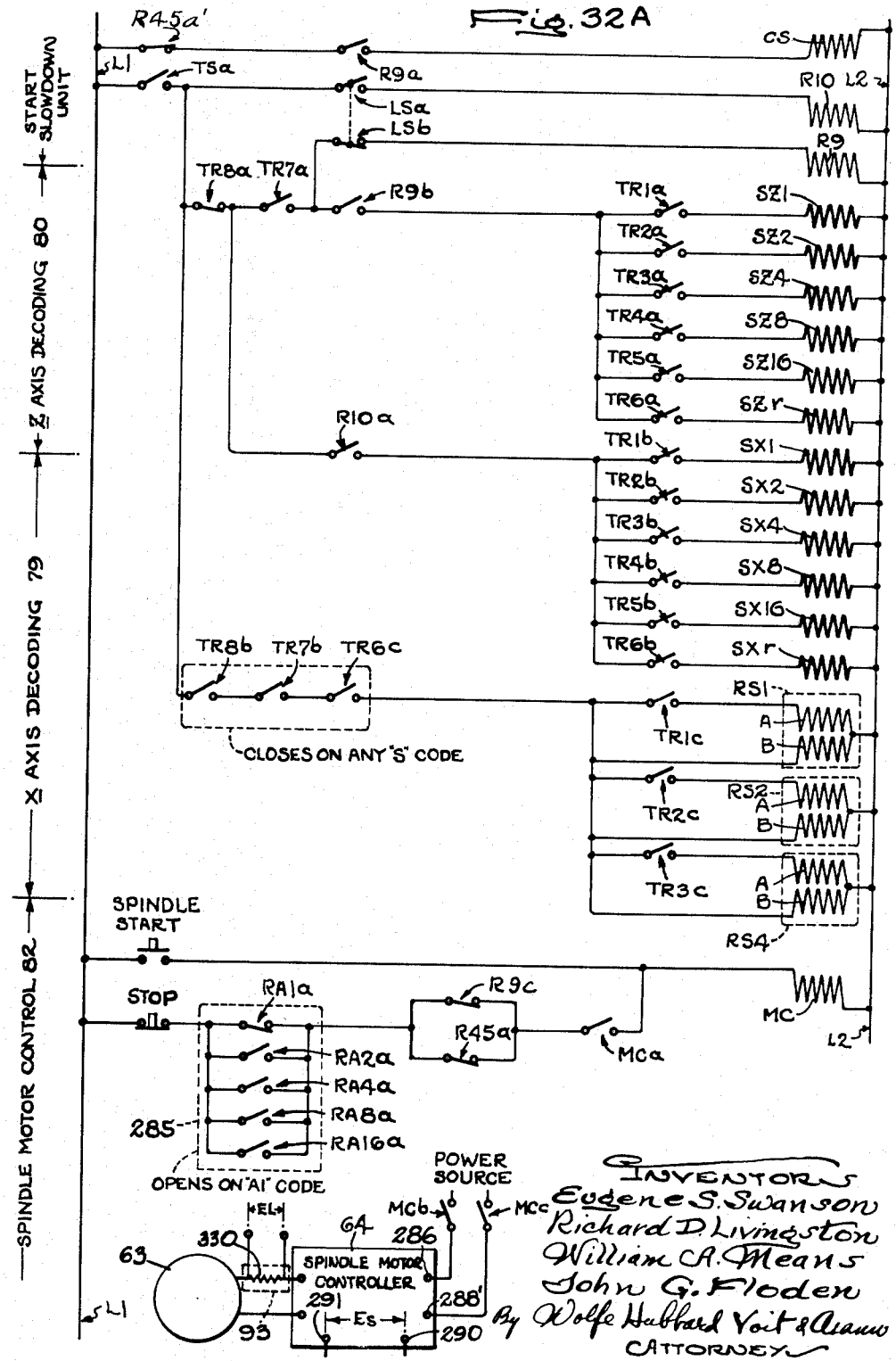

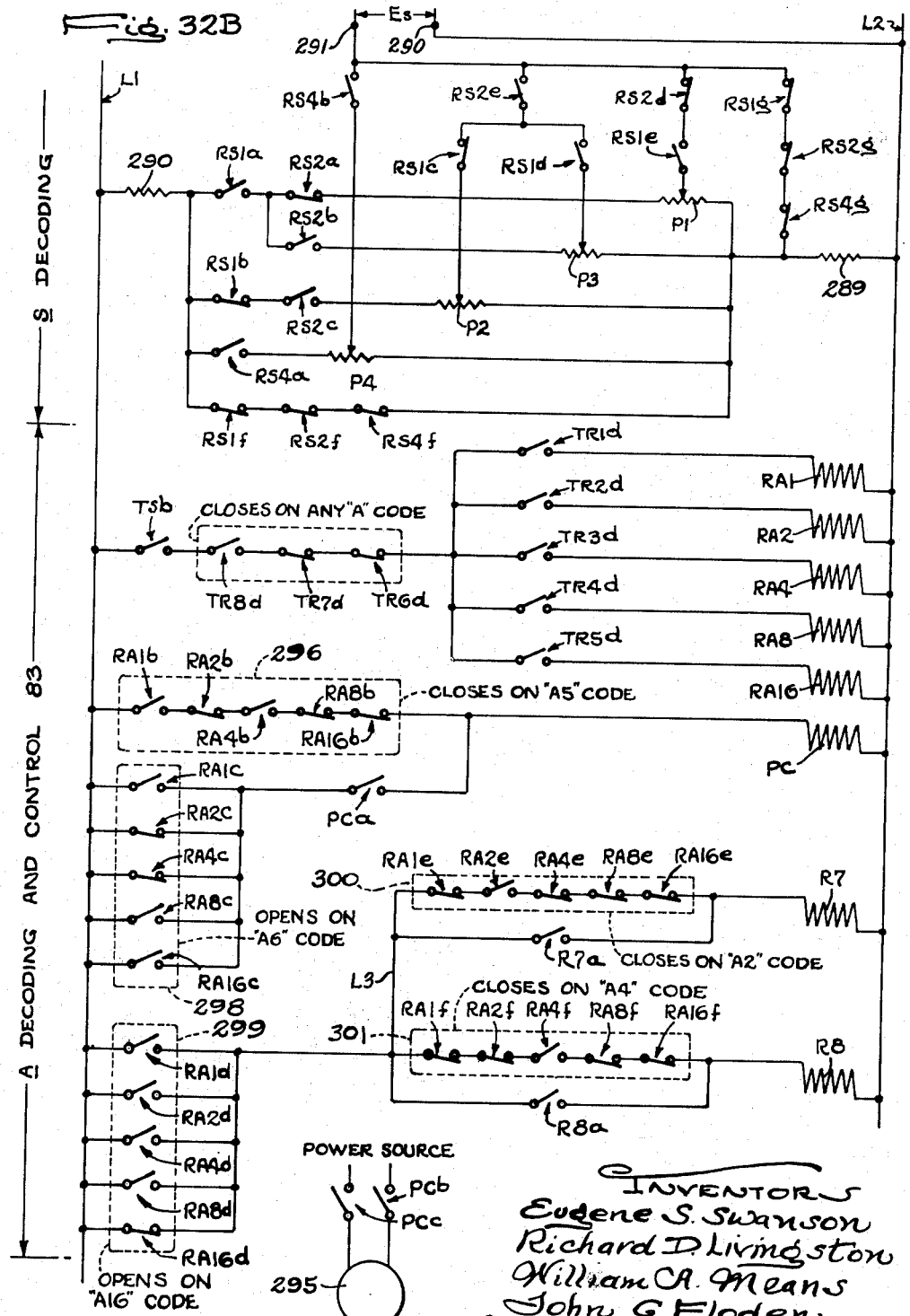

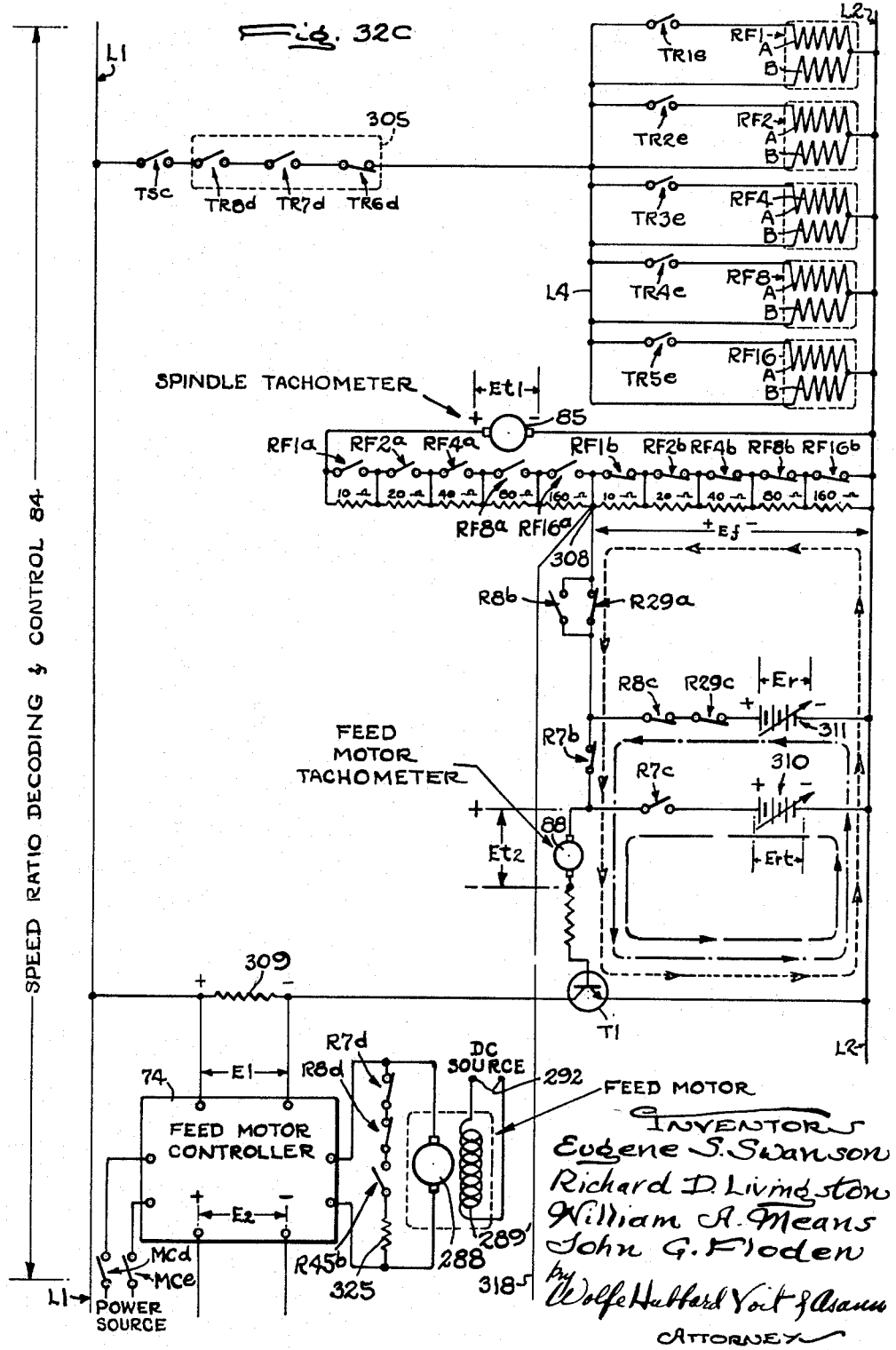

3,190,139
PROGRAMMED MOTION CONTROL SYSTEM
Eugene S. Swanson, Richard D. Livingston, William A. Means, and John G. Floden, all of Rockford, Ill., assignors to Barber-Colman Company, Rockford, Ill., a corporation of Illinois
Filed Sept. 1, 1961, Ser. No. 135,679
32 Claims. (Cl. 74—472)

TABLE OF CONTENTS

| | Column |
|---|---|
| Statement of Objects and Figure Descriptions | 1-4 |
| Illustrative Environment and General Description | 4 |
| Simplified, Exemplary Motion Program | 6 |
| Table I | 7 |
| Table II | 8 |
| Multi-Ratio Transmissions and Shifting Mechanisms | 8 |
| Table III | 12 |
| Selective Clutch Shifting Mechanism | 13 |
| Operation of selective clutch shifting mechanism | 15 |
| Slowdown Unit and Shift Actuation Means | 16 |
| Shift actuating mechanism | 17 |
| The slowdown unit | 19 |
| Controlled Transport of the Elongated Record | 24 |
| Control Circuits | 28 |
| Z and X decoding and shifting controls | 30 |
| Spindle speed selection | 31 |
| Other auxiliary function decoding and control | 32 |
| F decoding and feed ratio selection | 34 |
| Reduction of feed input velocity for shifting, and automatic inhibiting thereof | 38 |
| Automatic load control | 42 |
| Résumé of Operation | 44 |

The present invention relates in general to the precise control of successive increments of motion imparted to movable members in accordance with pre-established programs. More particularly, the invention pertains to the control of motions of movable members from a record such as a punched tape, having indicia thereon representing the velocities, lengths, and directions of successive increments of movement. Although the invention will find a variety of diverse uses, it is especially advantageous in the control of relative motions between a cutter and a workpiece in machine tools, and it will be described herein as employed in that environment.

There have been developed within the past decade a variety of so-called numerical control systems for machine tools or the like. In most of those systems, the numerical data representing both the end points and velocities of successive motion steps have been applied in digital form as successive "blocks" on a punched paper tape or similar record. One block of the tape is read, the data thereon stored and converted into analogue form and the motions carried out by a closed loop servo drive with position feedback. Alternatively, the actual positions of the movable machine tool members are converted into a digital signal representation which is fed back for comparison with stored digital data. At the completion of each motion step, a signal is generated to initiate the reading of the next block of data on the punched tape. These systems have not only involved control components to start and stop a tape reader, but also require digital data storage components, feed-back servo drives, and some form of digital-to-analogue or analogue-to-digital converters. To say the least, such control apparatus is extensive, complex, expensive, and subject to frequent failure or breakdown for any of a number of reasons.

The general aim of the present invention is to do away with the complex, expensive, and difficult-to-maintain arrays of equipment which have characterized previous motion control arrangements, and to provide instead a relatively simple and rugged system which affords precise control of motions along one or more axes, in accordance with pre-established programs represented on records, e.g., punched tapes.

One object and advantage of the present invention is the elimination of any feedback means for motion control, as well as any digital-to-analogue or analogue-to-digital converter.

It is a related object of the invention to make possible the control of successive increments of motion along one or more axes from an elongated record having a simple format easily prepared and read by virtue of the fact that the distance between two successive sets of indicia on the record is caused to determine precisely the length of one increment of motion. In other words, the present invention will eliminate the need to numerically represent on a record device the lengths of successive increments, and will correspondingly eliminate the need to read and store electrical signals which numerically represent incremental lengths.

In this connection, it is also an object of the invention to assure that the total or aggregate movement imparted to a movable member is precisely equal to the sum of successive increments of motion, the length of each increment being determined by the distance between two sets of indicia on an elongated record.

Still another object is to bring forth such a system in which motions along two or three axes may be simultaneously controlled so as to produce a resultant movement at desired angles in a plane or in space. This provides for the cutting of tapered surfaces on workpieces, or the formation of curved surfaces by a series of short, straight chords which approximate the desired curve.

The foregoing is accomplished as hereinafter described by utilizing multi-ratio transmissions having positive clutches so that the extent of output motion is always directly related to the input motion according to the selective drive ratio established by position pattern to which the clutches are shifted. To change the drive ratio by shifting the positive clutches would normally entail either stopping the input drive, or the loss of some indeterminate amount of input motion. One object of the present invention is to accomplish shifting of positive clutches in a transmission while a main shaft supplying power thereto continues to rotate, and to cause the transmission input shaft to lose a predetermined angle of rotation relative to the power shaft, so that the total rotational output of the transmission is always known and determined according to the rotation of the power shaft.

It is a related object of the invention to provide for shifting of positive clutches in multi-ratio transmission without clash or damage by causing the input shaft to be smoothly decelerated and then accelerated by effecting the transfer of the clutches when such shaft is both at a predetermined angular position and at its lowest or zero speed.

An additional object is to effect slowdown of the transmission input shaft and transfer of positive clutches while a power shaft continues to rotate and gains a predetermined angle relative to the input shaft, and yet to control precisely the total output motion of the transmission by keeping track of or metering the power shaft rotation and allowing or accounting for the extra rotation thereof each time that shifting or transfer of the clutches takes place.

Another object of the invention is to assure that the positive clutches of a multi-ratio transmission are reliably shifted to desired position patterns at the beginning of successive increments of motion represented by indicia on an elongated record, particularly by providing an anticipation character on the record in advance of each set of indicia calling for a change in the transmission ratio, and in response to the reading of that anticipation character, causing a drive motor to be slowed down if, and only if, it is running above a predetermined speed at which the clutches can be safely shifted.

It is also an object of the invention to provide such a motion control system in which the lengths and velocities of successive increments are controlled according to the incremental distances and digital velocity information of an elongated record and in which a variety of auxiliary functions may be produced at different points in the overall program by auxiliary indicia which are applied to the record.

Other objects and advantages will become apparent from the following detailed description taken in conjunction with the accompanying drawings, in which:

FIGURE 1 is a simplified elevational view of a machine tool, specifically a lathe, with which the present invention may, for example, be employed;

FIG. 2 is a diagrammatic illustration, partially in block-and-line form, of a control system embodying the present invention and applied to control the motions of the carriage and cross slide of the lathe;

FIGS. 3A and 3B illustrate the paths and successive increments for a simple, exemplary program of the motion to be executed;

FIG. 4 shows a sample record having spaced sets of indicia thereon representing the successive movements shown in FIG. 3A.

FIG. 5 is a diagrammatic illustration of the two multi-ratio transmissions shown in FIG. 2, together with the slowdown and shifting mechanisms associated therewith;

FIG. 6 is a diagrammatic illustration showing the details of one multi-ratio transmission including the planetary gear sets and shiftable clutches which form the parts thereof;

FIG. 7 is a fragmentary elevational view showing two of the solenoid and latch mechanisms employed to selectively shift positive clutches in the transmissions;

FIG. 7A is similar to FIG. 7, but shows a rocker and pin for a different clutch in one of the transmissions;

FIG. 8 is a perspective illustration of a latched rocker employed in the mechanism of FIG. 7.

FIG. 9 is a vertical section taken substantially along the line 9—9 in FIG. 7 and showing details of the selective clutch-shifting mechanism;

FIG. 10 is a detail view taken in section substantially along the line 10—10 in FIG. 9;

FIGS. 11 and 12 are similar to FIG. 7, but respectively show the operation of the shifting mechanism as a frame is moved forwardly and rearwardly;

FIG. 13 is an end view, partially in section, of the slowdown unit and shifting cams;

FIG. 14 is a fragmentary, enlarged illustration corresponding to a portion of FIG. 13 and showing a cam follower in its engaged position;

FIG. 15 is a fragmentary section taken substantially along the line 15—15 in FIG. 13 and showing details of the cams and solenoid for actuating the slowdown unit and shifting mechanism;

FIG. 16 is a fragmentary detail view taken in section substantially along the line 16—16 in FIG. 14;

FIG. 17 is a fragmentary section taken substantially along the line 17—17 in FIG. 15;

FIG. 18 is a diagrammatic illustration of the slowdown unit employed in association with the multi-ratio transmissions;

FIG. 19 is a vertical section of the slowdown mechanism and illustrates in more detail what is shown diagrammatically in FIG. 18;

Figure 29:
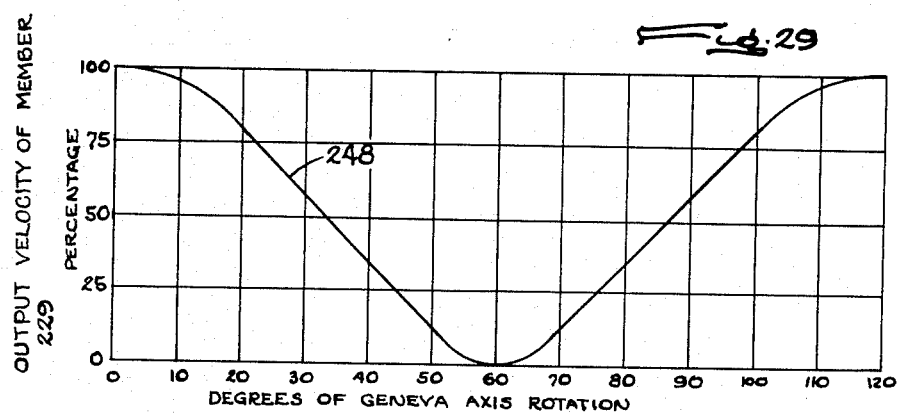
Figure 28:
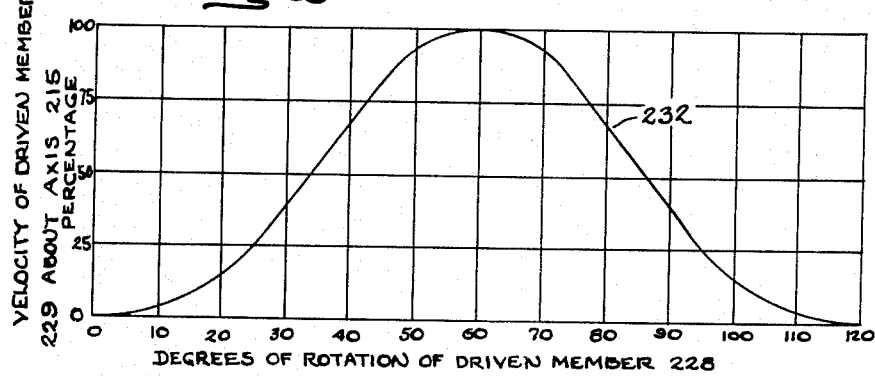

FIGS. 20 and 21 are detail sections taken substantially along the lines 20—20 and 21—21, respectively, in FIG. 19;

FIG. 22 is a developed illustration of the clutch shown in FIG. 19, and which resets automatically after each cycle of 120 degrees rotation;

FIGS. 23–27 are stop-motion views of the Geneva mechanism employed in the slowdown unit during successive stages of one cycle of operation;

FIG. 28 is a graph showing the variation of velocity imparted to the driven member of the Geneva mechanism by the driver during one cycle of operation;

FIG. 29 is a graph showing the variation in the net velocity of the driven member of the slowdown unit, resulting from subtraction of the Geneva motion from the normal motion;

FIG. 30 is a schematic illustration of the tape reader which is shown in block form by FIG. 2;

FIG. 31 is a schematic illustration of a magnetically latched, double coil relay which is employed in the control circuit;

FIGS. 32A, 32B, 32C, and 32D together are a schematic wiring diagram of exemplary electrical controls for the present system.

ILLUSTRATIVE ENVIRONMENT AND GENERAL DESCRIPTION

The present motion control system may be employed in a variety of applications such, for example, as governing the movement of welding or cutting torches, the movement of pens for plotting maps, or in so-called "instrument mechanisms" similar to analogue computers where successive movements of precise length and velocity along one or a plurality of axes are desired. One environment in which the invention will find especially advantageous use is in the control of a machine tool wherein the relative movement between a cutter and a workpiece along two or three axes is to be controlled from a punched tape or the like in order to cut a workpiece automatically to a predetermined shape, size, and contour. For purposes of fully explaining the invention, it will be described below as embodied in a system for controlling the longitudinal and transverse motions of a cutting tool in an engine lathe, so that the desired shape is formed on a workpiece chucked in and continuously rotated by a spindle.

Referring now to FIGS. 1 and 2, a lathe 40 is there diagrammatically shown as having a spindle 41 mounted at one end of a bed 42 and spaced from a tailstock 43. A chuck 44 carried by the spindle is adapted to hold a workpiece 45 which is to be machined by the action of a cutter 46 movable axially and transversely relative to the workpiece. The cutting tool 46 is rigidly fixed in a tool holder 48 supported on a cross slide 49 which is slidable along ways formed on a carriage 50. This back and forth motion of the cross slide 49 is here termed movement along the X axis, with positive motion being toward the front of the lathe, and negative motion being toward the back of the lathe. To produce this motion of cross slide 49 and the cutter 46 along the X axis, the cross slide 49 is equipped with a nut 51 threadably engaged with a lead screw 52 rotated by means of a right-angle drive mechanism 53 disposed on the carriage 50. Input rotation to the drive mechanism 53 is provided by a splined shaft 54 which is integral with or drivingly connected to the output shaft 55 of an X axis multi-ratio feed transmission 56.

The carriage 50 itself is slidably supported on ways formed on the bed 42 so that it has fredom to move axially of the spindle 41 and workpiece 45. This motion is termed motion along the Z axis, the Z+ direction of movement being to the left, and the Z— direction being to the right. Thus, movement of the carriage 50 on the lathe bed and movement of the cross slide 49 on the carriage can produce motion of the cutter 46 both axially and radially of the rotating workpiece 45, these directions of movement being at right angles and being here designated as along the Z and X axes.

To produce controlled motion of the carriage 50 back and forth along the Z axis, it is equipped with a nut 58 threadably engaged with the longitudinal lead screw 59 integrally joined to or drivingly connected with the output shaft 60 of a Z axis multi-ratio feed transmission 61. Not only may the two transmissions 56, 61 be set or shifted to provide any one of a plurality of drive ratios, but they may also be shifted to rotate their output shafts in either forward or reverse directions, so that the cutter 46 is moved either in a positive or negative sense along the X and Z axes.

As here shown, the spindle 41 is driven from a variable speed spindle motor 63 which is energized from a spindle motor controller 64. It will be understood, of course, that instead of a pulley or chain drive between the spindle motor and the spindle itself a variety of other drives including multi-ratio gearing may, if desired, be employed.

To supply power to the input shafts 65, 66 of the respective transmissions 56, 61, a feed motor 68 is connected to drive a main power shaft 69 forming the input to a slowdown unit 70 which will be described in more detail below. For the present, it may be observed that the output member or gear 71 of the slowdown unit drives a pair of gears 72 and 73 which are coupled to or integral with the respective input shafts 65 and 66 of the X and Z axis multi-ratio transmission. The feed motor 68 is preferably of a variable speed type, and is controlled in its speed of operation by a suitable motor controller 74.

In order to coordinate the motions of the movable member or cutter 46, along the X and Z axes according to a predetermined program, an elongated record 75 is transported in synchronism with the main shaft 69 through a reader 76. The latter produces successive sets of signals in the form of contact closure or voltages, each set corresponding to the information represented by one row of indicia on the record. The elongated record may take a variety of forms, but will here be discussed as a punched paper tape passed from a supply reel (not shown) through the reader 76 to a take-up reel (not shown). This feeding movement of the tape 75 through the reader is produced by a direct drive in the form of a non-slip belt 78 trained over pulleys 69a and 78a disposed respectively on the main shaft 69 and the input shaft of the tape reader.

Signals produced by the tape reader 76 are routed over the various channels represented by lines and arrows in FIG. 2. First, signals from the tape reader pass selectively to X and Z axis decoders 79 and 80 which, in turn, supply electrical signals to the transmissions 56, 61 to determine the particular drive ratios to which clutches therein will be shifted. The actual shifting of these transmissions is initiated, as hereinafter described, by the slowdown unit 70 which receives an actuating signal at the proper times from the tape reader 76 and which operates to assure that the transmission clutches are shifted without clash or damage. The slowdown unit 70 performs two important functions, viz., (1) it reduces the input shafts 65, 66 of the two transmissions substantially to zero velocity at the instant the transmission clutches are shifted; and (2) it assures that an exactly predetermined angle of rotation of the transmission input shafts will be lost, relative to rotation of the main shaft 69, when each cycle of slowdown and clutch shifting occurs.

A number of other auxiliary but advantageous control components also receive signals from the tape reader 76 under certain circumstances which will be described below in greater detail. Briefly stated, the speed of the spindle motor 63 may be selectively set to any one of a plurality of different preselected values at different points in the overall program of motion by signals derived from the tape 75 and fed from the tape reader 76 to a spindle speed selector 82. Secondly, various auxilary devices, such as coolant pumps, indicator lights, and the like, may be turned on or off at different desired points in a program of motion by signals derived from the tape 75 and passed to an auxiliary function decoder 83.

Thirdly, the speed of the feed motor 68 may be selectively changed to different proportions of the speed of the spindle motor 63 by signals derived from the tape 75 and passed to a feed ratio selector 84. The latter receives speed-representing signals from a tachometer 85 driven by appropriate means such as a belt 86 from the spindle motor 63, and also receives a speed-representing signal from a second tachometer 88 driven by a belt 89 so that its output is directly related to the speed of the main shaft 69. The feed ratio selector in response to these various input signals produces an output signal which is transferred as the controlling input to the feed motor controlled 74.

Fourthly, signals derived in the reader 76 from the tape 75 are, in anticipation of a shifting operation, transmitted to a "slowdown to shift" unit 90 which, acting through an "inhibit slowdown" unit 91 and the feed ratio selector 84 causes the feed motor controller 74 to reduce the speed of the feed motor 68. Finally, a spindle load control 92, receiving its input from a spindle load senser 93, acts on the controller 74 to assure automatically that the spindle 41 and its motor 63 are not overloaded by reducing the absolute feed rate of the cutter 46 whenever overloading tends to occur.

The organization and cooperative operation of the various components shown only diagrammatically in FIG. 2 will be described in considerably greater detail by the following portions of the specification. It will become apparent as the description proceeds that by virtue of the particular mechanical organization of certain components and their interconnections through electrical controls that the movable member 46 may be put through any program of successive motion steps along the X and Z axes so as to perform roughing cuts, finishing cuts, tapering, cut-off, and other desired machining operations on the workpiece 45 which are necessary to produce the desired shape and dimensions thereof. These operations are produced automatically from indicia on the punch tape 76 which represents the desired motion program.

SIMPLIFIED, EXEMPLARY MOTION PROGRAM

It will be helpful at the outset to describe a very much simplified program of motion, and indicate how such a program of successive increments of movement is initially represented on an elongated record or punched tape. Referring to FIG. 3A, assume that the workpiece 45 there shown is held in the lathe chuck 44, and that it is desired to move the cutter 46 from the illustrated starting point $a$ so as to take a finishing cut along the paths shown by dotted lines. The tool will first be moved inwardly ($-X$ direction) from point $a$ to point $b$, so that its cutting edge is at the radial position required to cut a desired diameter on the right shank of the workpiece 45. Then, the cutter will be moved to the left ($+Z$ direction) until it reaches point $c$, and so that the surface of the shank is machined to the desired diameter. Finally, the cutter will be moved diagonally from point $c$ to point $d$ by simultaneous outward ($+X$ direction) and leftward ($+Z$ direction) motion so that the resultant motion is at a desired angle, here shown as approximately 26.5° from the Z axis. This results in cutting of a tapered surface on the workpiece 45.

Although the three successive motions of the cutter have been here purposely selected to be relatively simple, it will be apparent from what follows that any desired complex shape or dimension may with the present system be cut from a workpiece, including roughing cuts, finishing cuts, tapers, fillets, and cut-offs.

The cutter motions illustrated in FIG. 3A have been shown to a larger scale in FIG. 3B. It will be seen that the cutter is to be moved from the starting point $a$ 1.244 inches inwardly to point $b$, then .981 inch to the left to point $c$, and then simultaneously .510 inch outwardly and 1.020 inches to the left so as to produce the tapered or angled cut between points $c$ and $d$. This series of motions is broken up into five separate distinct increments of movement, as labeled in FIG. 3B, inasmuch as it is desirable to consider continuous motion in one direction as constituted by a multiple of small distances (here .030 inch) followed by a "remainder" of some distance between .001 and .029 inch. Thus, the #1 increment in FIG. 3B is 1.230 inches, constituted by 41 times .030 inch. The #2 increment in FIG. 3B is a remainder of .014 inch, thus making the sum of the #1 and #2 increments equal to 1.244 inches. The #3 and #4 increments have respective lengths of .960 and .021 inch, the former being equal to 32 times the selected small distance of .030 inch. Together two increment lengths equal the desired total of .981 inch. Finally, the #5 increment of motion is constituted by a length of .510 (17 times .030) inch along the X axis and 1.020 (34 times .030) inch along the Z axis.

A sample length of record or punched tape 75 having indicia thereon in the form of punched holes representing the foregoing program of incremental movements is shown in FIG. 4. The tape may be a standard, commercially available paper tape one inch in width and with eight longitudinal columns thereon for receiving character-representing indicia such as punched holes. As shown, the columns are numbered from 1 through 8, from right to left, there being a row of closely spaced feed sprocket holes between the third and fourth columns. The feed sprocket holes are spaced apart lengthwise of the tape by small, uniform distances which will here be referred to as "unit distances" or pitches. Each sprocket hole lies on and defines one transverse row across the tape, and a punched hole may be either present or absent in each of the columns within each row.

Although the coding system for representing various symbols and numbers on the punched tape may vary considerably, the first five columns of the punch tape 75 in the present instance are used to represent any decimal number between 0 and 31 according to the well-known binary system. A hole appearing in any column within a given row is considered to represent a binary "1," and the absence of a hole represents a binary "0." Thus, any transverse row of holes on the tape may represent any number, as shown by the following table:

TABLE I

| Column Number | 5 | 4 | 3 | 2 | 1 | Decimal Value |
|---|---|---|---|---|---|---|
| Binary Value | $2^4$ | $2^3$ | $2^2$ | $2^1$ | $2^0$ | |
| | 0 | 0 | 0 | 0 | 0 | 0 |
| | 0 | 0 | 0 | 0 | 1 | 1 |
| | 0 | 0 | 0 | 1 | 0 | 2 |
| | 0 | 0 | 0 | 1 | 1 | 3 |
| | 0 | 0 | 1 | 0 | 0 | 4 |
| | 0 | 0 | 1 | 0 | 1 | 5 |
| | 0 | 0 | 1 | 1 | 0 | 6 |
| | 0 | 0 | 1 | 1 | 1 | 7 |
| | 0 | 1 | 0 | 0 | 0 | 8 |
| | 1 | 1 | 1 | 1 | 0 | 30 |
| | 1 | 1 | 1 | 1 | 1 | 31 |

The foregoing Table I has not been made complete as to all decimal numbers between 0 and 31 since the code employed is the standard binary notation familar to those skilled in the art.

The sixth, seventh, and eighth columns on the punch tape 75 are employed to receive punched holes which represent alphabetical or sign characters according to a predetermined code, such characters indicating the nature or purpose of the numerical information represented in the first five columns of the same transverse row. The different characters or symbols which are employed in the present instance are set forth in the following table, and in which a "1" represents a hole in the tape and a "0" represents the absence of a hole:

TABLE II

| Column Number | 8 | 7 | 6 | SYMBOL |
|---|---|---|---|---|
| | 1 | 0 | 0 | A |
| | 1 | 1 | 0 | F |
| | 1 | 1 | 1 | S |
| | 0 | 0 | 0 | +X |
| | 0 | 0 | 1 | −X |
| | 0 | 1 | 0 | +Z |
| | 0 | 1 | 1 | −Z |

In Table II, the symbol A stands for "auxaliary" and designates information to be used in controlling auxiliary functions. By the presence or absence of holes in columns 1–5 on a row containing an A symbol in columns 6–8, any code between A0 and A31 may be represented.

The symbol S in Table II stands for "spindle speed" and represents a desired spindle speed selection. Any code between S0 and S31 may be represented by one row of holes on the punched tape, although as here later described only the codes S1–S4 are actually used.

The symbols +X, −X, +Z and −Z represent the four possible directions of movement of the cutter. The symbol Z is designated by a hole in the seventh column of the punched tape while the plus or minus sign is represented by the presence or absence of a hole in the sixth column. A row of holes representing the symbol X always immediately follows a row of holes representing a Z symbol, so that the absence of holes in the seventh and eighth columns may be considered to designate an X character, and the absence or presence of a hole in the sixth column of that row indicates whether the X character is positive or negative.

It will be apparent that a given row on the tape may represent any Z code between Z0 and Z31, and that any of these may be positive or negative. Similarly, a given row on the punch tape may represent a positive or negative X code between X0 and X31.

As will be explained below, an X or Z code not only represents the direction, i.e., plus or minus, along the respective axes but also represents the desired ratio to which the corresponding transmission is to be set during the succeeding increment of motion. Stated another way, a code such as +Z003 designates that the travel of movable element or cutter 46 is to be to the left along the Z axis for the following increment of movement, and that the rate of movement is to be 0.003 inch for each predetermined amount of angular rotation (here ½ revolution) of the Z axis transmission input shaft 66. Thus, any net drive ratio between 0 and .031 inch per half revolution of the transmission input shaft may be imparted to the cutter 46 either along the X or Z axes, as will become apparent from the following detailed description of the two transmissions 56 and 61.

The exemplary length of tape in FIG. 4 carries indicia in the form of punched holes which represent not only the successive movements illustrated in FIG. 3B, but also additional information representing desired spindle speeds, feed ratios, and other information. The first two groups of rows of punched holes on the tape 75 represent spindle speed and feed ratio selection information, and the five succeeding groups of indicia correspond to the five increments of motion illustrated by FIG. 3B. The format of these indicia on the punch tape and the operations which they produce will be more fully explained as the following description proceeds.

MULTI-RATIO TRANSMISSIONS AND SHIFTING MECHANISMS

Referring now to FIG. 5, the X and Z multi-ratio transmissions 56 and 61 are there shown as each comprising two differential units 56a, 56b and 61a, 61b drivingly interposed between the respective input shafts 65, 66 and the respective output shafts 55, 60. The two input shafts 65 and 66 are driven in unison from the gear 71 which forms the output member of the slowdown unit 70, the latter normally transmitting rotational drive from the feed motor 68 and the continuously rotating main shaft 69.

Because the X and Z axis transmissions 56 and 61 are identical, a description of one will suffice for both. Referring to FIG. 6, the Z axis transmission 61 comprises a plurality of planetary gear sets associated with selectively shiftable, two-position positive clutches which afford a total of 32 possible drive ratios between the input shaft 66 and the output shaft 60, as well as a shiftable, two-position clutch which selectively causes the output shaft to rotate in a positive or negative sense relative to the input shaft.

While other configurations of multi-ratio transmissions may be employed, the one here shown in FIG. 6 has associated with its input shaft 66 six positive clutches C1, C2, C4, C8, C16 and Cr. The first five of these clutches are substantially identical, and thus a description of one will suffice for all. Considering the clutch C16, its output member 97 is in the form of a sleeve journaled on the shaft 66 with freedom to rotate relative to the latter, such sleeve having a gear G16 fixed to or integral therewith. Carried by the output member 97 and axially shiftable relative thereto are a pair of diametrically spaced bolts 94 pinned to an axially shiftable element or collar 95. The bolts extend through holes formed in spaced flanges on the member 93, and according to whether the collar 95 is shifted to the right (as shown) or the left, the output member 97 will be locked either to a stationary partition 100 or to a flange 101 integral with the shaft 66, those latter two parts having holes therein to receive the opposite extremities of the bolts 94. Thus, when the clutch C16 is in its "unactuated" or "actuated" states (the former being shown), the output member 97 will be either held stationary or rotationally driven in unison with the input shaft 66. The shiftable element or collar 95 may be shifted axially between its first and second positions by rocking motion of a yoke Y pivoted at 96 and having its extremity engaged with but rotatable relative to the collar.

In like manner, the clutches C1, C2, C3, C4 and C8 all have output members 97 which may be either held stationary or locked to the shaft 66 depending upon whether the collar 95 and bolts 94 associated therewith are shifted to first or second positions, respectively.

The clutch Cr is a selective reversing clutch. That is, a shaft 102, which is rotationally driven in a manner to be explained, carries thereon an axially shiftable collar 103 which may be shifted to the right (as shown) or the left by rocking movement of a yoke Y pivoted at 105. When the member 103 is in the position illustrated, a gear 107 integral therewith meshes with an idler 106 which, in turn, drives a gear 108 fixed to the output shaft 60. This drive connection will be termed the "forward" or positive drive direction. On the other hand, if the shifting yoke Y is rocked counterclockwise about its pivot 105 to shift the collar 103 to the left, then the gear 107 will mesh directly with and drive a second gear 109 which is also fixed to the output shaft 60. Thus, under these circumstances the output shaft 60 will be driven in the opposite direction even though the shaft 102 continues to rotate in the same direction. By their relative diameters and numbers of teeth, the drive ratio between the shaft 102 and the output shaft 60 afforded by the gears 106, 107, 108 and 109 will be the same whether the collar 103 is shifted to its "forward" or "reverse" positions.

From what has been said, it will be apparent that the plurality of gears G1, G2, G4, G8 and G16 are formed on the respective output members of the clutches C1, C2, C4, C8 and C16. Those gears may either be held stationary or rotated in unison with the input shaft 66. These gears each form one input to an array of tandemly-connected planetary gear sets, the last of which drives the shaft 102 and thus drives the output shaft 60 through the reversing clutch Cr.

The first differential gear unit 61a is a compound set of differential gears comprising first, second and third input members or sun gears A, E and J which are respectively driven from the gears G1, G2 and G16 through gears L, M and O. The output shaft 110 for the first planetary gear unit 61a is integral with a sun gear F. This latter sun gear is coupled to the input sun gear J by a planet gear couplet H, N which is journaled for bodily movement with, but rotation relative to, a planet carrier K. The sun gear A meshes with an idler gear B also journaled on the planet carrier K, and the idler B in turn is coupled to a sun gear E by a planet gear couplet C, D carried by and rotatable relative to the planet carrier K. This compound differential unit 61a, therefore, has three inputs formed by the gears G1, G2 and G16, and has a single output formed by the gear F and a shaft 110 integral therewith.

The second planetary unit 61b is identical to the first, although its first input is formed by the output of the first unit. That is, the first input for the unit 61b is constituted by the shaft 110 and a sun gear J2 integral therewith. The remaining two inputs to the second unit 61b are constituted by sun gears A2 and E2 which are integral with gears L2 and M2, respectively, meshed with and driven from the gears G4 and G8 associated with the clutches C4 and C8. The output of the second planetary gear unit 61b is formed by the sun gear F2 and the shaft 102 which is integral therewith. Thus, the two gear units 61a and 61b are connected in tandem and together form one planetary multi-ratio transmission having five input members G1, G2, G4, B8 and G16 which may individually be held stationary or driven in unison with the input shaft 66. This means that the five input sun gears A, J, E, A2 and E2 may all either be held stationary so as to have zero velocity, or may be driven at a predetermined ratio in speed relative to the speed of the input shaft 66, depending upon the ratios of the gears which connect the latter shaft to the input sun gears when the respective clutches are engaged.

In order to make clear just how the multi-ratio planetary transmission shown in FIG. 6 can be made to selectively produce any one of thirty-two possible drive ratios between 0 and .031 inch of travel of the carriage 50 (FIG. 2) per half revolution of the input shaft 66, it may be observed that analysis by known techniques (and which will not be repeated here in the interests of brevity) will show that the speed $\omega_F$ of the output 110 of the first compound differential unit 61a may be expressed in terms of the speeds $\omega_A$, $\omega_J$ and $\omega_E$ of the respective sun gears A, J and E. The relationship may be expressed by the equations:

$$\omega_F = \frac{\omega_E - \omega_A\left(\frac{A}{C}\times\frac{D}{E}\right)}{1-\frac{A}{C}\times\frac{D}{E}}\cdot\left(1-\frac{J}{H}\times\frac{G}{F}\right)+\omega_J\times\frac{J}{H}\times\frac{G}{F} \quad (1)$$

$$\omega_F = \omega_J\left(\frac{J}{H}\times\frac{G}{F}\right)+\omega_E\frac{\left(1-\frac{J}{H}\times\frac{G}{F}\right)}{\left(1-\frac{A}{C}\times\frac{D}{E}\right)} -\omega_A\left(\frac{J}{H}\times\frac{G}{F}\right)\frac{\left(1-\frac{J}{H}\times\frac{G}{F}\right)}{\left(1-\frac{A}{C}\times\frac{D}{E}\right)} \quad (2)$$

In the foregoing equations, the letter symbols without subscripts represent the number of teeth or the diameter of the respective gears, and the $\omega$ symbols represent rotational speeds of the respective gears identified by letter subscripts. Assuming that the various gears shown in FIG. 6 have the numbers of teeth there indicated in parentheses, then it will be apparent that $$\frac{J}{H} \times \frac{G}{F} = \frac{32}{32} \times \frac{26}{39} = \frac{2}{3} \qquad (3)$$

and that $$\frac{A}{C} \times \frac{D}{E} = \frac{44}{22} \times \frac{44}{44} = -2 \qquad (4)$$

The minus sign appearing at the right in Equation 4 results from direction reversal produced by the idler gear B.

Substituting the numerical values of gear teeth or diameter ratios from Equations 3 and 4 into Equation 2 we obtain:

$$\omega_F = \frac{2}{3}\omega_J + \frac{1}{9}\omega_E + \frac{2}{9}\omega_A \qquad (5)$$

Now inasmuch as the input speed of the sun gear J2 in the second planetary unit is the same as the output speed $\omega_F$ of the first unit, and since the second gear unit is exactly like the first, the output speed of the final gear F2 (and of the shaft 102) may thus be expressed by an equation similar to Equation 5 in terms of the three input speeds, viz.:

$$\omega_{F2} = \frac{2}{3}\omega_F + \frac{1}{9}\omega_{E2} + \frac{2}{9}\omega_{A2} \qquad (6)$$

Substituting $\omega_F$ from Equation 5 into Equation 6:

$$\omega_{F2} = \frac{12}{27}\omega_J + \frac{2}{27}\omega_E + \frac{4}{27}\omega_A + \frac{3}{27}\omega_{E2} + \frac{6}{27}\omega_{A2} \qquad (7)$$

It will be apparent from FIG. 6 that a particular number of gear teeth or a particular ratio of diameters are assigned to the gears G1, G2, G4, G8 and G16 which mate with the gears L, M, L2, M2 and O. Thus the respective drive ratios from the shaft 66 to the five input sun gears when the five clutches C16, C1, C2, C4 and C8 are engaged have the values 4:3, 1:2, 1:2, 4:3 and 4:3, respectively. Thus, assuming that all the clutches are actuated and that the input shaft 66 is rotating at a speed $\omega_i$, the speed of the different input gears will be:

$$\omega_J = \frac{4}{3}\omega_i \qquad (8)$$

$$\omega_E = \frac{1}{2}\omega_i \qquad (9)$$

$$\omega_A = \frac{1}{2}\omega_i \qquad (10)$$

$$\omega_{E2} = \frac{4}{3}\omega_i \qquad (11)$$

$$\omega_{A2} = \frac{4}{3}\omega_i \qquad (12)$$

Putting these values into Equation 7, the speed $\omega_{F2}$ of the final output gear F2 (and of the shaft 102) may be expressed:

$$\omega_{F2} = \frac{16}{27}\omega_i + \frac{1}{27}\omega_i + \frac{2}{27}\omega_i + \frac{4}{27}\omega_i + \frac{8}{27}\omega_i \qquad (13)$$

The five successive terms on the left side of Equation 13 are contributed by drive through the respective clutches C16, C1, C2, C4 and C8. If any of these clutches is disengaged so that it holds the corresponding sun gear stationary, the corresponding term in Equation 13 becomes zero. Thus, the ratio of drive $\omega_{F2}/\omega_i$ between the input shaft 66 and the output shaft 60 will have the value:

$$\frac{\omega_{F2}}{\omega_i} = k[1(C1) + 2(C2) + 4(C4) + 8(C8) + 16(C16)] \qquad (14)$$

In the foregoing equation, the symbol $k$ is simply a factor of proportionality, and the symbols which appear in parentheses have values of either 0 or 1 depending upon whether the corresponding clutch is respectively de-actuated or actuated, i.e., its output member 93 held stationary or drivingly connected to the shaft 66. Of course, the drive ratio $\omega_{F2}/\omega_i$ is not affected by the shifting of the reverse clutch $C_r$, the latter determining only whether the output shaft 60 rotates in a positive or negative direction relative to the input shaft 66.

To give a specific example, the total ratio of the drive between the input shaft 66 and the carriage 50 (FIG. 2) is made in the present instance such that when $\omega_F/\omega_i$ equals 1 (i.e., only the clutch C1 is actuated), then the carriage 50 will be moved .001 inch for each half revolution of the input shaft 66. This means that as different combinations of the five clutches are engaged, the translation ratio of the displacement of the carriage 50 for each half revolution of the input shaft 66 will be as follows:

TABLE III
1 = actuated clutch
0 = de-actuated clutch

| Code | C1 | C2 | C4 | C8 | C16 | Translation of Carriage In Inches Per ½ Rev. of Shaft 66 |
|------|----|----|----|----|-----|---------------------------------------------------------|
| Z0   | 0  | 0  | 0  | 0  | 0   | .000 |
| Z1   | 1  | 0  | 0  | 0  | 0   | .001 |
| Z2   | 0  | 1  | 0  | 0  | 0   | .002 |
| Z3   | 1  | 1  | 0  | 0  | 0   | .003 |
| Z4   | 0  | 0  | 1  | 0  | 0   | .004 |
| Z5   | 1  | 0  | 1  | 0  | 0   | .005 |
| Z6   | 0  | 1  | 1  | 0  | 0   | .006 |
| Z7   | 1  | 1  | 1  | 0  | 0   | .007 |
| Z8   | 0  | 0  | 0  | 1  | 0   | .008 |
| Z9   | 1  | 0  | 0  | 1  | 0   | .009 |
| Z10  | 0  | 1  | 0  | 1  | 0   | .010 |
| Z11  | 1  | 1  | 0  | 1  | 0   | .011 |
| Z12  | 0  | 0  | 1  | 1  | 0   | .012 |
| Z13  | 1  | 0  | 1  | 1  | 0   | .013 |
| Z14  | 0  | 1  | 1  | 1  | 0   | .014 |
| Z15  | 1  | 1  | 1  | 1  | 0   | .015 |
| Z16  | 0  | 0  | 0  | 0  | 1   | .016 |
| Z17  | 1  | 0  | 0  | 0  | 1   | .017 |
| Z18  | 0  | 1  | 0  | 0  | 1   | .018 |
| Z19  | 1  | 1  | 0  | 0  | 1   | .019 |
| Z20  | 0  | 0  | 1  | 0  | 1   | .020 |
| Z21  | 1  | 0  | 1  | 0  | 1   | .021 |
| Z22  | 0  | 1  | 1  | 0  | 1   | .022 |
| Z23  | 1  | 1  | 1  | 0  | 1   | .023 |
| Z24  | 0  | 0  | 0  | 1  | 1   | .024 |
| Z25  | 1  | 0  | 0  | 1  | 1   | .025 |
| Z26  | 0  | 1  | 0  | 1  | 1   | .026 |
| Z27  | 1  | 1  | 0  | 1  | 1   | .027 |
| Z28  | 0  | 0  | 1  | 1  | 1   | .028 |
| Z29  | 1  | 0  | 1  | 1  | 1   | .029 |
| Z30  | 0  | 1  | 1  | 1  | 1   | .030 |
| Z31  | 1  | 1  | 1  | 1  | 1   | .031 |

In summary, the Z axis multi-ratio transmission 61 may be set to produce any one of thirty-two possible overall drive ratios between its input shaft 66 and its output shaft 60. Thus, any one of thirty-two translation ratios (in mils per half revolution) between the input shaft 66 and the carriage 50 may be selectively obtained. The clutches C1, C2, C4, C8 and C16 need only be actuated in a proper combination or pattern (according to Table III) to produce any one of these drive ratios. It is important to observe, also, that one of the drive ratios is zero, meaning that the carriage 50 will remain stationary (and, indeed, be locked) even though the input shaft 66 continues to rotate when all of the clutches are in their de-actuated or disengaged positions. Moreover, the direction of movement (+ or −) may be determined simply by shifting the clutch Cr to one position or the other.

The X axis transmission is identical to the Z axis transmission. Without further comment, it will be understood that by setting any of the five clutches therein to a particular combination, the cross slide 49 (FIG. 2) may be translated in any rate between 0 and .031 inch per half revolution of the input shaft 65. Moreover, the cross slide 49 may be driven in a positive or negative sense depending upon whether the reversing clutch in the X axis transmission 56 is set to its forward or reverse position.

SELECTIVE CLUTCH SHIFTING MECHANISM

In accordance with one feature of the present invention, provision is made quickly and simultaneously to shift the six clutches in each of the two transmissions 56 and 61 to any desired pattern of actuation, and thus to set each transmission to any one of its several possible drive ratios. Moreover, the particular clutches which are to be shifted to their actuated positions are determined in the first instance by a set of electrical signals which represent the desired drive ratio.

The clutch shifting mechanism for accomplishing these functions is associated with the twelve shifter yokes Y shown in FIG. 5. As previously noted, these yokes are movable about pivot supports between clockwise and counterclockwise positions, thereby moving the respective clutch elements or clutch bolts to first or second positions. Since all of the shifter yokes and the mechanisms associated therewith are substantially identical, that one associated with the clutch C16 will first be described. As shown best in FIG. 9, the shifter yoke Y is carried by a pintle 96 which is journaled in a stationary frame member 115, the yoke having a U-shaped portion 116 which engages the collar 95 of the clutch C16 in order to shift it and the bolts 94 fixed thereto axially between their first and second positions. Rigid with the U-shaped portion 116 are a pair of vertically spaced projections 118, 119.

To selectively control or set the clutch yoke Y in its clockwise or counterclockwise position, a shifting frame 120 (FIGS. 5, 7 and 9) extends alongside the projections 118, 119 of all of the yokes. This frame 120 is mounted for longitudinal sliding movement relative to a stationary cocking bar 142 (FIG. 10), and may be reciprocated to the left (FIGS. 6 and 7) to a first position, then toward the right (to a second position) after which the frame is returned to the centered or home position. Such a reciprocatory cycle of motion may be imparted to the frame 120 by means of a rotating barrel cam 121 (FIG. 5) having a selectively engaged follower 122 mechanically connected to one end of the frame. As will be detailed below, the follower 122 may be selectively dropped into engagement with the cam 121 and then removed therefrom automatically after the frame has been translated first to the left (as viewed in FIG. 5) and then back to the right.

The shifting frame 120 has inturned upper and lower flanges 124, 125 (FIG. 9) apertured to carry a plurality of members or pins 127 movable back and forth between the first and second positions (up or down) relative to the frame. There is one such pin adjacent the upper and lower projections 118, 119 of each clutch yoke Y, and a particular one of these pins associated with the clutch C16 will be described in connection with FIGS. 7–12.

As shown in FIGS. 7 and 9, the pin 127 (i.e., the one in the upper portion of the figure) is biased toward its first or upper position by means such as a compression spring 128 interposed between the flange 125 and a collar 129 formed on the pin. However, the pin 127 may be shifted downwardly to its second position by means of a T-shaped rocker 130 (FIGS. 7 and 8) pivoted on the outer side of the frame 120 by a pin or screw 131 and having an inturned arm 132 projecting through an aperture 133 in the frame to engage the upper surface of the pin collar 129. When the rocker 130 is turned clockwise to the position shown in FIG. 7, the arm 132 moves the pin 127 downwardly to its second position.

When the pin 127 is in its first position, it projects upwardly from the frame to engage the upper projection 118 of the associated yoke Y when the frame 120 moves towards the left; and the lower end of that pin is substantially flush with the shifting frame flange 125, so that it will pass freely by without engaging the lower yoke projection 119. On the other hand, when the pin 127 is in its second or lowered position (FIG. 11), its upper extremity will clear the upper yoke projection 118, and its lower extremity will engage the lower yoke projection 119 as the frame 120 moves to the left. Thus, if the pin is in its upper position as the frame 120 moves to the left, the yoke Y will be rocked to its counterclockwise position. Alternatively, if the pin 127 is in its lower position as the frame 120 moves to the left (FIG. 11), its lower extremity will engage the yoke projection 119 and rock the yoke to its clockwise position.

Means are provided to latch the pin 127 in one of its two positions. As here shown in FIG. 7, when the rocker 130 turns to its clockwise position, its upper tip 134 snaps under a latch finger 135 pivoted at 136 to the frame 120 and biased downwardly by a spring 138. To selectively release the latch and permit the spring 128 to raise the pin 127, a solenoid SZ16 is mounted stationary above the latch finger 135 and has a rod 139 depending from its armature with a cross pin 140 projecting beneath that finger. The finger can slide relative to the cross pin as the frame 120 reciprocates. Whenever the solenoid SZ16 is energized and the rod 139 is raised, the latch finger 135 will be raised free of the tip 134 so that the pin 127 is released to its first or upper position.

In order to restore the pin 127 to its lowered or second position as the frame 120 is returned to the right, the stationary cocking bar 142 mounted adjacent the frame 120 is formed with a plurality of slots 143. As the frame 120 and the rocker 130 are moved to the right (FIG. 12) abutment of the lower rocker tip 144 with the right edge of the slot 143 will swing the rocker 130 clockwise, thereby depressing the pin 127 to its lower position and causing the upper tip 134 to snap into engagement with the latch finger 135.

Although the foregoing discussion has been concerned principally with the pin, rocker, latch, and solenoid associated with the clutch C16, it will be apparent from FIGS. 5 and 6 that such assemblies are duplicated and associated with each of the six clutches in the Z axis transmission, as well as with each of the six clutches in the X axis transmission. A single shifting frame 120 carries a first set of six pins 127 on its upper half for the Z axis transmission, and a second set of six pins on its lower half for the X axis transmission. A single stationary bar 142 having spaced slots 143 on its upper and lower edges cooperates with all of the rockers 130 to reset all of the pins 127 to their second or latched positions as the shifting frame moves to the right.

For convenience in following the discussion, the six solenoids associated with the Z axis transmission 61 will be designated SZ1, SZ2, SZ4, SZ8, SZ16 and SZr. The corresponding solenoids of the X axis transmission 56 will be designated SX1, SX2, SX4, SX8, SX16 and SXr.

Because the stationary partitions 100 for the clutches C16, C1 and for the clutches C2, C4 are common (FIG. 6), the bolts 94 for the clutches C1 and C4 must be shifted to the left to be de-actuated or held stationary, whereas the shiftable elements or bolts for the remaining clutches must be moved to the right to be in their "normal" or "de-actuated" positions. Since it is desired that all clutches be shifted to their de-actuated positions (and the clutch $Cr$ to its + position) when the shifting frame 120 moves to the right if none of the solenoids have been previously energized, the rockers 130 for the clutches C1 and C4 are reversed in position relaative to that shown in the upper portion of FIG. 7. As shown in FIG. 7a, the rocker 130 for the clutch C1 is pivoted on the right side of the corresponding pin 127, and the spring 128 is arranged to bias that pin downwardly. Thus, the rocker 130 shifts and latches the pin 127 in an upper position when the frame 120 moves to the extreme right, while energization of solenoid SZ1 releases the latch to let the pin move downwardly. It will be apparent from FIG. 6 that the pins 127 for the clutches C16, C2, C8 and $Cr$ will be depressed or raised, respectively, when in their latched or released positions; and the pins 127 for the clutches C1 and C4 will be raised or depressed, respectively, when in their latched or released positions. Thus, when all pins 127 are in their latched positions (see FIG. 6), and the frame 120 moves to the left, the yokes Y for the clutches C1 and C4, will be moved to, or left in, their counterclockwise positions, and all other yokes will be moved to, or left in, their clockwise positions. All clutches will be de-actuated.

*Operation of selective clutch-shifting mechanism*

The operation of the clutch-shifting mechanism may now be summarized. Suppose it is desired to set the Z axis transmission 61 to a translation ratio of 0.21 inch of carriage travel in a positive direction for each half revolution of the input shaft 66. From Table III, supra, it will be seen that the clutches C1, C4 and C16 in the Z axis transmission must be shifted to, or left in, their actuated positions, and the clutch $Cr$ must be shifted to, or left in, its "forward" position.

To accomplish this, a first set of signals or pulses are supplied to the solenoids SZ1, SZ4 and SZ16. The manner in which these signals are derived from a record such as the punched tape 75 in FIG. 4 will be treated below.

Such momentary energization of the solenoids named above will release the corresponding latch fingers 135 associated with the clutches C1, C4 and C16, so that the associated pins 127 will move to their first or released positions. All pins 127 associated with solenoids not energized will remain in their second or "latched" position, to which they have been previously shifted and latched. This means that the pins 127 (FIG. 6) corresponding to the clutches C1, C4 and C16 will be released to their lower, lower, and upper positions, respectively. The pins 127 for the clutches C2, C8 and $Cr$ will remain latched, i.e., all in their depressed or lowered positions. The cam follower 122 (FIG. 5) is then engaged with the rotating barrel cam 121 (in a manner to be explained) and during the succeeding revolution of that cam, the shifting frame 120 will be moved first to the left, then to the right, and then back to its centered or home position. As the frame moves to the left, the pins 127 for the clutches C1, C2, C4, C8 and $Cr$ will all engage the lower projections 119 of the corresponding yokes Y, thus rocking all of those yokes to their clockwise positions. The pin 127 for the clutch C16 will, by contrast, engage the upper projection 118 of the associated yoke Y, and thus swing the latter to its counterclockwise position. It is assumed that when the yokes are so rocked, the shaft 66 is in an angular position such that the apertures in the shaft flanges 101 are aligned with the holes in the stationary partitions 100, so that the bolts can transfer without clash or damage. The means by which this "line-up" of the shaft 66 at the instant of shifting is accomplished will be explained below. But with the several yokes having been shifted to the positions indicated above, it will be apparent that the bolts 94 for the clutches C1, C4 and C16 will be engaged in the apertures of the corresponding flanges 101 on the shaft 66; and the corresponding gears A, A2 and J will be affirmatively driven from that shaft. On the other hand, the bolts for the clutches C2 and C8 will be engaged in the apertures of the corresponding partitions 100, so that the gears E and E2 will be held stationary. The clutch $Cr$ will be in the + position shown, so that the output shaft 60 turns in a direction to move the carriage 50 (FIG. 2) in a + direction along the Z axis at a rate of .021 inch per half revolution of the input shaft 66.

If, prior to the motion of the shifting frame 120, some of the clutches and yokes are already in the desired positions, then the corresponding pins 127 will simply not displace those yokes, and the clutches will be left in their original positions.

As the shifting frame 120 returns to the right, the pins 127 therein simply retreat from the yoke projections 118 or 119 and leave the yokes Y in the positions to which they have been moved. However, the lower tips 144 of the rockers 130 which have been previously released will engage the edges of the slots 143 in the cocking bar 142 (see FIG. 12), so that those rockers will be reset or latched and the associated pins returned to their "cocked" or second positions. Of course, those rockers which were not previously released will simply remain in their latched conditions as the frame 120 moves to its extreme right position. Thus, at the end of the complete shifting cycle, all of the pins 127 are in their latched positions, and thus conditioned to shift their respective clutches to the de-actuated state when the motion of the frame 120 is repeated. However, those pins may be selectively released by energization of the corresponding solenoids prior to the next shifting cycle.

The shifting of clutches in the X axis transmission 56 is accomplished in the same manner described for the Z axis transmission, and by the same motion of the shifting frame 120. As shown in FIG. 5, the shifting frame 120 carries along its lower edge a plurality of pins 127 associated with pivoted yokes Y adapted to selectively shift the six clutches in the X axis transmission 56. And, as indicated in the lower portions of FIGS. 7, 9, 11 and 12, the lower portion of the shifting frame 120 has a plurality of solenoid, latch, pin and rocker mechanisms substantially identical to those previously described and which permit selective shifting of clutches in the X axis transmission after energization of a desired combination of the six solenoids associated wth the X axis transmission. Thus, it will be assumed without further discussion that the six clutches C1, C2, C4, C8, C16 and $Cr$ in the X axis transmission 56 may be shifted to different position patterns (Table III, supra) when the solenoids SX1, SX2, SX4, SX8, SX16 and SX$r$ (FIG. 5) are first energized in a corresponding combination and the shifting frame 120 is moved to the left, then to the right, and then back again. Therefore, to change or establish a desired ratio of drive for both of the transmissions 61 and 56, it is only necessary to first energize a certain combination of the solenoids associated with the X axis transmission 61, then to energize a certain combination of the solenoids associated with the Z axis transmission 56, and then to cause the shifting frame 120 to reciprocate first to the left and then to the right. Those clutches in both transmissions which need to be shifted in order to produce the newly desired drive ratios will be simultaneously shifted by the movement of the shifting frame 120 and the action of the pins 127 carried thereby.

SLOWDOWN UNIT AND SHIFT ACTUATION MEANS

The positive, two-position clutches employed in the multi-ratio transmissions transcribed above are desirable where the invention is to be practiced with a high degree of precision in controlling the extents of successive increments of motion. Those positive clutches make the carriage 50 or the cross slide 49 (FIG. 2) move a precisely predetermined distance, dependent upon the ratio or setting of the associated transmissions, for each predetermined amount of rotation of the transmission input shafts. The reasons for and advantages of this will become apparent below.

The use of the positive clutches, rather than clutches of the type which may have some slippage as they are actuated, entails several problems, however. First, the two transmission input shafts 65, 66 must be in predetermined angular positions when the clutch bolts 94 are shifted, so that those bolts or clutch elements will transfer into or out of the mating holes of the shaft flanges 101 or stationary partitions of 100 (FIG. 6). Otherwise, all clutches might not properly transfer, and clash or damage of the bolts (or teeth, if toothed dog clutches are used) would occur. Secondly, the clutch elements of the transmission must be rotating at a relatively low or zero velocity when shifting action occurs in order to provide reliability of operation and to avoid clash or damage. Yet, it would be both difficult and undesirable to stop rotational input drive to the system each time that the clutches are to be shifted. And it is important that the revolutions of a main power shaft have a predetermined accountable relation to the revolutions of the transmission input shafts in order that the lengths of increments of motion can be precisely established from an elongated record or punched tape transported and read in synchronism with the main shaft 69.

It is the purpose of the slow-down unit 70 to overcome all of these difficulties. It initiates the clutch shifting action at the proper instant, i.e., when the transmission input shafts 65, 66 are passing through an angular position at which the clutch bolts may readily transfer. It reduces the speed of the input shafts 65, 66 momentarily so that the clutches may be reliably shifted without damage. And it does this by permitting a main power shaft 69 to continue to rotate while causing the transmission input shafts to lose a precisely predetermined angle of rotation relative to the power shaft each time that a shifting cycle takes place.

Referring to FIG. 5, the slow-down unit 70 is drivingly interposed between a continuously rotating main power shaft (here shown as the shaft 69 of the feed motor 68) and the input shafts 65, 66 of the two transmissions 56, 61. Before describing the slow down unit itself, however, the means for selectively actuating the latter and then reciprocating the transmission shift frame 120 at properly timed instants will first be treated.

Shift actuating mechanism

To initiate a slow down and shifting cycle, a cycle solenoid CS (FIGS. 5, 13 and 14) will be momentarily energized in a manner made clear below. The armature 160 of this solenoid will move upwardly, as viewed in FIG. 15, and thus displace a latch member 161 pivoted at 162 in a clockwise direction against the bias of a tension spring 164. Thus, the latch tip 165 will swing clear of a lever 166 which mounts a cam follower 168, and the latter drops into the groove 169 of a barrel cam 170 mounted on the main shaft 69. As shown in FIGS. 14 and 17, the lever 166 is free to rock about a horizontal axis by virtue of a collar 171 journaled on a pintle 172, but can also swing about a vertical axis by virtue of a pivot connection 174 to the collar. This provides a gimbal-type pivot connection for the end of the lever 166, permitting the latter to swing vertically up and down as well as horizontally to the left or right. A spring 175 (FIG. 14) connected to a projection 176 extending from the collar 171 biases the lever 166 downwardly.

After the follower 168 drops into the groove 169, it will be moved first to the left (as viewed in FIGS. 15–17) and then back to the right. Thus, a first link 178 connected with the lever 166 will be shifted to the left (FIG. 16) until its sliding lost-motion joint 179 with a second link 180 fully closes, and the latter will then also shift to the left. The link 180 has a universal or gimbal pivot connection 181 with one end of a lever 182 (FIG. 17) pivoted at 184 and bearing at its opposite extremity against a spring-biased rod 185 (FIG. 5). The resultant rocking of the lever 182 in a clockwise direction, and resulting displacement of the rod 185 to the right (FIG. 5) initiates one cycle of the slow-down unit, as will be explained below. The lever 182 is normally biased in a clockwise direction by a compression spring 182a (FIG. 19), and it thus firmly abuts the end of the rod 185. The latter is normally biased to the left (FIGS. 5 and 19) by a compression spring 224, and is shifted to the right only in response to clockwise displacement of the lever 182 by the link 178. Once shifted, however, the rod 185 and the lever 182 remain displaced until release of a limited rotation clutch in the slowdown unit 70, as hereinafter described.

When the cam follower 168 drops into the cam groove 169, a collar 186 on the link 180 drops onto the top of a pin 188 (FIGS. 15–16), and as the link 180 moves to the left, the radial abutment 186a provided by the collar falls behind the pin. As the cam 170 continues to rotate, the groove 169 therein causes the follower 168 to move back to the right beyond its original position and then to return to its original position. The lost motion connection at 179 (FIG. 16) permits this return of the link 178, but the link 180 and the lever 182 remains in their shifted positions. Just as the follower 168 returns to its original position and the cam 170 has rotated only slightly less than one complete revolution from the instant that the follower became engaged therewith, a raised peak 189 on a radial reset cam 190 engages a reset roller 191 carried by the lever 166. This swings the lever 166 upwardly until the latch tip 165 snaps into engagement therewith; and this same motion swings the links 178, 180 upwardly about the pivot connection of the latter to the lever 182, so that the shoulder 186a formed by the collar 186 clears the retaining pin 188. The link 180 and the lever 182 may now return to their original positions when the rod 185 moves back to the left at the completion of one cycle of the slowdown unit 70 (FIG. 5). Thus, one revolution of the cam 170 causes displacement of the lever 182 by virtue of the action of the cam follower 168 and then resets the cam follower to its original retracted position. If the solenoid CS should be energized a second time before the slowdown unit 70 completes a first cycle of operation, the link 180 will still be in its shifted (left) position. This means that as the lever 166 and the link 178 swing downward, the collar 186 (FIG. 16) will fall on the left side of the pin 188, so that the lever 182 remains displaced in a counterclockwise direction to produce a second cycle of operation of the slowdown unit. This avoids impacts on the linkages when two slowdown cycles are to be produced in succession.

As the follower 168 is shifted to its extreme right (as viewed in FIG. 15), a rod 194 pivoted at 193 to the extremity of that lever is similarly shifted to the right. As shown in FIG. 17, the rod 194 is formed with a pilot tip 195 which passes freely through an aperture in a latch member 196. However, when the rod 194 is shifted to its extreme right, a radial shoulder 194a thereon abuts the latch member 196 and deflects the latter counterclockwise (FIG. 15) about its pivot mounting 198 and against the yielding bias of a tension spring 199. This retracts the latch tip 200 clear of a lever 201 which has a gimbal connection at 202 (FIG. 17) similar to that previously described for the lever 166. The lever 201 carries the cam follower roller 122 previously mentioned and which, by release of the latch 196, is thus lowered into engagement with the groove 121a of the barrel cam 121 mounted on and rotating in unison with the main shaft 69. This displacement of the rod 194 to the right and the release of the latch 196 occurs just before the lever 166 is reset and latched; and this is just before the first barrel cam 170 has completed one revolution from the instant that its cam follower 168 drops into engagement. Thus, after the cycle solenoid CS has been energized, the cam follower 168 and the lever 166 execute one cycle of shifting the lever 182 during a first revolution of the power shaft 69, and then releases the second lever 201 and cam follower 122 so that the latter are operative during the succeeding or second revolution of the main shaft 69.

The groove 121a of the barrel cam 121 is so shaped that the follower 122, when engaged therewith, will move first to the left, then to the right, and then back to a centered position, as viewed in FIGS. 15 and 17. A pitman 204 pivotally connected at its opposite ends to the lever 200 and the shifting frame 120 (see FIG. 5) thus produces the above-described left, right, and return motion of the shifting frame 120. The barrel cam groove 121a is so shaped that this motion of the shifting frame toward the left (and the resulting transfer of clutches in the multi-ratio transmissions) occurs when the main shaft 69 is passing through a particular position during its second revolution following the initial release of the cam follower 168 by energization of the solenoid CS.

As an incident to lowering of the lever 201, a roller 205 carried thereby is brought into engagement with a radial cam 206 fixed to or integral with the barrel cam 121. This radial cam has a single high point or peak thereon (not shown) but similar to the high point 189 shown in FIG. 14 which will swing the lever 201 upwardly about its gimbal connection at 202 after the follower 122 has been engaged with the cam 121 during substantially one revolution of the latter. This upward movement of the lever 121 causes the latch tip 200 to snap into engagement therewith and thus restores the follower 122 to its disengaged position until the cycle of operation is repeated. Thus, all parts are restored to their original positions after the main shaft 69 has rotated two revolutions following the release of the first cam follower 168. A second cycle of operation may be started at any time by again momentarily energizing the solenoid CS. During the cycle of operation of the two cams 170, 121, the lever 182 is momentarily rocked clockwise about its pivot 184 (FIG. 17) and the shifting frame 120 (FIGS. 5 and 6) is reciprocated first to the left and then to the right.

*The slowdown unit*

The slowdown unit 70 is shown in diagrammatic form by FIGS. 5 and 18 and in somewhat more detail by FIG. 19. This slowdown unit will be described first as an individual mechanism, and its cooperative connections and operation with the rest of the system can then be made clear.

Referring to FIGS. 5, 18 and 19, the input member for the slowdown unit may be considered as a planet carrier or a revolving carriage 210. It mounts an input gear 211 which, as shown in FIG. 5, is driven directly and positively from the main shaft 69 by speed reducing gears 212, 213 and 214. The ratio of the latter gears is chosen, in the present instance, such that the carrier 210 is driven continuously at one-sixth the speed of the main shaft 69.

The carrier 210 is journaled for rotation about a first axis 215 and comprises axially spaced flanges 216, 218 which journal a shaft 219 so that the latter not only bodily moves with the carrier 210 but has freedom to rotate about a second axis 220 radially displaced from the first axis 215. The carrier 210, in the present instance, also includes a counterweight 221 connected between the flanges 216, 218 and diametrically opposite from the shaft 219. The central portion 222 of the carrier 210 is hollow and contains the rod 185 referred to above, this rod being biased to the left by a compression spring 224. Pins 225 extending through elongated slots in the central portion 222 connect a shifting collar 226 with the rod 185, so that the collar will be shifted to the right or to the left, as the rod 185 moves axially.

In accordance with an important feature of the slowdown unit, an intermittent motion, cyclically operable device is drivingly interposed between the carrier 210 and an output member which, in the present instance, is the gear 71. This cyclically operable, intermittent drive device normally produces a direct drive between the carrier 210 and the output member 71, but when actuated through one cycle of operation it causes the output member to first slow down and then speed up while the carrier 210 continues to rotate.

As embodied in FIGS. 18 and 19, a Geneva mechanism is interposed between the carrier 210 and the output member 71, this mechanism being arranged such that it normally locks the two for rotation in unison. The Geneva mechanism includes a driver member 228 fixed to the shaft 219 for rotation about the second axis 220, and a driven member 229 which is rotatable about the first axis 215 and either integral with or connected to the final output member 71. The driver member, as here shown, comprises three rollers 230 mounted at 120° intervals around a circular part fixed to the shaft 219, these rollers being sized to enter six radial slots 231 formed at 60° intervals (see FIG. 20) in the face of the driven member 229. As is well known, as the driver member is rotated 120° at constant speed from a position in which one of the rollers 230 is just entering one of the slots 231, the driven member 229 will turn 60°, and the velocity of the latter will smoothly increase and then smoothly decrease. The velocity of the driven member 229 is represented by a curve 232 plotted against angular position of the driver member 228 in FIG. 28, it being assumed that the driver member 228 turns 120° with constant speed.

However, if the driver member 228 is held stationary so that it cannot rotate about its own axis 220, it becomes locked to the driven member 229. Bodily rotation of the driver member 228 with the carrier 210 about the first axis 215 thus turns the driven member 229 in unison.

In order normally to hold the driver member 228 against rotation about its own axis 220, but to affirmatively drive it through one cycle or 120° in response to an actuating signal, a limited rotation clutch-brake combination is employed. As here shown, a clutch-brake element 234 is splined to but axially movable along the shaft 219, and formed with axially extending tapered projections or teeth 235 on its right end. It has similar axially extending inclined teeth 236 on its left end. A shifting yoke 238 fulcrumed at 239 has one end engaged in a circumferential groove 243 of the element 234 and its other end connected with the collar 226. Thus, the spring 224 normally biases the collar 226 to the left, and holds the element 234 shifted to the right so that its teeth 235 engage in mating depressions 240 formed in the carrier flange 213. When the element 234 is shifted to the right, as viewed in FIGS. 18 and 19, therefore, it is positively held against rotation about the axis 220, and so prevents rotation of the shaft 219 and driver element 228.

To affirmatively rotate the driver member 228 selectively through one cycle (here, 120°) about its own axis 220 and in the same direction as the carrier 210 is rotating about its axis 215, a stationary sun gear 241 is mounted adjacent the carrier 210 and meshed with a planet gear 242 which is journaled with freedom normally to rotate relative to the shaft 219. However, the planet gear is formed with an integral, axially extending portion which projects through the flange 216 and which has axial depressions 244 in the face thereof adapted to receive the clutch teeth 236 on the element 234 when the latter is shifted to the left. Under these conditions, the planet gear 242 is drivingly connected to the shaft 219 and the latter is positively driven about its axis 220. Thus, whenever the rod 185 is shifted to the right (FIGS. 18 and 19) the element 234 will be shifted to the left so that its braking teeth 235 are disengaged and its clutching teeth 236 form a positive drive connection between the planet gear 242 and the driver member 228.

In accordance with one feature of the present slowdown unit, the drive element 228 is turned about its own axis during each cycle of operation only sufficiently to make the Geneva mechanism produce one cycle of acceleration and deceleration. If the driver member 228 had only four rollers spaced at 90° and the driven member had four slots spaced at 90°, this would require 90° of rotation of the driver. In the present instance, however, since the driver member 228 has three rollers 230 and the driven member has six slots 231, only 120° of rotation of the driver is required to produce one cycle of Geneva motion. Such a predetermined amount of rotation of the driver member 228 may be effected by the timed displacement and return of the rod 185 by means of the lever 182. However, as here shown, the clutch and the brake teeth 235, 236, together with the biasing spring 224, form a limited rotation, self-return brake and clutch unit similar in its action to the familiar "one revolution" clutch except for the fact that it restores after only one-third of a revolution. This permits the rod 185 to be shifted to the right only momentarily to initiate a cycle of operation, and the mechanism automatically resets after one cycle.

To produce this action, the shiftable element 234 is sized in axial length such that one set of its teeth 235 or 236 always engages one or the other of the two sets of depressions 240 and 244. As shown in the developed view of FIG. 22, the teeth 235 on the right end of the element 234 are spaced at 120° intervals as are the mating depressions 240 in the carrier flange 218. These depressions 240 are separated by lands 245. Thus, when the element 234 is shifted to the left and engages the planet gear depressions 244, that element can be biased back toward the right after only a slight amount of planet gear rotation occurs. The teeth 235 on the right end of the element 234 will then slide along the land surfaces 245 until they snap back into the depressions 240, this action simultaneously disengaging the teeth 236 from the planet gear 242. Thus, the rod 185 need only be shifted momentarily to the right to initiate a cycle of operation, and the driver element 228 will automatically be relocked against rotation about its own axis 220 after it has turned 120°.

In accordance with an important feature of the present slowdown unit, the rotation and velocity produced by the action of the Geneva mechanism is subtracted from the rotation and velocity of the carrier 210. To appreciate how the present mechanism accomplishes this, assume that under normal operating conditions the Geneva mechanism is locked, i.e., one of the rollers 230 is at the entrance of a slot 231 in the driver member 229 as shown in FIG. 23. A second one of the rollers 230 (not shown in FIG. 23) will be disposed at the mouth of a second one of the slots 231, so that bodily clockwise movement of the carrier 210, the shaft 219, and the driver element 228 will drive the output member 229 in unison.

As a cycle of operation commences by shifting of the element 234 into driving engagement with the planet gear 242, the driver member 228 begins also to turn clockwise about its own axis 220. This makes the roller 230 move radially inward of the slot 231 from the position shown in FIG. 23 to that shown in FIG. 24. When the carrier 210 or bodily movement of the shaft 219 has amounted to 30° (from the position shown in FIG. 23 to that of FIG. 24), the driver member and the roller 230 will have rotated 30° about the axis 220, inasmuch as the sun gear 241 and the planet gear 242 are formed with the same diameter. If the carrier 210 were stationary, this would mean that the driven member 229 would be turning counterclockwise about the axis 215 at about 40 percent of the velocity of the planet gear 242 (see FIG. 28). But because the carirer 210 is rotating at 100 percent of the velocity of the planet gear 242, the net speed of the driven member 229 is the difference between the speed of the carrier 210 and the speed which the driven member would have if it were being rotated only as the result of the Geneva action. Thus, with the parts having the positions shown in FIG. 24, the planet gear 242 having rotated 30°, the driven member 229 will be rotating in a clockwise direction but at a speed which is only about 60 percent of the speed of the carrier 210. The variation in speed of the driven member 229 is represented by a curve 248 in FIG. 29, such curve being plotted as a percentage of normal speed versus the angle of rotation of the planet gear 242 or the driver member 228 about the second axis 220. It will be seen from the curve 248 that when the driver member 228 has rotated 30° about its own axis, the speed of the driven member 229 is only about 60 percent of the speed of the carrier 210.

The driven member 229, as shown in FIG. 24, has rotated only about 25° about the axis 220 from the position illustrated in FIG. 23, due to the fact that the Geneva action produces a loss of motion. Thus, as the carrier 210 rotates 30°, the output or driven member 229 rotates only about 25°.

By the time that the carrier 210 has rotated 60° about the axis 215 (from the position shown in FIG. 23 to that illustrated in FIG. 25), the planet gear 242 and the driver member 228 have also rotated 60° about the axis 220. The roller 230 has, therefore, reached its point of maximum entry into the slot 231. The Geneva output speed is now a maximum, i.e., 100 percent of the planet gear speed, as shown by the graph 232 in FIG. 28. However, because this Geneva output speed is subtracted from the carrier velocity of 100 percent, the output or driven member 229 is at this instant stationary, i.e., has zero velocity, as shown by the curve 248 in FIG. 29. And, by the time that the components reach the position shown in FIG. 25, the driven member 229 is turned only 30° about the axis 215, although the planet carrier 210 has rotated 60° about the axis 220.

As the components reach the position shown in FIG. 26, the roller 230 has begun to retreat out of the slot 231. The carrier has rotated 90° about its axis 215, the driver member 228 and the planet gear 242 have rotated 90° about their axis 220, and the output member has rotated approximately 35° about the axis 219. The velocity of the output member 229 is now smoothly increasing because the velocity produced by the Geneva mechanism per se is decreasing. See FIGS. 28 and 29.

Figure 27:
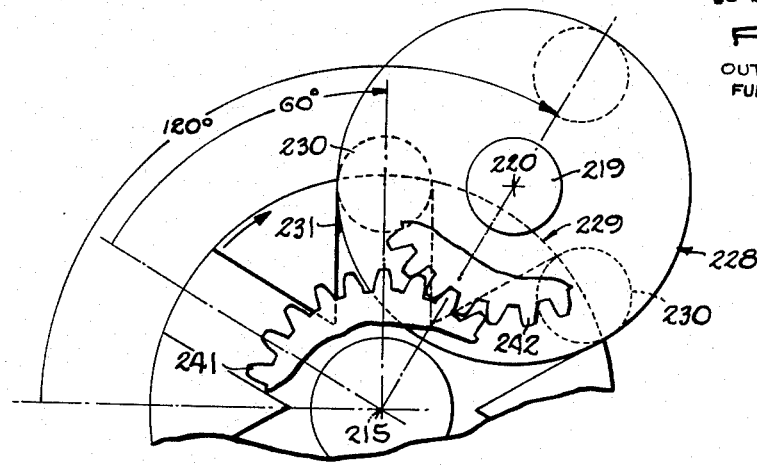

By the time the components reach the position shown in FIG. 27, the carrier 210 and the driver member 228 have both rotated 120° about their respective axes 219 and 220. The roller 230 is returned to the mouth of the slot 231 which it entered and the driven member 229 is now relocked to the carrier 210. The velocity of the output member 229 is now the same as that of the carrier 210.

Because of the Geneva subtraction, the output member 229 is rotated only 60° from its original position shown in FIG. 23 during this cycle of Geneva operation. But considering the curve of velocity variation in FIG. 29, it will be apparent that the driven member 229 has been smoothly decelerated from its original speed to a substantially zero speed, and then smoothly accelerated back to its original velocity. This action occurs during 120° rotation of the carrier 210. Recalling that the gears 211–214 (FIG. 5) in the present instance have a 6:1 reduction ratio, one cycle of the slowdown unit occurs during two revolutions of the main shaft 69. During this time, the output or driven member 229 is rotated clockwise through only 60°. But in the present example, the gears 71, 72 and 73 which form a drive connection from the driven member 229 to the transmission input shafts 56 and 61 produce a 3:1 step up in speed, the gears 72, 73 having a diameter which is one third that of the gear 71. Thus, the input shafts 65, 66 will turn 180° while the slowing down and speeding up action illustrated in FIG. 29 occurs.

This means that under normal conditions the transmission input shafts 65 and 66 are driven one half revolution for each revolution of the main shaft 69. But each time that the slowdown unit 70 is put through one cycle of operation, the main shaft 69 turns two revolutions while the input shafts 65, 66 turn only one half revolution. Thus, the main shaft 69 gains a predetermined angle of 360° relative to the corresponding rotation of the input shafts 65, 66, which is normally caused by the main shaft. Stated another way, the input shafts 65, 66 lose a predetermined angle, i.e., one half revolution, relative to the rotation which would otherwise be caused by the main power shaft 69, as a result of the slowdown unit being put through one cycle of operation.

To summarize the combined operation of the slowdown unit and the shift actuating mechanism, it may be assumed that the main shaft 69 and the cams 170, 121 are continuously rotating at, say, 600 r.p.m. The gears 211–214 (FIG. 5) thus drive the carrier 210 at 100 r.p.m. The slowdown unit will normally drive the gear 71 at 100 r.p.m., and the gears 72, 73 will thus drive the transmission input shafts 65, 66 at 300 r.p.m. In other words, the input shafts 65, 66 normally turn one half revolution for each revolution of the main shaft 69.

To reset the Z axis transmission 61 to a different drive ratio, appropriate ones of solenoids SZ1, SZ2, SZ4, SZ8, SZ16, and SZr, are first energized to determine the new Z axis transmission ratio according to Table III, supra. Then the solenoids CS will be momentarily energized (by means to be discussed below) as the cam 170 reaches a predetermined angular position. The cam follower 168 thus drops into the cam 170 and first shifts the link 180 and the lever 182 to the left, thereby moving the rod 185 (FIG. 19) to the right, shifting the clutch element 234 to the left. The planet gear 242 begins to drive the driver member 228 about the axis 220. The cam follower 168 is then moved to the right by the cam 170, causing the rod 194 to release the latch 196 and drop the cam follower 122 into the cam 121. Just after this, the radial cam 190 lifts and relatches the cam follower 168, and the link 180 is released by the collar 186 clearing the retaining pin 188 (FIG. 16). The clutch element 234 is now free to snap back to the right (FIG. 19) under the influence of the spring 224 as soon as the shaft 219 and the driver member 228 have turned 120° about the axis 220. But shortly after the follower 122 dropped into the cam 121, the shifting frame 120 is moved to the left. The cam 121 is so shaped that this movement of the frame 121 occurs just when the driver member 228 has turned 60° about the axis 220 so that the velocity of the driven member 229, the gear 71 and the input shafts 65, 66 are at that instant all substantially zero (see FIG. 29). Moreover, by virtue of the selected drive ratio from the main shaft 69 to the input shafts 65, 66, this movement of the frame 120 occurs substantially when those latter shafts are at one of two angular positions in which the clutch bolts 94 (FIG. 6) are alined with the apertures of the flanges 101 and the stationary portions 100. The clutches thus transfer without clash.

As the main shaft 69 continues to rotate, the transmission input shafts 65, 66 are accelerated (see FIG. 29). The follower 122 displaces the frame 120 to the right of its original position and all the shifting pins 127 previously released by energization of the selected solenoids are cocked and relatched in their second positions. Then the radial cam 206 lifts the follower 122 and the latch 196 holds it up. After the clutch element 234 has rotated 120°, it snaps back automatically into locking engagement with the carrier 210, so that the latter now directly drives the input shafts 65, 66.

The transmission 61 is thus now set to the desired ratio. Of course, the X axis transmission will at the same time be reset to a new drive ratio, depending upon the combination of its solenoids which were energized prior to the beginning of the shifting cycle. The shifting has been accomplished while the main shaft 69 continues to rotate, although the transmission input shafts 65, 66 have been slowed down, the clutches shifted, and the input shafts then speeded up. During the shifting cycle, the main shaft 69 turned two revolutions, but the transmission input shafts turned only one half revolution. Thus, there has been a loss of one half revolution of the transmission input shafts, relative to their normal drive from the main shaft 69, because of the action of the slowdown unit 70.

For a purpose to be described, a limit switch LS (FIG. 5) is associated with the lever 201. Its normally open contacts LSa and normally closed contacts LSb are actuated, i.e., respectively closed and opened, whenever the lever 201 pivots to drop the cam follower 122 into engagement with the cam 121.

CONTROLLED TRANSPORT OF THE ELONGATED RECORD

In accordance with an important aspect of the present invention, the elongated record or punched tape 75 (FIGS. 2 and 4) is given a pre-established distance or number of rows between two successive sets of indicia which represent not only the beginnings of two successive increments of motion but also the transmission ratios which are to be in effect during those two successive increments of motion. Moreover, the elongated record or punched tape 75 is transported or advanced at a predetermined rate or in timed relation to the rotation of the main shaft 69, i.e., inches per revolution or numbers of lines per revolution, relative to the main shaft 69. As shown in FIG. 2, an input pulley 78a for the tape reader 76 is driven by the nonslip belt 78 from the main shaft 69, the reader having means to advance the tape one row for each revolution of the main shaft. Thus, when the slowdown unit 70 is in its normal condition and positively driving the input shafts 66, 65, the tape 75 is transported in timed relation to those input shafts, i.e., one row for each half revolution of the input shafts.

The tape reader 76 may take a variety of forms available commercially, and a schematic illustration of one suitable form is shown in FIG. 30. The reader 76 includes means for producing signals corresponding to each set of indicia on the punched tape 75, and, more specifically, a separate set of signals for each transverse row of punched holes as that row passes by a predetermined point. As here shown, the tape 75 is advanced lengthwise and in steps over the tips of a plurality of sensing elements or spring feeler pins F1 through F8 which are respectively alined with columns one through eight. This feed motion is produced by an intermittent drive mechanism 260 having an input shaft 261 driven from the belt and pulley 78, 78a, and an output shaft 262 carrying a sprocket 264 having teeth engaged with the lengthwise row of sprocket holes formed in the tape itself. The sprocket 264 is intermittently stepped by the mechanism 260 as the pulley 78a rotates continuously, the sprocket being stepped to advance the tape 75 one row past the tips of the feeler pins F1–F8 for each revolution of the main shaft 69. Thus, successive ones of the transverse rows of the holes spaced lengthwise along the tape 75 are brought into alinement with the feeler pins F1–F8 and held momentarily stationary in that alined position.

A cam 265 underlies the pins F1–F8 and is continuously driven from the pulley 78a. This cam has a radial projection 266 thereon which urges all of the pins upwardly toward the tape 75 at each instant when the latter is stationary with a row of holes overlying the pin tips. Those pins which find a hole in the corresponding column will pass through such holes and thus be elevated; and those pins which find no hole will be blocked against upward movement by engagement with the tape itself.

In order to convert the combination of holes sensed in any row of the tape 75 into corresponding electrical signals, a plurality of multi-contact switches TR1 through TR8 are mechanically connected to respective ones of feeler pins F1 through F8. Those switches will be actuated when the corresponding pin is elevated as a result of finding a hole in the tape 75. Thus, the combination of the switches TR1 through TR8 which are simultaneously actuated corresponds to the combination of holes present in the particular transverse row of tape which is being read. To make certain that the combination of actuated switches is sensed at the proper instant, a timing switch TS having normally open contacts TSa, TSb, TSc is disposed adjacent a second cam 268 having a sharp radial lobe 269. The timing switch contacts are thus closed by the cam 268 for a short instant during each interval that the cam 265 is urging all of the pins F1–F8 upwardly. Summarized, as each row of indicia on the punched tape 75 passes through the tape reader 76, a corresponding set of signals is produced by actuation of the switches TR1–TR8 in different combinations.

The manner in which the reading of the successive rows of holes on the punched tape by actuation of the switches TR1–TR8 is caused to produce different control functions will be described fully below. For the present it will suffice to note simply that the punched tape 75 is stepped longitudinally one row for each revolution of the main shaft 69, and the switches TR1–TR8 are thus momentarily closed according to the combination of holes which exist in the particular row then alined with feeler pins F1–F8. By the present description of the schematically illustrated tape reader in FIG. 30, it is not intended to indicate that the punched tape 75 cannot be continuously advanced or that other suitable reading means, such as photosensitive elements, cannot be employed. The illustration in FIG. 30 is exemplary only.

The transport and reading of the punched tape 75 in coordination with the rotation of the main shaft 69 is of importance. This makes it possible for the length of the tape between two successive sets of indicia to determine precisely the length of an increment of motion of the carriage 50 and cross slide 49 along the Z and X axes.

For example, suppose that the Z axis transmission 61 is shifted to a drive ratio of .030 inch per half revolution of the input shaft 66 in response to one set of indicia on the tape 75 and that the latter has a total of forty-one lines before the next set of indicia thereon. Since the main shaft 69 will turn one revolution for each of the forty-one rows as the tape 75 is advanced, the input shaft 66 for the Z axis transmission will rotate a total of forty half revolutions, one half revolution thereof being lost as a result of the action of slowdown unit 70 when the transmission was shifted to the desired ratio. Therefore, as the tape 75 is advanced lengthwise through forty-one rows thereon, the input shaft 66 will turn forty half revolutions, and at a ratio of .030 inch per half revolution, the carriage 50 will be translated a total of 1.200 inches before the transmission is shifted to neutral or changed to another ratio.

As noted above, whenever the slowdown unit 70 is put through one cycle and the clutches of the Z axis transmission 61 are shifted, one half revolution of the transmission input shaft 66 is lost, i.e., the shaft 69 turns one revolution and the tape 75 is advanced one row without any corresponding movement of the input shaft 66. Thus, in accordance with the present invention, the length of tape between two successive sets of indicia is made one row longer than would otherwise be required to produce the desired length for an incremental movement. While in the foregoing example the punched tape 75 would normally be transported forty transverse rows as the input shaft 66 rotates forty half revolutions and the movable element or carriage 50 is translated 1.200 inches, a total of forty-one rows is provided on the tape to produce the 1.200 inches of travel with the axis transmission set to its 0.30 inch ratio. The extra row of tape is consumed by the operation of shifting the transmission clutches to the desired ratio.

In the foregoing discussion, reference has been made to specific, exemplary gear and drive ratios. That is, it has been indicated that during normal drive through the slowdown unit 70, the input shaft 66 turns one half revolution for each revolution of the main shaft 69; that during one cycle of the slowdown unit 70, the input shaft 66 loses one half revolution; and that the tape reader 76 and the tape reading means therein are driven such that the punched tape 75 is advanced one transverse row for each revolution of the main shaft 69. Of course, these specific values or ratios can be varied considerably in the practice of the invention, and it will be helpful here to present generalized expressions of the relationships which are to be provided. For this purpose, the following symbols may be employed and identified as follows:

$L$=The length of movement of the carriage 50 for one increment, expressed in inches.

$R$=The selected ratio to which the transmission 61 is set during that increment of movement, expressed in inches of travel of the carriage per revolution of the input shaft 66.

$k$=The factor of proportionality between the speed of the main shaft 69 and the speed of the input shaft 66 during normal drive through the slowdown unit 70.

$m$=The rate at which the elongated record 75 is advanced through the reader 76, expressed in inches of tape per revolution of the main shaft 69.

$\alpha$=The angle, expressed as a multiple or fraction of revolution, which the input shaft 66 loses during one cycle of the slowdown unit 70.

$d$=The distance which the elongated record is transported while the main shaft 69 is, in effect, directly driving the input shaft 66.

$c$=The distance the elongated record is transported while the main shaft 69 is, in effect, disconnected from the input shaft 66 due to the loss of motion occasioned by a cycle of the slowdown unit 70.

$D$=The total distance on the elongated record between two successive sets of indicia necessary to produce an increment movement having a length L.

With the foregoing symbols so identified, it will be apparent that the input shaft must make $L/R$ revolutions in order to translate the carriage an increment length L. Secondly, to shift the transmission 61 to the ratio R at the beginning of the increment, the input shaft 66 will lose $\alpha$ revolutions of rotation while the main shaft 69 continues to rotate. Thus, the main shaft 69 will have to rotate $kL/R$ revolutions to translate the carriage 50 an incremental length L, and $kd$ revolutions to effect the slowdown and shifting operation. Thus, the total number of revolutions of the main shaft 69 will have to be $k(L/R+\alpha)$.

But if the main shaft rotates $k(L/R+\alpha)$ revolutions, the tape 75 will be transported $mk(L/R+\alpha)$ inches. Therefore, $D=mk(L/R+\alpha)$ inches. This is the distance between two successive sets of indicia on the punched tape 75, the first set representing the ratio R for the increment of movement in question, and the second set causing not only termination of that increment but shifting of the transmission to the desired ratio for the succeeding increment. The distance D is equal to $c+d$, where $c=mk\alpha$ and $d=mk L/R$.

It may be assumed for purposes of discussion that there are ten rows of holes on the tape 75 for each inch of length thereof, i.e., that each row occupies one-tenth of an inch. With this assumption, the foregoing expression for the distance D may be applied to the specific ratios employed in the exemplary apparatus as described above. Thus, in the present instance the value of $k$ is 2, since the main shaft 69 rotates two revolutions for each revolution of the input shaft 66 under normal conditions; the value of $m$ is 0.10 inch, since the tape 75 is advanced one row of holes for each revolution of the main shaft 69; the value of α is one half revolution since that is the angle which the input shaft 66 loses during one cycle of the slowdown unit 70.

Applying these values to the expression $$D = mk(L/R + \alpha)$$

we obtain:

$$D = .10 \times 2 \ (L/R + \tfrac{1}{2})$$

Now if it is desired to move the carriage 50 the total of 1.200 inches, that will be the value of L. If it is desired to effect this motion with the transmission 61 set to its ratio of .030 inch per half revolution of the input shaft 66, the ratio R will be twice that value, i.e., .060 inch per revolution of the shaft 66. Applying these values we obtain:

$$D = 0.2(1.200/.060 + \tfrac{1}{2}) = 4.1 \text{ inches}$$

Since, as assumed above, each row of the tape 75 occupies one tenth of an inch of length of that tape, it is known that the total number of rows between the two successive sets of indicia of the punched tape must be 41. Thus, the distance D of the punched tape is the sum of two distances, i.e., a distance $d$ which is directly proportional to the ratio $L/R$, plus a distance $c$ which is the distance that the punched tape 75 moves during the "lost" motion of the input shaft 66 occasioned by one cycle of the slowdown unit 70. In the present example, therefore, the distance $d$ is four inches or forty rows on the tape 75, and the distance $c$ is 0.10 inch or one row on the tape. Thus, to produce an increment of movement having a length L with the transmission set to a ratio R, the number of rows between two successive sets of indicia on the punched tape must be $2 \times L/R$ plus one extra row to accommodate a cycle of the slowdown unit 70. The distance $c$ will be the same for all increments of motion, whereas the distance $d$ will determine the length of each increment and will vary according to both the desired length L of the increment and the drive ratio to which the transmission is set for that increment.

While the foregoing discussion has been directed to the input drive of the Z axis input 61 and the resulting motion of the carriage 50 along the Z axis, it will be apparent that the same considerations apply equally well to the X axis transmission 56 and the motions of the cross side 49.

Referring to FIG. 4, that portion of the punched tape 75 which is included in the distance labeled D is intended to produce the #1 increment (see FIG. 3B) of −1.230 inches along the X axis. It is desired then that the rate of movement be .030 inch per half revolution of the input shaft 65. Thus, the first row of holes included within the distance D represents Z0, and constitutes an extra line or distance $c$ forming a part of the total distance D. That first row of holes representing Z0 will result in the Z axis transmission 61 being shifted to its zero ratio, so that the carriage 50 will remain stationary. The second row of holes included in the distance D represents −X.030, i.e., the desired ratio, and will set the transmission 56 to drive the cross slide 49 at a rate of .030 inch per half revolution of the input shaft 56. In between the first line (representing Z0) included in the distance D and the next row following the distance D, there are a total of forty-one rows on the tape. Some of these rows may be entirely blank and some may contain auxiliary information represented by punched holes. The distance D is thus equal to a total of forty-two lines, wherein the distance $c$ is one line and the distance $d$ is forty-one lines. Since the distance $c$ or the first line, in effect, produces no motion of either the input shaft 56 or the cross slide 49, it may be disregarded. Thus, it will be apparent that the length L which the carriage 50 is moved is $$41 \times .030 = 1.230$$

inches. The total distance D between two successive sets of indicia (i.e., between the two successive Z codes) is thus equal to forty-one lines plus an extra line for shifting purposes. i.e., the total of forty-two lines or 4.2 inches.

This relationship between the distances D or number of rows on the tape 75 between two successive sets of indicia and the length of movement will be made clearer as the following operational description occurs with reference to the exemplary control circuits.

At this point it will be appropriate to treat an important advantage which accrues from the system here disclosed. The number of axes or transmissions being controlled in the present instance is two. And, by choice of the particular gear ratios associated with the main shaft 69 and slowdown unit 70, the distance $c$ which the tape advances for each increment with no corresponding movement of the controlled member is made equal to the distance necessary to receive the ratio indicia for one less than the number of transmissions being controlled, i.e., one row on the tape. If three axes were being controlled, then the distance $c$, by choice of gear ratios in the slowdown unit 70, would be made equal to two rows of the punched tape 75. This would enable three ratio codes to be read from the tape 75 to energize selected solenoids in three transmissions just prior to the actuation of shifting mechanism. The fact that there is an "extra" line or lines for each increment on the punched tape 75 is, therefore, an important advantage because it lets all of a plurality of transmissions receive ratio-determining signals while one complete cycle of the slowdown unit and shifting mechanism occurs, yet preserves a desired relationship between the extent of motion produced under normal driving conditions for each unit distance or row on the tape.

CONTROL CIRCUITS

Before going into the control circuits which are associated with the apparatus described above, it will be helpful briefly to describe an exemplary form of latching relay which is employed at various points therein. Such a latching relay 275 is diagrammatically shown in FIG. 31, and comprises an armature 276 movable vertically with respect to two stationary coils A and B. The armature is biased downwardly by gravity or a suitable spring 278 and is movable upwardly to a position at which it will engage and be latched to a permanent magnet 279. Current supplied to the first coil A exerts an upward force on the armature 276 and raises the latter until it engages and is held by the permanent magnet. Current supplied to the second coil B exerts a downward force on the armature 276 and thus will pull the armature downwardly if it has been previously latched up to the permanent magnet 279. The number of turns on the winding A are, however, made appreciably greater than those of the coil B. Therefore, if coil A is energized either by itself or simultaneously with coil B, the force of coil A predominates and shifts the armature 276 upwardly until it is latched in engagement with the magnet 279. Once the armature has been raised to the permanent magnet, it will be restored or deactuated only if coil B is energized by itself. The armature carries a plurality of contacts here shown as normally closed contacts 280 and normally open contacts 281 which are respectively actuated whenever the armature 276 is in its upper or latched position.

Those relays which are shown in FIGS. 32A–D, as having two coils A and B enclosed in dotted line rectangles are of the type shown in FIG. 31, having their contacts latched in an actuated condition following momentary energization of the coil A (even if the coil B is simultaneously energized), and released or deactuated when the coil B is next energized by itself.

The specific control circuits illustrated in FIGS. 32A–D are exemplary, and may of course take a variety of equivalent forms within the purview of the present invention. It is believed that the organization and operation of the control circuits and their cooperation with the apparatus previously described may best be described by a narration of sequential events which occur in response to reading of different codes or rows of holes appearing on a punched tape, such as that shown in FIG. 4, which by the indicia thereon represents a desired program of motion and control. As will be explained below, indicia on the punch tape 75 will produce selected spindle speeds, selected feed ratios, and selected auxiliary functions, in addition to controlling the lengths and velocities of successive increments of movement of the carriage 50 and the cross slide 49 (FIG. 2).

In FIGS. 32A–D the various contacts which are controlled by the different switches mentioned above will be identified by the same reference characters employed to identify the switch, but with a distinguishing alphabetical suffix. More over, the various control relays will be identified by individual reference characters such as R9, R10, etc., while the contacts controlled by such relays will be identified with the same reference character to which a distinguishing suffix is added, e.g., R9a, R9b, R10a, R10b, etc. Those contacts which are normally closed when the switch or relay is deactuated are shown as completing a conduction path, while normally open contacts are shown in that condition. In the case of the latching relays having dual coils A and B, however, the various relay contacts are shown in the states, either open or closed, which they occupy when the relay is deactuated, i.e., after the coil B has been energized by itself.

Assume now that a punched tape 75 such as that illustrated in FIG. 4 has been threaded into the reader 76 (FIG. 30) and that the two transmissions 56 and 61 have their clutches all deactuated or set to produce a zero drive ratio. To start the spindle motor 63 and the feed motor 68, an operator momentarily presses the "start" switch (FIG. 32A), thereby connecting the coil of a motor contactor MC across D.C. voltage supply lines L1 and L2, the latter being at a negative potential relative to the former. The contactor MC is sealed in and its coil held energized by current flow through its own contacts MCa, normally closed relay contacts R9c, and an array 285 of parallel relay contacts, at least one of which will be closed. Energization of the coil MC results in the closure of its contacts MCb and MCc, thereby connecting a power source to input terminals 286, 288' of the spindle motor controller 64. This causes the spindle motor 63 to be energized.

The speed at which the controller 64 causes the motor 63 to run depends upon the magnitude of a control voltage Es, and under these initial conditions the voltage Es will be equal to the voltage drop across a resistor 289 connected in series with a resistor 290 through normally closed relay contacts RS1f, RS2f, RS4f across the supply lines L1, L2 to form a voltage divider. The left side of the resistor 289 is connected to a terminal 291 of the spindle motor controller 64 through normally closed contacts RS1g, RS2g, RS4g.

Energization of the contactor MC also closes contacts MCd and MCe (FIG. 32C) to connect a power source to the main input terminals of the feed motor controller 74, thereby causing the latter to energize the armature 288 of the feed motor 68. As here shown, the latter motor is of the direct current, shunt field type, having a field winding 289' energized from terminals 292 connected to an appropriate voltage source.

The feed motor controller 74 may take a variety of forms well known to those skilled in the art. However, for a purpose to be made clear below, it is preferably of the type which produces an output or armature voltage which is proportional to the difference E1–E2 between two input control voltages E1 and E2. Under the initial starting conditions, the voltage E1 will have a finite value (determined by a "shift" reference voltage Er, as explained below) and the voltage E2 will be zero. The controller 74 thus causes the feed motor 68 to run at a relatively low speed.

Z and X decoding and shifting controls

With both the motors 63 and 68 energized, the tape 75 (FIGS. 4 and 30) will be advanced through the reader 76 by drive from the main shaft 69 (FIG. 2). The various transverse rows of holes thereon representing alphanumeric characters will be read successively. Rows representing Z and X codes in succession are herein termed "sets of indicia" and other rows representing S, F or A codes are considered to be auxiliarfy indicia.

In accordance with the present invention, means are provided for deriving from successive sets of indicia on the punched tape 75 successive sets of electrical signals, together with means responsive to those signals for setting the Z and X axis transmissions to the directions (+ or −) and drive ratios represented by such indicia. This is termed the Z and X axis decoding, and is performed by the decoders 80, 79 (FIG. 2) as well as the slowdown unit 70, the electrical portions of which are illustrated in the upper portion of FIG. 32A.

At the beginning of each section of the punched tape 75 which corresponds to one increment of motion, there will be two successive rows which by the combination of holes therein represent Z and X codes. Each line will represent either a plus or a minus direction (depending upon the absence or presence of a hole in column 6), and some desired ratio between zero and .030 inch per half revolution of the transmission input shafts 66 and 65.

Assume that two successive rows on the tape 75 represent −Z.015 and +X.003. When the first row representing −Z.015 (see Tables I and II, supra) is read, the holes therein will result in simultaneous actuation of the tape reader switches TR7, TR6 and TR1–4. While those switches are actuated, the timing switch contacts TSa (FIGS. 30 and 32A) will momentarily close, thus completing the energization path from the line L1 through contacts TSa, TR8a, TR7a and LSb, for the coil of a relay R9. The contacts R9a close to energize the cycle solenoid CS (FIGS. 15 and 32A), thereby initiating one cycle of the cams 170, 121 and of the slowdown unit 70, as previously described. Moreover, the relay contacts R9b will close while the contacts TSa and TR7a are still closed. This will momentarily energize the solenoids SZ1, SZ2, SZ4, SZ8 and SZr through the already closed tape reader contacts TR1a, TR2a, TR3a, TR4a and TR6a. Accordingly, the corresponding ones of the pins 127 (FIG. 6) in the Z axis transmission will be released to positions such that they will shift the clutches therein to the necessary positions for producing a drive ratio of .015 inch, and in a −Z direction.

When the cam follower 122 is unlatched in response to energization of the solenoid CS and drops into the cam 121 (FIG. 5), but before the shifting frame 120 is reciprocated, the limit switch LS is actuated, thereby opening contacts LSb and closing contacts LSa (FIG. 32A). Relay R9 is thus dropped out and prevented from being re-energized so long as contacts LSb remain open. Relay R10 is, however, now conditioned to be energized through contacts LSa when the next succeeding row, representing +X.003, is read from the tape 75.

The main shaft 69 has now started its second revolution and the tape reader 76 senses the second row of holes in the tape. This is a +X.003 code according to the example given above. Accordingly, the reader switches TR1 and TR2 will be actuated and the timing contacts TSa will close. The latter will energize relay R10 and its contacts R10a will close to complete a current flow path through contacts TR16 and TR2b to energize solenoids SX1 and SX2. This releases the corresponding pins 127 in the X axis transmission.

Then the cam 121 and its follower 122 (FIG. 5) will shift the frame 120 to the left and then to the right, and the released pins 127 will shift the appropriate ones of the corresponding clutches to set the Z and X axis transmissions respectively to −.015 and +.003 drive ratios, as previously described. The cam follower 122 is then lifted and relatched so that contacts LSa and LSb are deactuated. The carriage 50 and cross slide 49 (FIG. 2) are now being translated in −Z and +X directions at feed rates equal to .015 and .003 inch per half revolution of the input shafts 66 and 65. The tape 75 is being advanced past and read by the feeler pins F18 in the reader 76 (FIG. 30) one row for each revolution of the main shaft 69 and thus one row for each .015 inch and .003 inch of travel of the carriage 50 and across slide 49, respectively.

When the next set of indicia, i.e., successive Z and X code rows, of the punch tape 75 are read, the decoding and shifting operation described above will be repeated. According to the particular signs and values represented by any set of Z and X code rows, the X and Z axis transmissions 61 and 56 may be individually set to any ratio between 0 and .030 inch (in steps of .001 inch), and to drive their corresponding movable elements (carriage 50 and the cross slide 49) in either positive or negative directions. With the decoding system here disclosed, a set of indicia always includes both Z and X code rows, the corresponding transmission being set to a zero ratio if no motion (represented by a ZO or XO code) along the Z or X axis is desired. Each time that a shifting cycle occurs, the transmission input shafts are automatically slowed down, and they also lose a predetermined angle (in the illustrated example, one half revolution), relative to their normal rotation which would otherwise be caused by the main shaft 69, so that a predetermined small length $c$ (here one transverse row) of the tape 75 passes through the reader without corresponding motion of the movable members.

*Spindle speed selection*

A number of auxiliary functions may be carried out at different points in a motion program in response to auxiliary codes represented at appropriate locations along the tape 75. One of these functions is the selection or determination of the speed of the motor 63, and thus of the spindle 41 (FIG. 2). The changing of the spindle speed to different values is often desirable as different types of operations are performed, e.g., heavy roughing cuts or fine finishing cuts.

For this purpose, a plurality of adjustable control devices are employed, here in the form of four potentiometers P1–P4 (FIG. 32B) having adjustable wipers. Those wipers may be set to different desired positions by turning the knobs P1a–P4a (FIG. 2) located on the panel of the control apparatus. Scales associated with the knobs may be calibrated directly in revolutions per minute of the spindle 41.

The punched tape 75 may have applied thereto at any point, between successive sets of indicia, the speed selection codes S1, S2, S3 or S4, which indicate that the motor 63 is to be driven at a speed determined by the setting of the corresponding one of the potentiometers P1–P4. The row of holes for any S code will contain holes in columns 8, 7 and 6 of the punched tape (see Table II, supra), and when read by the reader 76 will result in simultaneous closure of contacts TR8b, TR7b and TR6c (FIG. 32A). It may be noted that when an S code is read and the switch TR8 is actuated to close the contacts TR8b, the normally closed contacts TR8a open so as to isolate and prevent energization of any of the transmission solenoids.

If the code read is S1, the contacts TR1c will also close; if the code is S2, the contacts TR2c will close; if the code read is S3, the contacts TR1c and TR2c will both close; and if the code read is S4, the contacts TR3c will close. Thus, whenever any S code row is read and the timing contacts TSa are actuated, the A coils of latching relays RS1, RS2 and RS4 will be momentarily energized, by current flow from line L1 to line L2, in a unique combination corresponding to the numerical suffix of the S code. All of the B coils of these relays will be energized each time that any S code is read. Thus, those ones of the relays RS1–RS4 which were previously actuated and latched will be deactuated, unless they are to be in the actuated states according to the numerical suffix of the S code being read. The relays RS1–RS4 thus always, by their states of actuation or deactuation, "store" the last S code which was read from the tape 75. These relays will, however, be properly reset according to the next succeeding S code which may be read from the tape.

Means are provided to make the spindle motor 63 run at a speed which is determined by the setting of the particular one of the potentiometers P1–P4 which corresponds to the stored S code, i.e., S1, S2, S3 or S4. Thus, as shown in FIG. 32B, if the code S1 has been read, the relay RS1 will be latched in its actuated state, and the relays RS2 and RS4 will both be deactuated. Contacts RS1 and RS1g will be open. The contacts RS1a and RS2a will be closed to connect the potentiometer P1 in series with the resistors 289 and 290 across the lines L1 and L2, thereby forming a voltage divider having an adjustable output voltage on the wiper of potentiometer P1. Moreover, the contacts RS1e and RS2d will both be closed, so that the wiper of potentiometer P1 will be connected to the controlling input terminal 291 of the controller 64. The voltage $E_s$ applied to the controller 64 is now determined by the adjustment of the wiper of the potentiometer P1, and the motor 63 will run at a speed proportional to the voltage $E_s$. Because the details of the controller 64 are well-known in the art and may take a variety of forms they need not be illustrated or described.

From the foregoing example, a moment's inspection of FIGS. 32A and 32B will reveal that the wiper of potentiometer P2, P3 or P4 will be connected to the input terminal 291, and the same potentiometer connected in series with the resistors 289, 290 when the relays RS1, RS2 and RS4, by their states of actuation, store an S2, S3 or an S4 code, respectively. Therefore, it will be apparent that the spindle motor 63 may be made to run at any one of four speeds by S codes appearing at different points along the punched tape 75, each of those four speeds being presettable or adjustable at the beginning of the program by setting the wipers of the potentiometers P1–P4.

*Other auxiliary function decoding and control*

It may be desired to control a relatively large number of auxiliary functions automatically from indicia carried on the punched tape 75 at different predetermined points in an overall program of motion. Just to name a few examples in the operation of a machine tool, it might be desired to cause the machine tool to be totally stopped and both its spindle and feed motors de-energized in response to a special "stop" code appearing on the punched tape. In the present instance, such stopping will be produced in response to reading of an A1 code appearing on the punched tape. As a second example, it may be desirable at various points in the program of motion to turn on the flow of coolant so as to keep the tip of the cutter tool from overheating. Yet, in certain types of operations, this coolant is neither necessary or desirable. Accordingly, another auxiliary function might involve turning a coolant pump motor on at a certain point in the program, and turning it off at another point in the program. For purposes of discussion in what follows, it will be assumed that the auxiliary code A5 calls for turning on a coolant pump motor, and the auxiliary code A6 calls for turning off that pump motor.

Whenever an A code row is sensed in the reader 76, corresponding signals will be passed to the auxiliary function decoder 83 (FIG. 2). This auxiliary function decoder is illustrated in detail by the upper portion of FIG. 32B. As will be seen from Table II, supra, any A code row contains a hole in column eight of the tape, but no holes in columns seven or six. Thus, whenever any A code row on the tape is read, the reader contacts TR8d, TR7d and TR6d will all be simultaneously closed at the time that the timing switch contacts TSb close.

The numerical suffix for the S code may have any decimal value between 0 and 31, and for each such value the tape reader contacts TR1d–TR5d (FIG. 32B) will be closed in a particular combination. Thus, the five relays RA1, RA2, RA4, RA8 and RA16 shown in FIG. 32B will be momentarily energized in a particular combination, depending upon the numerical suffix of any A code row which is read from the punched tape 75. If the code A1 is read, the relay RA1 will be momentarily energized by itself. If the code A2 is read, the relay RA2 will be energized by itself; if the code A3 is read, the relays RA1 and RA2 will be simultaneously energized; and so on.

Assume now that the code A1 represents a desired stoppage of the spindle motor 63 and the feed motor 68. If the code A1 is read, the relay RA1 will be momentarily opened, thus interrupting the holding circuit for the contractor coil MC. Thus, the contacts MCa, MCb, MCc, MCd and MCe will be opened, leaving the spindle motor 63 and the feed motor 68 de-energized. It will be apparent, however, that the parallel array 285 (FIG. 32A) of relay contacts will not interrupt the holding circuit for the coil MC if any auxiliary code other than A1 is read. If any other code, for example, A3 is read, the relay contacts RA1a will open, but the relay contacts RA2a will simultaneously close, thus continuing the holding circuit. This holds true for any of the codes of A0 through A31 which might be read from the punched tape.

As a further example, indicated above, it may be desired to turn on a coolant pump motor 295 (FIG. 32B) when the auxiliary code A5 is read, and to turn off the pump motor whenever the auxiliary code A6 is read. For this purpose, a pump contactor coil PC is connected in series with a series array 296 of contacts RA1b, RA2b, RA4b, RA8b and RA16b. The first and third of this series of contacts are normally open, while the remaining ones are normally closed. Thus, the array of contacts 296 will close to complete an energization path for the coil PC only when the code A5 is read, i.e., when the relay RA1 and RA4 are simultaneously energized with the relays RA2, RA8 and RA16 being simultaneously de-energized. Whenever the pump contactor PC is energized, its contacts PCa close to complete a sealing or holding circuit through an array 298 of parallel contacts RA1c, RA2c, RA4c, RA8c and RA16c. Moreover, whenever the coil PC is energized, its contacts PCd and PCc close to connect the pump motor 295 to an appropriate voltage source.

Now, it will be observed that the contacts RA2c and RA4c in the parallel array 298 are normally closed, and that the remaining contacts are normally open. This means that a conduction path will exist through the array 298 whenever the five auxiliary relays are energized in any combination except that in which the relays RA2 and RA4 are simultaneously energized and the remaining relays are de-energized. Therefore, the sealing circuit holding the coil PC energized will continue to exist indefinitely until the auxiliary code A6 is read from the punched tape and the current path through the array 298 interrupted. The reading of any code besides A6 will not result in this interruption.

In accordance with the specific embodiment of the invention here disclosed, the auxiliary code A2 is used to signify that the feed motor 68 is to be run at its maximum speed so as to produce rapid traverse of the carriage 50 and cross slide 49. Moreover, the auxiliary code A4 is used to signify that the feed motor 68 is to be returned to a speed ratio previously selected and stored in response to reading of an F code. The F decoding circuits will be described below, but it will be helpful here to observe how two relays R7 and R8 (FIG. 32B), which may be respectively designated as the "rapid traverse" and "feed" relays, are controlled or energized in response to reading of the A2 and A4 codes.

Moreover, it may be stated at this point that still another auxiliary code, A16, is assigned, in accordance with the specific example embodiment here disclosed, to dseignate that the feed motor 68 is to be slowed down if, at the instant the transmissions 56, 61 are to be shifted, it is running at a speed which is too great.

Referring to FIG. 32B, a parallel array 299 of contacts RA1d, RA2d, RA4d, RA8d and RA16d is connected between the line L1 and a conductor L3. This array 299 has its contacts RA16d normally closed, and the remaining contacts normally open. Thus, the array 299 will complete a conduction path from the line L1 to the line L3 except when the auxiliary code A16 is being read from the punch tape. The rapid traverse relay R7 is connected between the line L3 and the line L2 through a series array 300 of contacts, each being controlled by one of the auxiliary relays. The contacts RA2e therein are normally open while the remaining contacts RA1e, RA4e RA8e and RA16e are all normally closed. Thus, the series array 300 will complete a conduction path from the line L3 to the relay R7 only when the code A2 is read, i.e., when the relay RA2 is energized and the remaining auxiliary relays are simultaneously de-energized. Since the code A2, as noted above, designates rapid traverse operation, the relay R7 will be energized whenever the information on the punch tape indicates that rapid traverse is desired. Once energized, the contacts R7a of the relay R7 will close and complete a sealing circuit around the series array 300, so that the relay R7 will remain picked up until the parallel array 299 opens in response to reading of an A16 code.

In like manner, the relay R8 is connected in series between the lines L2 and L3 through a series array 301 of contacts RA1f, RA2f, RA4f, RA8f and RA16f. Only the contacts RA4f are normally open. Thus, the array 301 will close to complete a conduction path only when the auxiliary code A4, signifying "return to previous feed," is read from the punched tape. Once energized, the relay R8 will cause closure of its contacts RA8a, and thus will be sealed in or held energized until the parallel array 299 opens in response to reading of an A16 code.

*F decoding and feed ratio selection*

The present invention with its many advantages may be practiced by driving the main shaft 69, i.e., the main power input shaft, at a uniform, constant speed. Different absolute feed rates or velocities, in inches per minute, for the movable members (carriage 50 and cross slide 49) during different increments may then be selected by setting the transmission to different drive ratios. For example, if the main shaft 69 always rotates at 200 r.p.m., then the transmission input shafts 65, 66 will normally be driven at 100 r.p.m. with the particular gear ratios described above for the slowdown unit 70. Then, if the Z axis transmission 61 is set to .000, .001, .002, .003 . . . .031 ratios, the carriage 50 will be driven respectively at 0.0, 0.2, 0.4, 0.6 . . . 6.2 inches per minute. Of course, when the transmission 61 is set to a ratio of .001, the carriage 50 will be translated .001 inch for each row on the tape 75 (except for the "extra row"); and when the transmission is set to a .030 ratio, the carriage will be translated .030 inch for each row of the tape. This means that movement of the carriage 50 through the same incremental length at a low velocity will require more rows or a greater distance between two successive sets of indicia on the tape than would be the case if the carriage were being translated at a relatively high velocity.

In some instances it may be desirable to translate the movable element or elements at different velocities during different increments, even though the transmission remains set to the same drive ratio. For this purpose, means are provided to automatically adjust or vary the speed of the motor 68 and the main shaft 69 at different predetermined points in an overall program of motion in response to the reading of auxiliary "feed" code signals appearing on the tape. This makes it possible to impart relatively high or low velocities to the carriage 50 even though the transmission remains set to a high drive ratio, e.g., .030, while nevertheless accurately moving the carriage through different incremental lengths, each row on the tape 75 then representing .030 inch of carriage movement. While the punch tape 75 is almost insignificant in cost, it is in this way possible to produce the same program of incremental lengths and velocities with a shorter overall length of tape which is more conveniently handled.

Moreover, in the particular application of the present system to the control of a lathe or other machine tool, it is desirable to relate the velocity of the cutter 46 (FIG. 2) to the rotational speed of the spindle 41 and the workpiece 45 carried thereby. This spindle speed is selectively changeable at different points in the program, as previously described. Thus, it is more important to control the relative feed rate of the movable members 50, 49, expressed in inches per revolution of the spindle 41 rather than the absolute feed rate or velocity of those members, expressed in inches per minute. Still further, when the cutter 46 is being moved through that portion of a total path in which it is not engaged with the workpiece, it is desirable in the interest of reducing consumed time that the cutter be translated at a high or "rapid traverse" velocity, without regard to the spindle speed.

In order to realize these desirable objectives, the present system may include auxiliary code indicia at predetermined points along the program tape 75 and which, when read, will cause the feed motor 63 to operate at a speed which is a preselected ratio of the then existing speed of the spindle 41 and the motor 63. Rather than denominating such auxiliary code indicia as representing the "speed" of the motor 68, it is in the present instance more properly termed "feed ratio" indicia, and is here denominated as "F" codes (see Table II, supra). Each "F" code indicates the desired ratio or factor of proportionality between the speed of the motor 63 and the speed of the motor 68. These codes thus call for different speeds of the motor 68, but in terms of a ratio to the speed of the motor 63.

Moreover, an auxiliary code "A2" is assigned to represent "rapid traverse" operation of the motor 68 at its maximum speed without regard to the spindle speed. Whenever an "A2" code row is read from tape 75, the main shaft 69 is driven at a relatively high speed, and the carriage 50 or the cross slide 49 will thus be translated very rapidly.

In the present instance, any F code between F0 and F31 may be represented by a row of holes on the punched tape 75. Such a row of holes will always contain a hole in columns seven and eight, but no hole in column six (Table II, supra). It will have holes in columns one through five representing a numerical suffix between 0 and 31. Therefore, whenever an F code row is read from the tape 75, it will be transmitted to the feed ratio selector 84 (FIG. 2) which is schematically detailed in FIG. 32C.

As shown in FIG. 32C, a series array 305 of normally open contacts TR8d, normally open contacts TR7d, and normally closed contacts TR6d are connected in series through timing switch contacts TSc from the line L1 to a conductor L4. Whenever an F code is read, the tape reader contacts TR1e–TR5e will be closed in a particular combination which represents the numerical suffix for that F code. These latter contacts are connected respectively in series with the A coils of respective latching relays RF1, RF2, RF4, RF8 and RF16, while the B coils of those relays are connected directly between the line L4 and the line L2. It will be apparent, therefore, that each of these relays will be released to its deactuated state when an F code is read, unless the corresponding contacts TR1e–TR5e close. If any one of the latter contacts closes when an F code is read, then the corresponding feed storage relay RF1, RF2, RF4, RF8 and RF16 will be latched in its actuated condition. Thus, if the code F2 has been read, only the relay RF2 will be actuated; if the code F3 has been read, both relays RF1 and RF2 will be actuated, and so on. In this way, the five feed storage relays by their states of actuation represent and store the last F code which has been read from the punched tape 75; but they will be reset in accordance with the next succeeding F code row which is read.

In order to make the feed motor 68 run at a ratio of the speed of the spindle motor 63, such ratio being determined by the numerical value of the stored F code, a voltage is created which is always proportional to the speed of the spindle 41. That voltage $Et1$ is here produced by the spindle tachometer 85 (FIGS. 2 and 32C). A selected fraction of the voltage $Et1$ is produced according to the value of the stored F code by connecting a plurality of resistors across the tachometer 85 to form a voltage divider, and by effectively tapping to different points of the voltage divider according to the particular stored F code.

As here shown in FIG. 32C, ten resistors are connected in series with the tachometer 85, with the line L2 forming a common junction point. Reading from left to right, the first five resistors have resistance values related according to a binary progression, e.g., 10 ohms, 20 ohms, 40 ohms, 80 ohms, and 160 ohms. The next five resistors have corresponding resistance values. The first five resistances are paralleled by respective normally open relay contacts RF1a, RF2a, RF4a, RF8a, and RF16a. The succeeding five resistances are paralleled by respective normally closed relay contacts RF1b, RF2b, RF4b, RF8b, and RF16b. Thus, under normal conditions, all of the five resistors on the right side of the voltage divider are shunted and the value of resistance in series with the tachometer 85 is the sum (310 ohms) of the first five resistors on the right. A control voltage $Ef$ appearing between the line L2 and an output terminal 308 of the voltage divider thus normally has a zero value. If now the five feed storage relays are conditioned to store the code F1, the relay contacts RS1a will close and the relay contacts RF1b will open. The former contacts remove 10 ohms from the series circuit connected across the tachometer 85, while the contacts RF1b insert 10 ohms. Thus, the total resistance across the tachometer 85 remains constant. However, under these conditions, the feed voltage $Ef$ (between terminal 308 and line L1) will have a value equal to $\frac{1}{31}$ of the tachometer voltage $Et2$, since the voltage $Ef$ appears across the 10 ohms resistor associated with the contacts RF1b, and the total resistance across the tachometer 85 is 310 ohms.

Similarly, if the feed ratio storage relays store the code F2 then the contacts RF2a will be opened and the contacts RF2b will be closed. The total resistance across the tachometer 85 will remain at 310 ohms and the voltage $Ef$ will be that which appears across the 20 ohms resistor in parallel with the contacts $Rf2b$. Thus, the voltage $Ef$ will be $\frac{2}{31}$ of the tachometer voltage $Et1$. In like manner it will be apparent that the voltage $Ef$ has a ratio of $\frac{1}{31}$ to $\frac{31}{31}$ relative to the tachometer voltage $Et1$ as the stored F code takes on the values F1 through F31. Thus, the voltage $Ef$ represents a predetermined fraction of the speed of the spindle 41, that fraction being determined by the numerical suffix of the stored F code.

Assuming for the moment that either the contacts R8b or the contacts R29a (FIG. 32C) are closed, and that the contacts R7b are closed, it will be seen that the feed voltage $Ef$ is connected in series bucking relation with the voltage $Et2$ produced by the feed tachometer 88 in a series circuit which includes the base-emitter junction of an NPN transistor T1. The voltage $Et2$ is, of course, proportional to the speed of the feed motor 68 and of the main shaft 69. Therefore, if the feed motor 68 is running at a speed in excess of the desired fraction of the spindle speed, i.e., the voltage $Et2$ exceeds the voltage $Ef$, the current flow (see dotted line in FIG. 32C) in the base-emitter circuit will decrease. On the other hand, if the feed motor 68 is operating at a speed which is below the desired ratio to the speed of the spindle 41, then the voltage $Ef$ will exceed the voltage $Et2$, and the flow of base-emitter current through the transistor T1 will increase. The transistor T1 has its collector connected through a load resistor 309 to the line L1, and its emitter is connected, as shown, to the line L2. Thus, the collector current and the voltage drop E1 across the resistor 309 will increase or decrease depending upon whether the feed motor 68 is operating below or above the desired fraction of the spindle speed, that fraction being represented by the stored F code and proportional to the feed voltage $Ef$.

As explained previously, the feed motor controller 74 produces a voltage and current for the feed motor armature 288 which is proportional to the difference of the two control voltages, E1 and E2. Assuming that the voltage E2 is zero, then the voltage and current applied to the armature 288 will be proportional to E1. Therefore, as the voltage E1 increases, the motor 68 will speed up and as the voltage E1 decreases, the motor 68 will slow down. As the motor speeds up, the voltage $Et2$ of the tachometer 88 will, of course, increase, thereby tending to reduce the base-emitter current through the transistor T1, and thereby reducing the voltage E1. Therefore, for each value of the feed voltage $Ef$ the control system here shown will come to equilibrium with the control voltage E1 and the speed of the motor 68 proportional to $Ef$. Thus, depending upon the value of the stored feed ratio F code, the speed of the motor 68 and main shaft 69 will have a selected ratio to then-existing speed of the motor 63 and the spindle 41.

At any point in the motion program, an F code read from the punched tape 75 may change the states of the feed storage relays RF1, RF2, RF4, RF8 and RF16, thus changing the value of the feed voltage $Ef$ and causing the motor 68 to run at a different speed. Likewise, if the speed of the spindle 41 is changed, the tachometer voltage $Et1$ will change and alter the value of the voltage $Ef$, so that the motor 68 is maintained at the selected ratio of the spindle speed. In this manner, the feed motor 68 may be controlled to run at any fraction between $\frac{1}{31}$ and $\frac{31}{31}$ of the speed of the spindle motor 63.

At various points in the program of motion, it may be desired to operate the feed motor 68 not at a feed speed but rather at a relatively high rapid traverse speed. This action is produced by placing an auxiliary code A2 at an appropriate point along the punched tape 75, and when this code is read, the relay R7 (FIG. 32B) will be picked up and sealed in, as previously described. Moreover, the relay R8 will, under these conditions, be de-energized, for a reason which will be made clear below.

Whenever the relay R7 is actuated, its contacts R7b (FIG. 32C) are opened to isolate the base-emitter circuit of the transistor T1 from the voltage divider output terminal 308. The feed ratio voltage $Ef$ is thus removed from controlling relationship with the transistor T1. Moreover, its contacts R7c are closed so as to connect a rapid traverse reference voltage $Ert$, here shown as provided by a battery 310, directly in series with the tachometer 88 and the base-emitter junction of the transistor T1. Preferably, the voltage $Ert$ produced by the battery 310 is adjustable, but it will be set to have a value considerably in excess of the maximum value which the voltage $Ef$ can have. Thus, with the battery 310 having the polarity shown in FIG. 32C, it tends to increase current flow through the base-emitter circuit of the transistor T1, and along the current path indicated by dashed lines. Accordingly, current through the transistor T1 will be increased and the voltage E1 will be increased so that the feed motor is accelerated until it reaches a rapid traverse speed at which the fed tachometer 88 produces an opposing voltage $Et2$ which brings the system to equilibrium. Thus, under the conditions illustrated, the feed motor is operated at a relatively high speed determined by the value of the traverse reference voltage $Ert$, and the two movable elements 50, 49 driven through the Z and X transmissions will be translated at rapid traverse rates. Of course, the absolute value of the rapid traverse velocity will depend upon the drive ratios to which the transmissions have been set, but usually this will be substantially the highest drive ratio, e.g., .030.

Once the control apparatus has been conditioned (by the reading of an A2 code) to cause rapid traverse speed of the feed motor 68, it may be returned to the feed rate represented by the previously stored F code at any time. In order to accomplish this, an auxiliary code A4 is placed on the tape 75 to signify the end of a rapid traverse condition, or to signify "return to previously stored feed rate." Whenever the code A4 is read from the punch tape, the relay R8 (FIG. 32B) will be energized and sealed in, as previously described. Moreover, the relay R7 will be de-energized at this time, in a manner which will be made clear below. Thus, whenever the relay R8 is energized and sealed in, the contacts R8b will be closed, the contacts R7b will be closed, and the voltage $Ef$ will be connected in controlling relation with the base-emitter circuit of the transistor T1. Under these circumstances, the speed of the feed motor 68 is determined by the F code stored in the feed ratio relays RF1, RF2, ... RF16.

*Reduction of feed input velocity for shifting, and automatic inhibiting thereof*

The slowdown unit 70 and the transmissions 56, 61 are in the present instance ruggedly constructed to transmit relatively great amounts of power. The components are relatively heavy and possess considerable inertia. Because of this, it has been found that the main shaft 69 should not be rotating faster than a predetermined maximum speed (here, 250 r.p.m.) at the time that a slowdown and shifting cycle is initiated and consummated. If the speed of the shaft 69 exceeds the permissive maximum value when the slowdown and shifting cycle occurs, the transfer of the positive clutches in the transmissions 56, 61 will not be reliable, and damage to certain gears in the slowdown unit may occur. Of course, in certain lighter embodiments of the invention, such as instrument mechanisms, or with other forms of transmissions and slowdown units besides that here illustrated, this problem may not exist.

To overcome the above-stated difficulty in the present instance, the punched tape 75 has applied thereto an "anticipation" or "slowdown" code which is located near the end of the series of rows for one increment of movement, and just preceding the set of Z and X code indicia for the succeeding increment. The code assigned as an "anticipation" or "slowdown" signal in the present instance, is A16. It is applied to the tape 75 (see FIG. 4) in the sixth row from the end of any group of rows representing one increment of movement and which includes an A2 (rapid traverse) or an A4 (return to feed ratio) code. Stated another way, the A16 code always appears six rows before the Z code row for one increment, if the preceding increment has involved operation at either rapid traverse or at a selected feed ratio. Thus, the A16 code appears in some, but not all of the groups of rows representing different increments of motion.

Assume first that the apparatus is operating either (1) in rapid traverse (with relay R7 actuated and relay R8 deactuated) so that the transistor T1 is controlled by current in the dashed line path of FIG. 32C, or (2) at a selected feed ratio (with the relays R8 and R7 respectively picked up and dropped out) so that the transistor T1 is controlled by the voltage $Ef$ and current flowing in the dotted line path of FIG. 32C.

If now the slowdown code A16 is read from the punch tape 75, the relay RA16 (FIG. 32B) will be momentarily energized, while the other auxiliary relays RA1, RA2, RA4 and RA8 remain de-energized. Accordingly, contacts RA16d in the array 299 (FIG. 32B) will momentarily open, while the remaining contacts in that parallel array remain open. This occurs only in response to an A16 code. When it happens, that one of the relays R7 and R8 which was previously energized and sealed in will be dropped out. That is, both relays R7 and R8 will be deactuated.

Thus, the contacts R8b and R7c (FIG. 32C) will both be open to isolate the feed voltage Ef and the traverse voltage Ert from the base-emitter circuit of the transistor T1. Assuming that the relay R29 is deactauted (its contacts R29a opened and its contacts R29c closed), the result of reading an A16 code is to condition contacts R29c, R8c and R7b so that they connect a suitable reference voltage, here shown as a voltage Er provided by a battery 311, in series with the tachometer 88 and the base-emitter junction of transistor T1. The voltage Er is poled to buck or oppose the voltage Et2 provided by the tachometer 88 and is adjusted in magnitude such that it makes the transistor T1 produce a voltage E1 across resistor 309 that results in the motor 68 running at the predetermined maximum safe speed (250 r.p.m.) for a shift cycle of operation. The action of the reference voltage Er and the tachometer voltage Et2 in controlling the transistor T1 to determine the speed of the motor 68 is the same as that previously described in connection with the voltage Ef.

Thus, except as noted below, whenever the A16 code is read, the voltages Ef and Ert are both disconected from controlling relation in the input circuit of the transistor T1 and a reference voltage Er is substituted. The reference voltage Er may be greater or less than the feed voltage Ef, depending on whether or not the stored F code represents a high or low fraction of the spindle speed, and whether or not the spindle speed and the tachometer voltage Et1 are of a high or low value. Thus, if the apparatus is operating at a selected feed ratio which makes the speed of the main shaft 69 less than 250 r.p.m., the response to an A16 code would, instead of causing slow-down of the shaft 69 to 250 r.p.m., cause speed-up of that shaft to 250 r.p.m. This would still permit safe shifting of the transmissions but it would result in an increase in the feed rate of the cutter 46, possibly causing an undesired marking of the workpiece.

Therefore, in accordance with another aspect of the present invention, provision is made to sense whether the main shaft 69 is rotating at a speed less than the maximum safe shift speed, e.g., 250 r.p.m. If it is, then any response to an anticipation code A16 read from the tape 75 is prevented, and the motor 68 continues to run at the speed determined by the feed voltage Ef during the shifting cycle of operation.

To accomplish this in the present instance, the selected feed voltage Ef derived from the potentiometer terminal 308, and which by its magnitude is proportional to the speed of the motor 68 and shaft 69, is compared with a reference voltage Er1 having a value which is the same as the value which Ef will have when the latter is causing the motor 68 to operate at the maximum permissible shifting speed (250 r.p.m.). If the voltage Ef is less than the voltage Er1 and the motor 68 is operating in a feed mode rather than a rapid traverse mode, the response to the A16 code is inhibited. If the voltage Ef is less than the voltage Er1 and the motor 68 is operating in a rapid traverse mode under the control of the traverse voltage Ert, the response to the A16 code is prevented from bringing the voltage Er1 into operative control, but is caused instead to connect the feed voltage Ef into operative control of the motor 68. Thus, in either case, operation of the transistor T1 under the control of the reference voltage Er is prevented.

Figure 32D:
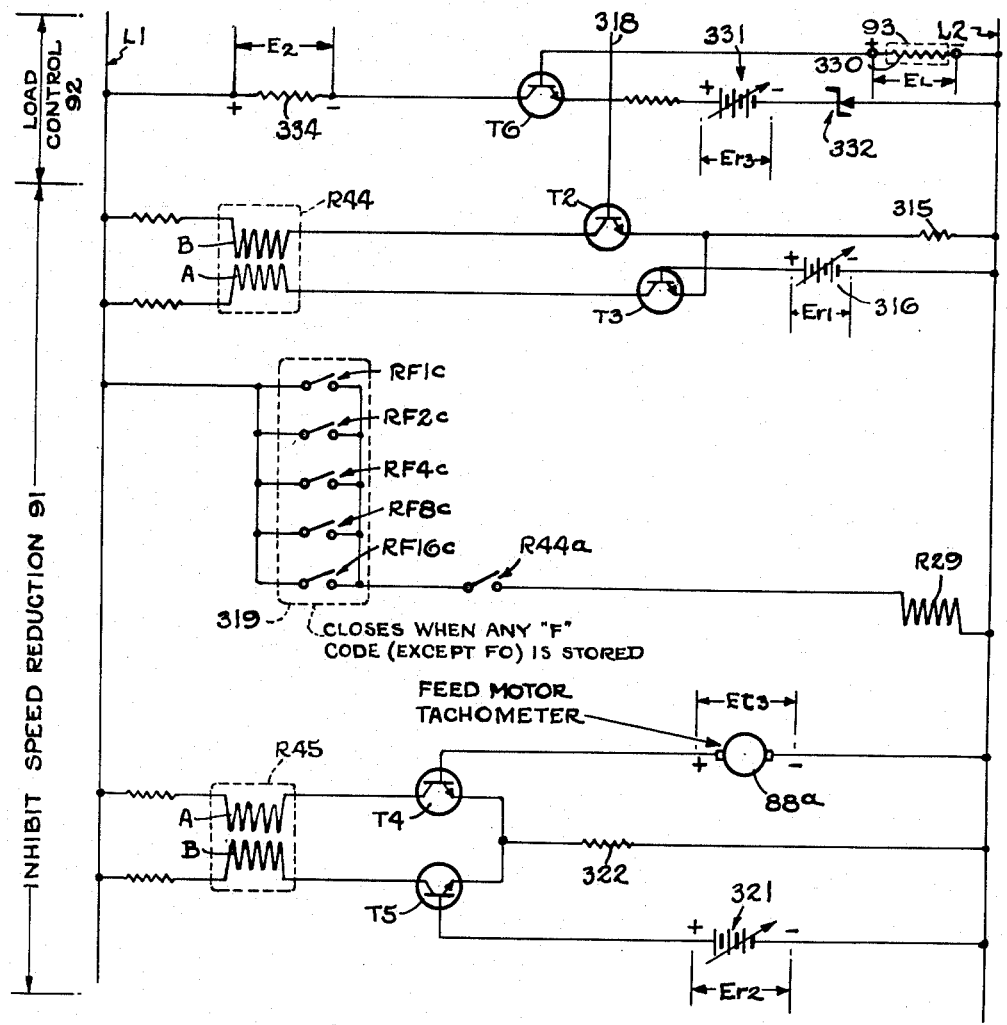

Referring to FIG. 32D, these functions are accomplished by two transistors T2 and T3, respectively having their collectors connected to the positive line L1 through the B and A coils of a latching-type relay R44. The emitters of these two transistors are connected to the line L2 through a common emitter resistor 315. To control the conduction of the transistor T3, the reference voltage Er1 which is here provided by a battery 316, is connected in the base-emitter circuit of that transistor T3 and poled normally to produce current flow across the base-emitter junction thereof. On the other hand, the voltage Ef appearing between the line L2 and the terminal 308 is connected in series via a conductor 318 with the base-emitter junction of the transistor T2, the voltage Ef having a polarity tending to produce current across the base-emitter junction. The transistors T2 and T3 are also coupled together by virtue of the action of their common emitter resistor 315. Current flow in the collector circuit of the transistor T2 tends to reduce current flow in the collector circuit of the transistor T3, and vice versa. Because of this, the transistors T2, T3 act as a voltage comparator circuit and will cause the relay coil A to be energized if the voltage Ef is less than the voltage Er1, but will cause the relay coil B to be energized and the coil A to be substantially de-energized if the voltage Ef is greater than the reference voltage Er1.

Thus, if the motor 68 is operating at a speed greater than 250 r.p.m., the voltage Ef will be relatively great, and the coils B and A of the relay R44 will be respectively energized and de-energized resulting in the relay being deactuated. This means that the critical speed (250 r.p.m.) of the main shaft 69 is being exceeded, so that the slowing down operation in response to an A16 code must occur. On the other hand, if the voltage Ef is relatively low compared to the voltage Er1, the coils B and A of the relay R44 will be respectively de-energized and energized so that the relay will be in its actuated state. Accordingly, the relay contacts R44a (FIG. 32D) will be closed to signify that any response to an A16 code must be inhibited.

If for any reason no feed ratio has been selected and stored in the feed storage relay RF1, RF2, . . . RF16, the voltage Ef would be zero, since the contacts associated with the five resistors on the right side of the voltage divider (FIG. 32C) would all be closed. If the voltage Ef were connected in controlling relationship with the transistor T1 at a time when the value of Ef is zero, there would be a tendency for the motor 68 to stop, or to run at a very slow speed. This would also slow down the transport of the tape 75 through the reader 76, and unnecessarily consume extra time. Accordingly, if there is no feed ratio stored by the feed storage relays, the shift reference voltage Er is left in control of the feed motor 68, so that the latter runs at the shifting speed (250 r.p.m.) while the transmission clutches are being shifted.

In order to produce the inhibiting action described above when the motor 68 is operating at a selected feed ratio mode, but to prevent inhibiting if no feed ratio has been stored, an array 319 of parallel contacts RF1c, RF2c, RF4c, RF8c and RF16c is connected in series with the contacts R44a and the coil of relay R29 across the lines L1 and L2 (FIG. 32D). The array 319 will provide a conduction path if any feed ratio other than F0 is stored by the feed ratio relays. Therefore, the relay R29 will be actuated if (1) the existing feed voltage Ef indicates that the motor 68 and the main shaft 69 are turning faster than 250 r.p.m., and (2) if some feed ratio other than F0 is stored. Under these circumstances, the relay R29 will be energized.

Accordingly, the contacts R29a in FIG. 32C will be closed, and the contacts R29c will be open. Therefore, even though the contacts R8b and R8c are in their deactuated states, the reference voltage Er will remain disconnected from the input circuit of the transistor T1, and the feed voltage E$f$ will remain connected in that input circuit, even though both relays R7 and R8 have been previously de-energized in response to reading of an A16 code. Therefore, instead of the motor 68 operating at the maximum permissible speed for safe shifting, i.e., 250 r.p.m., under the influence of the voltage E$r$, the motor 68 continues to operate at the speed determined by the voltage E$f$ (somewhat below 250 r.p.m.) during the succeeding cycle of operation of the slowdown unit 70 and shifting of the transmission clutches.

It may happen, also, that when an antipication code A16 is read and both the relays R8 and R7 de-energized, the motor 68 is running at such a high speed that it cannot readily slow down to the safe speed of 250 r.p.m. while only six lines of punch tape are being passed through the tape reader, i.e., before the shifting cycle of operation occurs in response to the next set of Z and X code lines. In order to assist in reducing the speed of the motor 68, means are provided to dynamically brake that motor in response to an A16 code if the motor is then operating in excess of 250 r.p.m.

For this purpose, two transistors T4 and T5 (FIG. 32D) are connected as a voltage comparing circuit, their collectors being connected to the line L1 through the A and B coils, respectively, of a latching type relay R45. The base-emitter input circuit of the transistor T4 includes a feed motor tachometer 88$a$ (which may be mounted on and driven from the same shaft as the tachometer 88 which produces a voltage E$t$3 proportional to the speed of motor 68 and the main shaft 69. The base-emitter control circuit of the transistor T5 includes a reference voltage E$r$2, here shown as provided by a battery 321. The emitters of the two transistors T4, T5 are returned to the line L2 through a common emitter resistor 322. The voltages E$t$3 and E$r$2 are both poled to produce current flow through the base-emitter junction of their respective transistors T4 and T5. The magnitude of the reference voltage E$r$2 is chosen so that when the main shaft 69 is rotating slightly less than 250 r.p.m., the transistor T5 is conductive, but the transistor T4 is substantially cutoff. As the speed of the shaft 69 increases above 250 r.p.m., the transistor T4 becomes conductive and current flow through transistor T5 is reduced. Thus, when the motor 68 and the shaft 69 are turning at a speed greater than 250 r.p.m., the A coil of the relay R45 will be energized by current flow through the transistor T4, while the B coil will be substantially de-energized due to the inverse coupling of the common emitter resistor 322. Actuation of the relay R45 signifies that the main shaft 69 is rotating above the critical speed safe for a shifting cycle of operation. On the other hand, if the voltage E$t$3 is relatively small because the motor 68 and shaft 69 are rotating at less than 250 r.p.m., the coil A will be substantially de-energized and the coil B will be energized, so that the relay R45 will be deactuated. This signifies that the shaft is rotating at a speed safe for operation of the slowdown and shifting means.

As shown in FIG. 32C, a dynamic braking resistor 325 is connected in parallel with the armature 288 of the motor 68 through normally closed contacts R8$d$ and R7$d$ and normally open contacts R45$b$. Thus, if at the time an A16 code is read and both relays R7 and R8 are de-energized, the relay R45 is actuated and the contacts R45$b$ are closed because the shaft 69 is rotating in excess of 250 r.p.m., the dynamic braking resistor 325 will be connected across the motor armature 288, and that motor will, therefore, be quickly reduced in its speed. This assures that the speed will fall off sufficiently fast so that by the time shifting of the transmission clutches occurs in response to reading of the next Z and X code lines from the punched tape, the speed of the shaft is at or below 250 r.p.m.

It is possible that through some inadvertent circumstances or failure of electrical components the motor 68 and the shaft 69 might not be completely slowed down to 250 r.p.m. by the time that the slowdown unit 70 is initiated on a cycle of operation. Such shifting of the preselected clutches normally occurs following the energization of relay R9 so that the contacts R9$a$ close to energize the solenoid CS and thus initiate one cycle of the slowdown and shifting mechanism. In order to prevent that shifting operation if the speed of shaft 69 is above 250 r.p.m., normally closed relay contacts R45$a'$ are connected in series with the solenoid CS. Thus, energization of the latter is prevented and no shifting can occur even if a new set of indicia is read from the punch tape, because the contacts R45$a'$ will be open if the speed of the shaft 69 exceeds 250 r.p.m.

Moreover, normally closed relay contacts R45$a$ are connected in parallel with the normally closed relay contacts R9$c$ in the holding circuit for the motor contactor MC (FIG. 32A). It will be seen, therefore, that if at the time the relay R9 is picked up just prior to a shifting cycle of the transmission clutches, the relay R45 is actuated due to the fact that the shaft 69 is exceeding a safe speed, the contacts R45$a$ will also be open. This will interrupt the sealing or holding circuit for the coil MC, and will thus de-energize the coil MC to open the contacts MC$a$, MC$b$, MC$c$, MC$d$ and MC$e$. These last four contacts will disconnect the spindle motor controller 64 and the feed motor controller 74 from their power sources, so that both the spindle motor 63 and the feed motor 68 will immediately by de-energized. Thus, this arrangement prevents the present apparatus from shifting the positive clutches in the transmissions while the main input shaft 69 is rotating at an excessive speed, and, furthermore, automatically terminates operation so that any malfunction of electrical components may be corrected before the program is continued.

*Automatic load control*

The feed rate at which the cutter 46 is moved relative to the workpiece 45 (FIG. 2) depends not only upon the selected feed ratio determined by the last F code read from the tape 75, but also upon the ratio to which the transmissions 56 and 61 have been set in response to the Z and X code lines last read. While the feed rate in inches per revolution of the spindle may be very precisely controlled for each and every motion by carefully choosing the F codes and the Z and X codes applied to the tape 75, it would be more desirable to let the programmer who prepares the tape 75 in the first instance only approximate the feed rate which will be produced.

However, to permit feed rates to be established with a relative lack of precision during makeup of the program entails the possibility that the cutting tool will be translated at such a high feed rate while cutting the workpiece that the spindle 41 will be overloaded, i.e., the safe torque which the spindle 41 and the motor 63 can produce will be exceeded. Because the torque load on the spindle 41 and motor 63 can unexpectedly increase considerably when the cutter encounters "rough" spots in a casting being machined or when the cutter is unusually dull, the tendency of the programmer is to be very conservative in the choice of feed rates, for fear that he will overload the motor 63 and damage it by excessive current flow therethrough. Such conservatism results in a given program of motion requiring more time to complete, and thus reduces the quantity of production from the machine tool. But, in control systems of the type here under discussion, such conservatism and inefficiency is a necessary drawback in order to prevent possible overheating and destruction of the spindle motor 63.

With the present system, however, the programmed feed rates and the resulting torque loads imposed on the motor 63 may be made relatively high and without fear that the spindle 41 and the motor 63 will be overloaded. The machine tool is caused to select and establish its own safe maximum feed rate of the cutter 46 in the event that the torque load on the spindle tends to become dangerously excessive.

In accomplishing this objective, means are provided to produce a signal which is generally proportional to the torque load on the spindle 41. That torque load in the present case is proportional to the feed rate at which the cutting tool is moved through the metal of the workpiece. Since the current drawn by the motor 63 is substantially proportional to the output torque it produces, the load or torque senser 93 (FIG. 2) may take the form of an impedance or resistor 330 (FIG. 32A) connected in series with the armature of the motor. The voltage EL produced across the resistor 330 as the result of current passed therethrough is directly representative of the torque load on the spindle 41.

In order to determine when the torque load and the voltage EL exceed their predetermined safe values, the latter voltage is compared with a reference voltage $Er3$ which is here shown as provided by a battery 31 (FIG. 32D). For this purpose, the resistor 93 and the battery 331 are connected in a series circuit with the polarities of the voltages EL and $Er1$ opposing. The series circuit includes the base-emitter junction of an NPN transistor T6, and also includes a Zener diode 332 poled to oppose current flow forwardly through the base-emitter junction. It will be seen that the voltage EL tends to produce forward current flow through the base-emitter junction, while the reference voltage $Er3$ opposes such current flow. Thus, when the voltage EL is relatively slight or small, the transistor T6 will be cutoff, and substantially no current will flow through its collector and a load resistor 334 connected therefrom to the line L1. However, when the voltage EL tends to rise above a value which represents a safe torque or current for the motor 63, then it will exceed the reference voltage $Er3$ by an amount sufficient to cause reverse breakdown of the Zener diode 332. Under these circumstances, base-emitter current through the transistor T6 immediately begins to flow, and will be substantially proportional to the amount by which the voltage EL exceeds the reference voltage $Er3$ and the breakdown voltage of the Zener diode. This base-emitter current through the transistor T6 turns the latter "on" so that current flows from the line L1, through the load resistor 334, and through the collector of the transistor T6 and the emitter thereof to the line L2. Thus, the voltage drop E2 across the load resistor 334 will be substantially proportional to the amount by which the load voltage EL exceeds the predetermined safe value.

As previously explained, the voltage E2 is applied as one controlling input to the motor controller 74 (FIG. 32C) and the output current of the latter supplied to the motor armature 288 is substantially proportional to the difference between the two control voltages E1 and E2. Therefore, whenever the safe torque load exerted by the motor 63 is automatically prevented from overheating increased from its normal zero value and the current supplied to the armature 288 will be decreased. Thus, the feed motor 68 will automatically be reduced in speed, so that the cutter 46 does not move through the workpiece at such a high speed rate. This, in turn, will result in a lower torque load imposed on the motor 63 so that the voltage EL will again be reduced to a lower safe value. In this manner, the current passed through the motor 63 is autoamtically prevented from overheating and burning out that motor even though the scheduled feed rates might tend to produce such overloading. The technician or programmer who in the first instance makes up a program of motion, may therefore liberally select feed rates to be represented on the punch tape 75 for the successive increments of motion, and if he chooses feed rates which are excessive and tend to overload and destroy the motor 63, the present control system will automatically prevent such overloading by causing the reduction in those feed rates. The machine tool may thus be made to operate substantially at its maximum speed and efficiency.

RÉSUMÉ OF OPERATION

While the organization and operation of the present motion control system will be clear from the foregoing description, it will be helpful to present a brief résumé, particularly with reference to the operations that are sequentially produced in response to the reading of the various rows of coded indicia appearing on the exemplary punched tape 75 in FIG. 4.

After the spindle and feed motors 63 and 68, have been started, and the tape 75 (FIG. 4) is being transported through the reader 76 (FIG. 30) the first three rows of punched holes sensed by the reader will represent Z0, X0 and S2. The Z0 and X0 rows will produce a slowdown and shifting cycle for the X and Z axis transmissions, but will restore those transmissions to their zero drive ratios, so that both the carriage 50 and the cross slide 49 (FIG. 2) will remain stationary. As the third line representing the speed selection code S2 is read from the punched tape, the relay RS2 in FIG. 32A will be actuated. Thus, the wiper of the potentiometer P2 (FIG. 32B) will be connected in controlling relation to the spindle motor controller 64 and the adjusted setting of that wiper will determine both the magnitude of the control voltage Es and the speed at which the spindle motor 63 and the spindle 41 rotate.

The tape 75 will continue to be advanced through the reader 76. The next three rows containing punched holes represents Z0, X0 and F22. The first two of these lines produce a slowdown and shifting cycle for the transmissions 56 and 61, but the transmissions are left in their zero ratios so that the carriage 50 and cross slide 49 remains stationary. As the row of holes representing F22 is read, however, the relays RF2, RF4, RF6 (FIG. 32C) will be set to their actuated state, while the remaining feed storage relays are deactuated. Accordingly, the feed voltage Ef will have a ratio of 22:31 relative to the voltage $Et1$ produced by the spindle tachometer 85. When this feed voltage Ef is later connected through various relay contacts in controlling relation with the transistor T1, the feed motor 68 will be made to run at a speed ratio of 22:31 relative to the spindle motor 63.

The next three lines appearing on the punched tape 75 in FIG. 4 are intended to produce the first increment of motion which is depicted in FIG. 3B. Since this increment of motion is to be 1.230 inches in a negative direction along the X axis, the Z and X code lines are made to represent Z0 and —X.030, respectively. As these two rows of holes are read, therefore, the slowdown unit 70 and shifting mechanism will be put through one cycle, the Z axis transmission 61 will be left in its zero drive ratio, but the X axis transmission 56 will be set to its .030 ratio and for drive of the cross slide 49 in a negative direction.

The third line representing the code A2 (calling for rapid traverse) causes the relay R7 to be energized and sealed in (FIG. 32B), as previously described. Since the relay R8 is dropped out, the traverse reference voltage $Ert$ is connected in circuit with the base-emitter junction of the transistor T1 (FIG. 32C). Accordingly, the feed motor 68 is energized to run at a very high or rapid traverse rate, and the cutter tool 46 is moved inwardly toward the axis of rotation of the workpiece 45 (FIG. 3A).

It will be seen from FIG. 4 that this increment of motion amounting to 1.230 inches is produced by a distance D on the tape containing a total of forty-two lines. The first line or distance c representing the Z0 code is not, however, counted as contributing to motion of the cross slide 49 since, as previously noted, the operation of the slowdown unit 70 in shifting of the transmissions results in loss of one-half revolution of the transmission input shafts and thus the loss of one row of tape. Accordingly, the distance $d$ for the #1 increment illustrated on the tape in FIG. 4 is made 41 lines although the total distance $D=c+d$ is forty-two lines. At a drive ratio of .030 inch per half revolution of the transmission input shafts, this will cause the cross slide to move a total of 1.230 inches before the transmissions are again shifted to begin the #2 increment.

As noted in FIG. 3B, however, it is intended that the cutter tool move inwardly toward the workpiece a total of 1.244 inches. Thus, after the first increment of motion is completed, a "remainder" of .014 inch remains to be traversed. This remainder is produced by the two rows, i.e., the #2 increment row and the extra row preceding it, on the tape 75 (FIG. 4) and these are preceded by a code row A16 in the group of rows for the #1 increment. When the code row A16 is read, the relay R7 drops out and the reference voltage $E_r$ (FIG. 32C) is connected in controlling relationship with transistor T1, so that the motor 68 is slowed down to a safe speed for operation of the shifting mechanism. The motor 68 will remain at this speed until the A4 code appearing in increment #3 is read from the punched tape.

As the Z and X code lines for the #2 increment are read, the main power shaft 69 will rotate two revolutions. However, the Z axis transmission will be shifted to its zero drive ratio and the X axis ratio will be shifted to its −.014 drive ratio. During the slowdown and shifting operation, the X axis input shaft will be rotated through one-half revolution, so that the cross slide will be translated precisely .014 inch. Thus, the cutter has now traveled through increments #1 and #2, shown in FIG. 3B.

The next series of rows appearing on punch tape 75 begin with the representations of +Z.030, X0, A4 and A5. In response to reading of the Z and X code rows, the two transmissions are shifted so that the Z transmission is set to its .030 ratio and the X axis transmission is set to its zero ratio. Thus, the carriage 50 and the cutter 46 begin moving toward the left, as shown in FIG. 3B, to produce the #3 increment of motion. As the code line A4 is read, signifying "return to feed ratio previously stored," the relay R8 is energized in the manner described above. With this, the feed voltage $E_f$ produced by the contacts of the feed storage relays from the potentiometer in FIG. 32C will be connected in controlling relationship with the transistor T1, and the motor 68 will be driven at a speed which corresponds to the previously stored desired ratio. As noted previously, the second group of punched holes on the tape 75 contained an F22 code. This information is still stored in the feed storage relays. Accordingly, the motor 68 will now be driven a ta feed ratio of 22:31 relative to the speed of the spindle motor 63, and the cutter tool 46 will begin to turn the desired diameter on the right shank of the workpiece 45 (FIG. 3A) as it moves through the #3 increment.

Because the #3 increment is to have a length of .960 inch, the rows or sprocket holes assigned to that increment on the tape 75 (FIG. 4) include the initial Z code row which is disregarded due to loss upon cycling of the slowdown unit 70, and thirty-two additional rows counting the X0 row, the A4 row and the A5 row. Since the Z axis transmission is set to a .030 ratio, the cutter will be moved a distance of $.030 \times 32 = .960$ inch before the succeeding Z and X code indicia are sensed by the tape reader.

As the A5 code row in the #3 increment portion of the punched tape 75 is read, it will result in energization and sealing in of the pump motor contactor PC (FIG. 32B). Thus, the coolant pump motor 295 will be started.

As the A16 code row appearing toward the end of the group of rows for the #3 increment on the tape 75 is read, the feed motor 68 will again be slowed down if the shaft 69 is then operating at a speed above 250 r.p.m.

Following that group of rows on the punched tape 75 corresponding to the #3 increment of motion are two Z and X code lines which represent the #4 increment of motion. It will be seen that when these two rows of holes are read, the Z axis transmission will be set to its +.021 ratio and the X axis transmission will be set to its zero ratio. Since there are but two lines on the tape representing this #4 increment, the distance $D=c+d$, where $c$ is one row and $d$ is one row. As these two rows are read, the input shaft for the Z axis transmission will rotate only one-half revolution while that transmission is set to its .021 ratio. Accordingly, the cutter 46 will be advanced .021 inch during the #4 increment, making the total distance between points $b$ and $c$ in FIG. 3A equal to the desired .981 inch. During the travel of the cutter along its #4 increment, the feed motor 68 remains operating at the slow or safe shifting speed of 250 r.p.m., due to the controlling effect of the reference voltage $E_r$ connected in circuit with the transistor T1.

The next series of rows on the punched tape of FIG. 4 corresponds to the #5 increment illustrated in FIG. 3B. It will be seen that the first two code rows represent −Z.030 and +X.015. As these rows are read, the Z and X transmissions will be set to their +.030 and +.015 drive ratios, so that the cutter 46 will be advanced at an angle (see FIG. 3A) due to simultaneous controlled motion of the carriage 50 and the cross slide 49. The third row of holes for the #5 increment represents the code F6, and as this is read, the states of the feed ratio storage relays RF1, RF2 . . . RF16 (FIG. 32C) will be changed so that the relays RF2 and RF4 are both actuated. Accordingly, the feed voltage $E_f$ will have a value which causes the feed motor 68 to rotate at a speed ratio of 6:31 compared to the spindle motor 63.

The fourth row of holes for the #5 increment represents the code A4. When read by the reader 76, this will cause energization of the relay R8 (FIG. 32B) so that there is a "return to the stored feed ratio," i.e., so that the contacts R8b close (FIG. 32C) to connect the feed voltage $E_f$ in controlling relationship with the tachometer 88 and the transistor T1. Accordingly the motor 68 now rotates at a ratio of 6:31 in speed relative to the spindle motor.

As the tape 75 continues to be advanced through the reader, the slowdown code row A16 near the end of the #5 increment will be read. This will result in slowdown of the motor 68 in the manner previously described. The #5 increment of movement is completed and terminated after all of those rows of holes indicated therefor in FIG. 4 have been read. It will be seen that in addition to the first Z code row which is not counted, there are thirty-four rows of holes on the tape for this increment. Thus the cutter 46 will be translated $.030 \times 34 = 1.020$ inches along the Z axis and $.015 \times 34 = .510$ inch along the X axis. This is the desired motion illustrated in FIG. 3B.

Finally, after the #5 increment of motion has been completed, the last four rows of punched holes on the tape 75 are read. These represent the codes Z0, X0, A6, A1. When the Z0 and X0 codes are read, the two transmissions are shifted to their zero drive ratios so that both the carriage 50 and the cross slide 49 are brought to a stop. When the code line A6 is read, the contact array 298 in FIG. 32B opens, thereby de-energizing the coil PC and turning off the coolant pump motor 295. Then, as the code A1 is read, signifying that all operations are to be stopped, the parallel array of contacts 285 in FIG. 32A will open, thereby breaking the sealing circuit for the coil MC. Accordingly, the motor contactor drops out and its contacts open to disconnect the spindle motor controller 64 and the feed motor controller 74 from their respective power sources. Thus, both motors are stopped.

From the foregoing summary of operation, it will be apparent that the present motion control system is one in which both the velocities and lengths of successive increments of motion of a movable member may be controlled directly in response to coded indicia which are represented on an elongated record or punched tape. The present system involves no analog-to-digital or digital-to-analog conversion in the conventional sense, and it obviates the need for any position feedback or comparing means. Because each programmed increment of motion is precisely determined in its length by a pre-established distance between two successive sets of indicia on the punched tape, and the tape movement is in timed relation to the rotation of transmission input shafts, the total motion following a series of increments will precisely equal the sum of the increments. Thus, once the starting point of a movable member is known, its point after any number of increments is precisely established simply by summing those increments. The lengths of successive increments are not numerically represented by coded indicia on the record or punched tape; rather they are represented by distances on the tape so that no decoding of length information is required, no storage of length information is required, and no feedback is required.

It is important also to recognize that the present invention is one which permits a movable member, such as the cutter 46, to be translated at different angles relative to two or more axes. By the arrangement here described, any of a great number of angles of motion, similar to that exemplified by increment #5 in FIG. 3B, may be produced by choosing the relationships of the drive ratios to which the X axis and Z axis transmissions are shifted.

Thus, the present invention brings to the art of programmed motion control systems a considerable simplification and elimination of complex circuits. Yet, it is precise and flexible in its operations and affords control of motions along two or three axes from an elongated record or punched tape which has a relatively simple format and which is thus easily prepared.

We claim as our invention:

1. A system for controlling the lengths and velocities of successive increments of motion and comprising, in combination, a movable member, a multi-ratio transmission having a driven input shaft and having an output shaft drivingly connected to move said movable member, an elongated record having sets of indicia thereon representing different desired transmission ratios and with each set of indicia spaced lengthwise of said record by preselected multiples of a unit distance from the succeeding set, the multiple of unit distances between two sets of indicia representing the desired length of a motion increment, a reader, means for transporting said record lengthwise past said reader a predetermined number of unit distances for each revolution of said transmission input shaft, said reader having means for creating successive sets of signals corresponding to successive sets of indicia passing therethrough, and means responsive to each set of signals for setting said transmission to a corresponding desired drive ratio, whereby the velocity of said movable member in relation to the speed of said input shaft for each increment of motion is determined by a corresponding set of said indicia, and the length of each increment of motion is determined by the number of unit distances on said record separating the corresponding set of indicia from the succeeding set.

2. In a system for controlling the velocities and lengths of successive increments of motion, the combination comprising a movable member, a multi-ratio transmission having a driven input shaft and having an output shaft drivingly connected to move said member, means included in said transmission for selectively establishing any one of a plurality of drive ratios R (in units of member movement per revolution of said input shaft), an elongated record, a reader, means transporting said record past said reader at a rate of $mk$ unit distances per revolution of said input shaft, said record having a plurality of sets of indicia thereon each uniquely representing a drive ratio R desired for one increment of motion, each one set of said indicia being spaced longitudinally on said record by a multiple $d$ of unit distances from the succeeding set of indicia where $d=mkL/R$ and in which L equals the desired length of the increment corresponding to said one set of indicia, means in said reader for creating a corresponding set of signals when each set of indicia on said record passes therethrough, and means responsive to each set of signals for setting said transmission to produce the corresponding drive ratio R, whereby the velocity and length of each increment of movement of said member are determined respectively by the indicia and the spacing of the indicia on said record.

3. A system for controlling the lengths and velocities of successive increments of motion and comprising, in combination, a movable member, a multi-ratio transmission having a driven input shaft and having an output shaft drivingly connected to move said movable member, said transmission having a plurality of two-position clutches selectively shiftable to different position patterns to establish different over-all drive ratios between said input and output shafts, an elongated record having sets if indicia thereon representing different desired drive ratios and with each set of indicia spaced apart lengthwise from the succeeding set by preselected multiples of a unit distance, the multiple of unit distances between two sets of indicia representing the desired length of a motion increment, a reader, means for transporting said record lengthwise past said reader a predetermined number of unit distances for each revolution of said input shaft, said reader having means for creating successive sets of signals corresponding to indicia on said record passing thereby, means responsive to each of said sets of signals for reducing and then increasing the speed of said input shaft during one revolution thereof, and means responsive to each of said sets of signals for shifting said clutches while said input shaft is reduced in speed to a position pattern corresponding to the indicia which produced that set of signals, whereby the velocity of said movable element during each successive increment of movement is controlled by the successive sets of indicia on said record, and the length of each such increment is determined by the spacing between successive sets of indicia on the record.

4. A system for controlling the lengths and velocities of successive increments of motion and comprising, in combination, a movable member, a multi-ratio transmission having an input shaft and having an output shaft drivingly connected to move said movable member, said transmission having a plurality of positive clutches selectively shiftable to produce any one of a plurality of drive ratios between said input and output shafts, a continuously rotating main shaft, a slowdown unit interposed between said main shaft and said input shaft and normally positively driving the latter from the former, said slowdown unit including means selectively actuatable through a cycle to momentarily reduce the speed of said input shaft while causing it to lose a predetermined angle of rotation relative to the rotation of said main shaft, an elongated record having successive sets of indicia thereon each representing a desired drive ratio for one increment and with each set of indicia being spaced longitudinally of the record from the succeeding set by a distance $d$ proportional to a desired extent of an increment plus a distance $c$, a reader, means for transporting said record longitudinally past said reader a predetermined number of unit distances for each revolution of said main shaft and through a distance $c$ when said input shaft loses said predetermined angle of rotation, said reader including means for producing successive sets of signals corresponding to successive sets of indicia transported thereby, means responsive to every set of signals for actuating said slowdown unit through one cycle of operation, and means responsive to each set of signals and operative while said slowdown unit is actuated for shifting said clutches to produce a transmission drive ratio corresponding to the desired ratio represented by the corresponding set of indicia.

5. A system for controlling the lengths and velocities of successive increments of motion and comprising, in combination, a movable member, a multi-ratio transmission having a driven input shaft and having an output shaft drivingly connected to translate said movable member, means in said transmission responsive to a set of coded electrical signals for preselecting any one of a plurality of drive ratios, means for setting said transmission to the drive ratio which has been preselected, an elongated record having successive sets of indicia thereon representing different desired transmission ratios and with each set of indicia spaced lengthwise of said record by preselected multiples of a unit distance from the succeeding set, the multiple of unit distances between two sets of indicia representing the desired length of a motion increment, a reader, means for transporting said record lengthwise past said reader a predetermined number of unit distances for each revolution of said input shaft, said reader having means for creating successive sets of coded electric signals corresponding to successive sets of record indicia passing therethrough, and means responsive to each set of electric signals for correspondingly actuating said preselecting means and then actuating said setting means so that said transmission is set to the desired drive ratio, whereby the velocity of said member relative to said input shaft during each successive increment is determined by the corresponding one set of indicia on said record, and the length of that increment is determined by the distance on said record between the said one set and the next succeeding set of indicia.

6. In a system for controlling the velocities and lengths of successive increments of relative motion simultaneously along a plurality of axes, the combination comprising a plurality of members each movable along one of said axes, a plurality of multi-ratio transmissions each having an output shaft drivingly connected to translate one of said members and each having an input shaft, means for driving said input shafts in unison, each of said transmissions having means for setting the same to any one of a plurality of drive ratios, an elongated record having successive sets of indicia spaced therealong with each set of indicia representing individual desired drive ratos for the said transmissions, and each set of indicia spaced lengthwise of said record from the succeeding set by a preselected distance which is proportional to the desired lengths of an increment along respective ones of said axes, a reader, means for transporting said record lengthwise through said reader a predetermined number of unit distances for each revolution of said input shafts, means in said reader for deriving a set of signals from each set of record indicia passed therethrough, and means responsive to each set of signals for causing said setting means to set said transmissions to the respective drive ratios represented by the corresponding set of indicia on said record, whereby the lengths of simultaneous motion along said axes for each increment of motion are respectively proportional to the product of the respective desired ratios represented by a set of indicia on the record and the distance on said record to the next set of indicia.

7. In a system for controlling the velocities and lengths of relative motion simultaneously along two axes, the combination comprising a first member movable along a first axis, a second member movable along a second axis, first and second multi-ratio transmissions having input shafts driven in unison and having output shafts respectively drivingly connected to translate said first and second members, means included in each transmission for selectively establishing any one of a plurality of drive ratios between its input shaft and output shaft, an elongated record having sets of indicia thereon, each said set of indicia representing desired drive ratios for the first and second transmissions, each set of indicia on said record being spaced from the next by a multiple if unit distances which is proportional to the desired extent of an increment of movement along one of said axes, a reader, means for transporting said record lengthwise past said reader a predetermined number of unit distances for each revolution of said input shafts, and means responsive to each set of record indicia passing said reader for setting said two transmissions to ratios respectively corresponding to the drive ratios represented by that set of indicia, whereby the velocity and length of each motion increment along said first and second axes are determined by one set of indicia on said record and the distance on said record to the next set of indicia, and the resultant of the two axis movements is at an angle determined by the ratio of the velocity along the respective axes.

8. In a system for controlling the direction, velocity and length of relative motion along two directions or axes, the combination comprising first and second members movable relative to one another along first and second axes, first and second multi-ratio transmissions each having a driven input shaft and respectively having output shafts drivingly connected to relatively translate said first and second members, each of said transmissions having means responsive to coded electrical signals for setting its drive ratio to any one of a plurality of values, an elongated record having successive sets of indicia spaced lengthwise therealong, each set of indicia representing desired first and second drive ratios of said first and second transmission during an increment motion along said first and second axes, and each set of indicia being spaced lengthwise along said record from the succeeding set by a multiple of unit distances proportional to desired lengths of an increment of motion along said first and second axes and where the factor of proportionality is inversely related to the respective desired drive ratios, means for driving said input shafts in unison, a reader, means for transporting said record longitudinally past said reader a predetermined number of unit distances for each revolution of said input shafts, means responsive to each set of indicia passing said reader for creating first and second sets of electrical signals, and means for supplying said first and second sets of electrical signals to respective ones of said setting means to correspondingly determine the drive ratio of said first and second transmissions, whereby the resultant of increments of motion along said axes may be at any angle determined by the ratio of the two drive ratios represented by a set of indicia on said record, and the lengths of increments motion along said axes are respectively determined by the desired drive ratios multiplied by the number of unit distances on said record separating one set of indicia from the next.

9. In a system for controlling the velocities and lengths of successive increments of relative motion simultaneously along a plurality of axes, the combination comprising a plurality of members each movable along one of said axes, a plurality of multi-ratio transmissions each having an output shaft drivingly connected to translate one of said members, and each having an input shaft, each of said transmissions having a plurality of positive clutches shiftable to different position patterns to establish any one of a plurality of drive ratios, a continuously driven main shaft, a slowdown unit having its input connected to said main shaft and its output connected to drive all of said input shafts in unison, said slowdown unit including cyclically operable means for reducing and then restoring the speed of said input shafts while said main shaft continues to rotate and gain a predetermined angle of rotation without corresponding rotation of said input shafts, an elongated record having successive sets of indicia spaced therealong with each set of indicia representing a plurality of desired drive ratios for respective ones of said transmissions and spaced from the succeeding set of indicia by a preselected distance D equal to $d+c$, a reader, means for transporting said record through said reader a predetermined number of unit distances for each revolution of said main shaft, means in said reader for producing a plurality of groups of signals in response to each set of record indicia passing therethrough, means responsive to each group of signals for (a) initiating one cycle of speed reduction and restoration by said slowdown unit and (b) shifting the clutches in respective ones of said transmissions to position patterns which produce the respective desired drive ratios represented by the corresponding set of indicia, said distance $c$ on said record being the distance the latter is transported when said main shaft rotates through said predetermined angle, and said distance $d$ together with the respective desired drive ratios determining precisely the respective lengths of movement of said members during one increment of motion.

10. In a system for controlling precisely the lengths and velocities of successive increments of movement while keeping the aggregate of movement equal to the sum of the increment lengths, the combination comprising a movable member, a continuously rotating driven shaft, an elongated record having successive sets of idicia spaced apart thereon by preestablished distances which are representative of the desired lengths of motion increments, a reader, means for transporting said record through said reader in synchronism with said driven shaft, a multi-ratio transmission having an output shaft drivingly connected to translate said movable member and having an input shaft connected with said driven shaft, said transmission having means including a plurality of positive clutches shiftable to any one of a plurality of position patterns to establish different drive ratios between said input and output shafts, means controlled by said reader for preselecting a desired position pattern of said clutches in response to each set of indicia on said record, and means operated in response to operation of said preselection means for shifting said clutches to the preselected position pattern only when said input shaft occupies a predetermined angular position at which said clutches will transfer, whereby the number of revolutions of said input shaft occurring while said transmission is set to a given drive ratio is determined by the distance on said record between two successive sets of indicia.

11. In a system for controlling precisely the lengths and velocities of successive increments of movement according to a pre-established program while keeping the aggregate of movement equal to the sum of the increment lengths, the combination comprising a movable member, a continuously rotating driven shaft; a multi-ratio transmission having an input shaft, an output shaft, and a plurality of planetary gear sets connected in tandem between said input and output shafts and having a plurality of input elements, and a plurality of two-position positive clutches each shiftable selectively when said input shaft is at a predetermined angular position either to drivingly connect said input shaft to a corresponding one of said input elements or to hold that input element stationary; means for driving said input shaft from said driven shaft, an elongated record having successive sets of indicia each representing a desired ratio for one increment of movement and with each set spaced longitudinally of said record from the succeeding set by a multiple of unit distances proportional to the desired length of the corresponding increment of movement, a reader, means for transporting said record longitudinally through said reader a predetermined number of said unit distances for each revolution of said driven shaft, said reader including means for producing signals corresponding to each set of indicia passing therethrough, means responsive to said signals for shifting said clutches to positions which will produce the desired ratio of said transmission and including means for effecting the shifting substantially at the instant said input shaft is passing through said predetermined angular location, whereby the velocity of said member during each increment of movement is determined by one set of indicia on said record and the length of that increment is determined by the lengthwise distance on said record between said one set of indicia and the next.

12. The combination set forth in claim 11 and further characterized in that the multiple of unit distances separating first and second successive sets of indicia on said record is proportional to the ratio of desired length L of the increment corresponding to the first set of indicia and the desired ratio represented by that first set of indicia.

13. In a system for controlling precisely the lengths and velocities of successive increments of movement while keeping the aggregate of movement equal to the sum of the increment lengths, the combination comprising an elongated record having a plurality of sets of indicia spaced apart lengthwise thereof, each said set of indicia representing a desired one of a plurality of ratios and being spaced from the succeeding set of indicia by a distance which is proportional to the ratio of the desired length of the corresponding increment to the desired ratio, a driven shaft, a movable member, a multi-ratio transmission having shiftable clutches therein and drivingly interposed between said driven shaft and said movable member, a reader including means connected with said driven shaft for transporting said record lengthwise through said reader and means for producing signals from each set of record indicia, means responsive to said signals for shifting said clutches to establish a drive ratio for said member corresponding to that represented by the indicia producing those signals, said shifting means including means for effecting the shifting operation at the instant when said driven shaft is passing through a predetermined angular position, the velocity of said movable member for each increment thereby being determined by the corresponding set of indicia on said record, and the length of each increment of movement being proportional to the ratio $D/R$ where D is the distance on the record between the corresponding set and the next succeeding set of indicia and R is the drive ratio represented by said corresponding set of indicia.

14. In a system for controlling precisely the lengths and velocities of successive increments of movement while keeping the accumulated aggregate of movement equal to the sum of the incremental lengths, the combination comprising a movable member, a continuously rotating main shaft, a multi-ratio transmission having an output shaft drivingly connected to translate said movable member and having an input shaft, means normally establishing a positive drive connection between said main shaft and said input shaft, said last-named means including means selectively actuatable through lost motion cycles for slowing said input shaft relative to said main shaft while the former loses a predetermined angle of rotation relative to the latter, said transmission having a plurality of positive clutches shiftable to different position patterns to provide any one of a plurality of drive ratios between said input and output shafts, means for actuating said lost motion cycle means and then shifting said positive clutches to a selected position pattern while said input shaft is slowed down thereby to initiate each increment of movement of said member at a velocity determined by the selected position pattern, and means for rotating said main shaft during each increment of motion a preselected number of revolutions which is proportional to the desired length of that increment plus the number of revolutions which said main shaft gains on said input shaft during a cycle of said lost motion means.

15. In a system for controlling precisely according to a predetermined program the lengths and velocities of successive increments of movement while keeping the aggregate of movement equal to the sum of the increment lengths, the combination comprising a movable member, a continuously rotating main shaft, a multi-ratio transmission having an output shaft drivingly connected to translate said movable member and having an input shaft, a lost motion slowdown unit normally establishing a positive drive connection between said main shaft and said input shaft, said lost motion unit having means selectively actuatable to cause said input shaft to smoothly stop and start while said main shaft gains a predetermined angle of rotation relative to said input shaft, said transmission having a plurality of positive clutches shiftable to different position patterns to produce any one of a plurality of drive ratios between said input and output shaft, an elongated record having spaced sets of indicia thereon which represents the desired drive ratios for successive increments, and with each indicia set spaced longitudinally on the record by a preselected multiple of unit distances from the succeeding set, a reader, means for transporting said record lengthwise past said reader a predetermined number of unit distances for each revolution of said main shaft, means in said reader responsive to a set of indicia passing therethrough for actuating said lost motion unit through one cycle and for causing said clutches to be shifted to the position pattern corresponding to the drive ratio represented by that set of indicia, each set of indicia being spaced longitudinally from the succeeding set on said record by a distance $D=d+c$, where $d$ is a multiple of unit distances proportional to the desired length of the corresponding increment of movement, and $c$ is the distance which said record is transported while said shaft rotates through said predetermined angle.

16. In a system for controlling precisely the lengths and velocities of successive increments of movement while keeping the aggregate of movement equal to the sum of the incremental lengths, the combination comprising a movable member, a rotating main shaft, a multi-ratio transmission having an input shaft and an output shaft with the latter connected to translate said member, said transmission including a plurality of positive clutch elements shiftable between two positions in which they are respectively held stationary or connected with said input shaft to establish different drive ratios, said clutch elements being shiftable only when said input shaft is substantially in a predetermined angular position, a slowdown unit normally establishing a positive drive between said main shaft and said input shaft, said slowdown unit having selectively actuatable cycle means for smoothly reducing the speed of said input shaft so that it is substantially stationary when in said predetermined angular position and then increasing the speed of said input shaft back to its original value with the resulting loss of predetermined angle of rotation of said input shaft relative to said main shaft, an elongated record having successive sets of indicia spaced therealong and with each set representing a desired one of the transmission drive ratios, a reader and means for transporting said record lengthwise through the reader a predetermined unit distance for each revolution of said main shaft, said reader having means for producing a set of signals corresponding to each set of indicia passing therethrough, means responsive to each set of signals for initiating one cycle of said slowdown unit and for shifting said clutches at the instant said input shaft is substantially stationary to establish the corresponding transmission drive ratio, said record being characterized in that the distance $D$ between first and second successive sets of indicia thereon is equal to $d+c$, where $d$ is proportional to the ratio of the desired increment length and the transmission ratio represented by the first set of indicia, and $c$ is the distance said record is transported while said input shaft rotates through said predetermined angle.

17. In a system for controlling precisely the lengths and velocities of successive increments of movement while keeping the accumulated aggregate of movement equal to the sum of the incremental lengths, the combination comprising a movable member, a continuously rotating main shaft, a multi-ratio transmission having an output shaft drivingly connected to translate said member and also having an input shaft, a slowdown unit interposed between said main shaft and said input shaft and having means normally establishing a positive drive connection between such shafts, said transmission having a plurality of positive clutches shiftable only when said input shaft is in one of certain angular positions to set said transmission to different drive ratios, said slowdown unit having selectively actuatable means for smoothly decelerating said input shaft to substantially zero velocity and smoothly accelerating said input shaft to its original velocity while said main shaft continues to rotate and gains one revolution relative to the normal rotation of said input shaft, a punched tape having successive transverse rows thereacross, said tape having successive sets of punched indicia thereon representing desired drive ratios with each set spaced from the succeeding set by a number of rows D which is equal to one row $c$ plus a plurality of rows proportional to $L/R$ where L is the desired length of an increment and R is the desired drive ratio for that increment, a reader, means for transporting said tape lengthwise through said reader at a rate of one row for each revolution of said main shaft, said reader having means for creating signals corresponding to the successive sets of punched indicia on said tape, and means responsive to the signals resulting from each set of said indicia for (a) initiating one cycle of said decelerating and accelerating means and (b) shifting said clutches substantially at the instant said input shaft has substantially zero velocity to establish the transmission drive ratio represented by that set of punched indicia, whereby the drive ratio R for each successive increment of said movable member is established by the corresponding set of indicia on said punched tape, and the length L of that increment is proportional to one less than the number of rows on said tape betwen the corresponding set of indicia and the next succeeding set.

18. The combination set forth in claim 9 further characterized in that the distance $c$ is the lengthwise distance on said record occupied by that portion of a set of indicia which represents desired drive ratios for one less than the number of said plurality of transmissions.

19. In a system for controlling the lengths and velocities of successive increments of simultaneous motion along a plurality of axes, the combination comprising a plurality of members movable along respective ones of said axes, a plurality of multi-ratio transmissions having output shafts drivingly connected to translate respective ones of said movable members, each of said transmissions having an input shaft and a plurality of positive clutches selectively shiftable to establish any one of a plurality of drive ratios between its input and output shafts, a continuously rotating main shaft, a slowdown unit normally establishing a positive drive connection between said main shaft and all of said input shafts, said slowdown unit including selectively actuatable cycle means for decelerating and then accelerating said input shafts relative to said main shaft while the latter continues to rotate and gain a predetermined angle of rotation relative to said input shafts, an elongated record having thereon successive sets of indicia spaced apart lengthwise by pre-established distances, each set of indicia including successive portions spaced lengthwise on said record representing desired drive ratios for respective ones of said transmissions, a reader and means for transporting said record lengthwise therethrough in timed relation to the rotation of said main shaft, means responsive to a set of indicia on said record passing through said reader for initiating one deceleration and acceleration cycle of said slowdown unit, and means responsive to the successive portions of a set of indicia passing through said reader for simultaneously shifting the clutches in respective ones of said transmissions to produce the corresponding desired drive ratios, said last-named means including means for causing the shifting of clutches to occur substantially at the instant when said input shafts are at their lowest velocity due to their deceleration, and said transporting means including means to advance said record a distance occupied by the ratio indicia for one less than the number of said plurality of transmissions while said main shaft rotates through an angle equal to said predetermined angle of rotation.

20. In a system for controlling the lengths and velocities of successive increments of simultaneous motion along a plurality of $n$ axes, the combination comprising a plurality of $n$ members movable along respective ones of said axes, a plurality of $n$ multi-ratio transmissions having output shafts drivingly connected to translate respective ones of said movable members, each of said transmissions having an input shaft and a plurality of positive clutches selectively shiftable to establish any one of a plurality of drive ratios between its input and output shafts, a main shaft and means to continuously rotate the same, a slowdown unit normally establishing a positive drive connection between said main shaft and all of said input shafts, said slowdown unit including a normally locked, selectively and cyclically actuatable intermittent drive mechanism for causing said input shafts to be decelerated substantially to zero velocity and then accelerated to their original velocity while said main shaft continues to rotate, one cycle of said intermittent drive mechanism causing said main shaft to gain a number $n-1$ revolutions relative to the normal rotation of said input shafts, a punched tape having successive sets of punched rows thereon with each set spaced from the next by a pre-established distance proportional to the desired length of an increment of movement, each of said sets of punched rows including a plurality of $n$ consecutive rows and with each such row representing a desired drive ratio for a respective one of said $n$ transmissions, a reader, means for transporting said tape lengthwise through said reader at a timed rate of one row per revolution of said main shaft, means responsive to the passage of a set of rows through said reader for initiating one cycle of said slowdown unit, means responsive to the successive rows of each set passing through said reader for conditioning respective ones of said $n$ transmissions to be set to the corresponding drive ratios, and means actuated substantially at the instant said input shafts have substantially zero velocity for shifting the clutches in all of said transmissions to produce the drive ratios represented by said $n$ punched rows, whereby said tape is advanced $n-1$ rows while said main shaft gains rotation relative to said input shaft due to each cycle of said slowdown unit so that all but one of $n$ punched rows in each set is read without corresponding motion of said transmission input shafts.

21. In a system for controlling successive increments of motion, the combination comprising a movable member, a multi-ratio transmission having an input shaft and an output shaft and including a plurality of positive clutches shiftable to different position patterns to establish different drive ratios, a variable speed drive source connected to drive said input shaft, means connecting said output shaft to translate said movable member, an elongated record having sets of indicia spaced therealong representing different desired ratios of said transmission and with each set of indicia being preceded by indicia representing a slowdown character, a reader, means for transporting said record longitudinally past said reader, means responsive to slowdown indicia passing said reader for changing the speed of said drive source to a predetermined value at which said positive clutches may be reliably shifted, and means responsive to each set of indicia passing said reader for shifting said clutches to a position pattern corresponding to the desired ratio represented by that set of indicia.

22. In a system for controlling the lengths and velocities of successive increments of motion, the combination comprising a movable member, a multi-ratio transmission having an input shaft and having an output shaft drivingly connected to translate said member, said transmission having a plurality of positive clutches shiftable to different position patterns to establish different drive ratios, a variable speed motor connected to drive said input shaft, an elongated record having sets of indicia thereon each representing a desired drive ratio for one increment of movement, each set of indicia being spaced lengthwise of said record from the succeeding set by a preselected distance proportional to the desired length of the corresponding increment of movement, said record also having thereon slowdown indicia located a short predetermined distance before the end of the said preselected distances, a reader, means for transporting said record longitudinally past said reader a predetermined multiple of unit distances for each revolution of said input shaft, means responsive to each said set of record indicia passing said reader for shifting said clutches to a position pattern corresponding to the drive ratio represented by that set of indicia, and means responsive to said slowdown indicia passing said reader for causing said motor to operate at a predetermined safe shifting speed, thereby to facilitate the transfer of said clutches.

23. In a system for controlling the lengths and velocities of successive increments of motion, the combination comprising a movable member, a variable speed motor, a multi-ratio transmission having an input shaft driven from said motor and an output shaft drivingly connected to translate said member, said transmission including a plurality of positive clutches shiftable to different position patterns to set said transmission to different drive ratios, an elongated record having successive sets of indicia thereon representing different desired drive ratios for successive increments and spaced apart by distances proportional to the desired lengths for different increments, means for transporting said record in timed relation to the rotation of said motor, means for shifting the clutches of said transmission to establish the corresponding desired drive ratio in response to each set of indicia passing a predetermined point, said record having thereon an auxiliary indicia located with predetermined spacing ahead of at least some of said sets of indicia, and means responsive to the passage of an auxiliary indicia on said record by said predetermined point for causing the speed of said motor to have a predetermined relatively low value, thereby to slow down said input shaft during the time that said clutches are being shifted.

24. The combination set forth in claim 23 and further characterized in that said record has thereon a second auxiliary indicia immediately following at least some of said sets of indicia, and means responsive to said second auxiliary indicia passing said predetermined point for again increasing the speed of said motor, whereby such speed increase occurs after said clutches have been shifted.

25. In a system for controlling the lengths and velocities of successive increments of motion, the combination comprising a movable member, a multi-ratio transmission having an output shaft drivingly connected to translate said member and having an input shaft, means including a variable speed motor for driving said input shaft and normally operating at a preselected speed, an elongated record, a reader and means for transporting said record lengthwise therethrough in timed relation to the rotation of said input shaft, said record having successive sets of ratio-representing indicia spaced therealong with at least some of such sets being preceded by slowdown code indicia, means responsive to slowdown code indicia passing through said reader for reducing the speed of said motor to a predetermined value, means responsive to a set of indicia passing through said reader for changing the drive ratio of said transmission and restoring said motor to said preselected speed.

26. In a system for controlling the lengths and velocities of successive increments of movement, the combination comprising a movable member, a multi-ratio transmission having input and output shafts, a variable speed motor, means drivingly connecting said motor to said input shaft, means drivingly connecting said output shaft to translate said movable member, an elongated record having successive sets of ratio-representing indicia spaced apart lengthwise thereon, said record also having thereon slowdown code indicia preceding by a predetermined spacing at least some of said sets of indicia, said record further having thereon speed code indicia representing different desired speeds of said motor, a reader and means for transporting said record lengthwise therethrough in timed relation to the rotation of said motor, means responsive to speed code indicia passing through said reader for causing said motor to run at the corresponding desired speed, means responsive to slowdown indicia passing through said reader for reducing the speed of said motor to a predetermined value if it is then operating above such value, and means responsive to a set of ratio-representing indicia passing through said reader for changing the ratio of said transmission to the represented ratio, whereby the speed of said motor does not exceed said predetermined value when the ratio of said transmission is being changed.

27. In a system for controlling the lengths and velocities of successive increments of motion, the combination comprising a movable member, a multi-ratio transmission having input and output shafts and a plurality of positive clutches shiftable to different position patterns to establish different drive ratios between said input and output shafts, means drivingly connecting said output shaft to translate said member, a variable speed motor having a motor shaft, a slowdown unit normally establishing a positive drive connection between said motor shaft and said input shaft, said slowdown unit having selectively and cyclically operable means for decelerating and then accelerating said input shaft relative to said motor shaft, said slowdown unit having a predetermined or rated maximum speed of said motor shaft at which it can be cycled, an elongated record having successive sets of indicia spaced lengthwise thereon and representing different ones of a plurality of drive ratios, said record also having thereon slowdown code indicia preceding by a predetermined distance at least some of said sets of indicia, a reader and means for transporting said record lengthwise therethrough in timed relation to the rotation of said motor shaft, means responsive to slowdown code indicia passing through said reader for reducing the speed of said motor to said predetermined maximum speed, and means responsive to a set of indicia passing through said reader for (a) initiating a deceleration and acceleration cycle of said slowdown unit and (b) shifting said clutches while said input shaft is reduced in speed to a corresponding position pattern to set said transmission to the desired drive ratio.

28. In a system for controlling the extents and velocities of successive increments of motion, the combination comprising a movable member, a multi-ratio transmission having an input shaft and an output shaft, means drivingly connecting said output shaft to translate said movable member, a variable speed motor having a motor shaft and means drivingly connecting the latter to said input shaft, an elongated record having successive sets of ratio-representing indicia spaced lengthwise at preselected distances therealong, said record also having speed indicia thereon representing different ones of a plurality of motor speeds, said record also having thereon a slowdown code indicia preceding by a predetermined distance at least some of said sets of indicia, a reader and means for transporting said record lengthwise therethrough in timed relation to the rotation of said motor shaft, means for controlling the speed of said motor according to the magnitude of a control voltage, means responsive to the passage of speed indicia on said record through said reader for creating a first voltage proportional to the desired speed represented by that indicia, means for normally applying said first voltage as a control voltage to said controlling means, means for providing a reference voltage, means responsive to the passage of slowdown code indicia through said reader for removing said first voltage from and applying said reference voltage to said controlling means, said reference voltage having a predetermined magnitude which causes said motor to be reduced to a predetermined relatively low speed, and means responsive to the passage of one of said sets of indicia for changing the ratio of said transmission while said motor is operating at said relatively low speed.

29. The combination comprising a movable member, a multi-ratio transmission having an output shaft connected to translate said member and having an input shaft driven by a variable speed motor, an elongated record having successive sets of ratio-representing indicia thereon spaced lengthwise by preestablished distances, said record also having thereon following at least some of said sets of indicia speed code indicia representing different desired speeds of said motor, said record further having thereon slowdown code indicia preceding by a predetermined distance at least some of said sets of indicia, a reader and means for transporting said record lengthwise through said reader in timed relation to the rotation of said input shaft, means responsive to the passage of speed code indicia through said reader for causing said motor to operate at the particular desired speed represented by that indicia, means responsive to passage of said slowdown code indicia through said reader for causing said motor to operate at a predetermined maximum safe speed at which the ratio of said transmission may be changed, means for preventing operation of said last named means in the event said motor is already operating at a speed less than said predetermined maximum speed, and means responsive to passage of each said set of indicia through said reader for changing said transmission to a drive ratio represented thereby, whereby said motor is operated at or below said predetermined maximum speed when the transmission ratio is changed.

30. The combination set forth in claim 22 further characterized by means for preventing any response to passing of said slowdown indicia through said reader if said motor at that time is already operating at a speed less than said predetermined safe speed.

31. The combination set forth in claim 23 further characterized by means for selectively controlling said motor normally to operate at any one of a plurality of speeds some of which are greater and some of which are less than said predetermined value, and means for preventing any response to the passage of said auxiliary indicia by said predetermined point if the then existing motor speed is less than said predetermined value, thereby to inhibit a speed increase by said motor just prior to shifting of the clutches in said transmission.

32. The combination set forth in claim 28 and further characterized by means for comparing said first voltage with said reference voltage and for preventing the operation of said removing and applying means if said first voltage is less than said reference voltage.

References Cited by the Examiner
UNITED STATES PATENTS

| | | |
|---|---|---|
| 2,854,856 | 10/58 | Oppen. |
| 2,876,650 | 3/59 | Sangster _____ 74—365 |
| 2,939,333 | 6/60 | Thomas. |
| 3,016,778 | 1/62 | Fitzner. |

DON A. WAITE, *Primary Examiner.*